United States Patent
Ogata et al.

(10) Patent No.: US 6,261,480 B1
(45) Date of Patent: Jul. 17, 2001

(54) WIDE-RANGE TYPE THERMISTOR ELEMENT AND METHOD OF PRODUCING THE SAME

(75) Inventors: Itsuhei Ogata; Takumi Kataoka; Eturo Yasuda, all of Nishio; Kaoru Kuzuoka, Toyota; Masanori Yamada, Nishio, all of (JP)

(73) Assignees: Denso Corporation, Kariya; Nippon Soken, Inc., Nishio, both of (JP)

( * ) Notice: Subject to any disclaimer, the term of this patent is extended or adjusted under 35 U.S.C. 154(b) by 0 days.

(21) Appl. No.: 09/382,589

(22) Filed: Aug. 25, 1999

Related U.S. Application Data

(63) Continuation-in-part of application No. 09/040,529, filed on Mar. 18, 1998.

(30) Foreign Application Priority Data

| Mar. 19, 1997 | (JP) | 9-66827 |
| Jun. 13, 1997 | (JP) | 9-156931 |
| Dec. 10, 1997 | (JP) | 9-340313 |

(51) Int. Cl.[7] .................................. H01B 1/06
(52) U.S. Cl. ............. 252/520.5; 252/500; 252/519.1; 252/519.2; 252/518.1; 252/520.2; 252/62.3; 252/521.1; 338/22 R; 428/416
(58) Field of Search .................. 252/500, 62.3, 252/519.1, 519.2, 519.15, 518.1, 520.2, 520.5, 521.1; 428/416; 338/22 R

(56) References Cited

U.S. PATENT DOCUMENTS

| 5,476,822 | 12/1995 | Iwaya et al. | 501/157 |
| 5,568,116 | 10/1996 | Iwaya et al. | 338/22 SD |
| 5,610,111 | 3/1997 | Iwaya et al. | 501/136 |

FOREIGN PATENT DOCUMENTS

| 0 655 752 | 5/1995 | (EP) |
| 0 798 275 | 10/1997 | (EP) |
| 57-64903 | 4/1982 | (JP) |
| 1-108160 | 4/1989 | (JP) |
| 1-228103 | 9/1989 | (JP) |
| 2-107561 | 4/1990 | (JP) |
| 5-62805 | 3/1993 | (JP) |
| 6-325907 | 11/1994 | (JP) |
| 7-99103 | 4/1995 | (JP) |
| 7-201528 | 8/1995 | (JP) |

OTHER PUBLICATIONS

Database WPI Section Ch, Week 8732, Derwent Publications Ltd., London, GB; Glass L03, AN 97-226136 XP002106811 & jp 62 152104 a (TOSHIBA KK), Jul. 7, 1987.

Database WPI Section Ch, Week 8710, Derwent Publications Ltd., London, GB; Class L03, AN 87-070341 XP002106812 & JP 62 025403 A (MURATA MFG CO LTD) Feb. 3, 1987.

*Primary Examiner*—Yogendra Gupta
*Assistant Examiner*—Derrick Hamlin
(74) *Attorney, Agent, or Firm*—Pillsbury Madison & Sutro LLP

(57) ABSTRACT

The thermistor element of the present invention is composed of a mixed sintered body $aM^1M^2O_3 \cdot bY_2O_3$ of a composition $M^1M^2O_3$ (wherein $M^1$ is Y, and $M^2$ is at least one element selected from the elements such as Cr, Mn, Ti, etc.) as a perovskite compound and $Y_2O_3$, wherein molar fractions a and b satisfy the relations $0.05 \leq a < 1.0$, $0 < b \leq 0.95$ and $a+b=1$. Another wide-range type thermistor element of the present invention is composed of a perovskite compound $M^1(M^2M^3)O_3$, wherein $M^1$ is at least one element selected from the elements of the groups II and IIIA excluding La in the Periodic Table, and each of $M^2$ and $M^3$ is at least one element selected from the elements of the groups IIB, IIIB, IVA, VA, VIA, VIIA and VIII. a and b satisfy the relations $a+b=1$ and $0<b<0.1$, where a is a molar fraction of $M^2$ and b is a molar fraction of $M^3$ in $M^1(M^2M^3)O_3$.

7 Claims, 23 Drawing Sheets

WIDE-RANGE TYPE THERMISTOR ELEMENT AND METHOD OF PRODUCING THE SAME

CROSS REFERENCE TO RELATED APPLICATIONS

This application is a Continuation-in-Part of National Application No. 09/040,529 filed Mar. 18, 1998 which is incorporated herein by reference and claims priority to Japanese application nos. 09-66827, filed Mar. 19, 1997; 09-156931 filed Jun. 13, 1997; and 09-340313 filed Dec. 10, 1997, all of which are incorporated herein by reference.

BACKGROUND OF THE INVENTION

1. Field of the Invention

The present invention relates to a thermistor element which can detect a temperature ranging from room temperature to high temperature of about 1000° C., i.e. so-called wide-range type thermistor element, and the thermistor element is particularly suitable for use in a temperature sensor for an automobile exhaust gas.

2. Description of the Related Art

A thermistor element for a temperature sensor is used in the measurement of a temperature ranging from moderate to high temperature (e.g. 400 to 1300° C., etc.) such as temperature of an automobile exhaust gas, gas flame temperature of gas hot-water supply device, temperature of a heating oven, etc.

Characteristics of this kind of a thermistor element are indicated by the resistivity and resistivity temperature coefficient (temperature dependence of the resistivity). In order to cope with a practical resistivity range of a temperature detecting circuit constituting the temperature sensor, it is desired that the resistivity of the thermistor element is within a predetermined range. Therefore, perovskite materials are exclusively used as those having resistivity characteristics suitable for a wide-range type thermistor element.

As the thermistor element using perovskite material, for example, those described in Japanese Patent Kokai Publication Nos. Hei 6-325907 and Hei 7-201528 are suggested. These thermistor elements are produced by mixing oxides of Y, Sr, Cr, Fe, Ti, etc. in a predetermined composition proportion and calcining the mixture to form a perfect solid solution in order to realize a thermistor which can used in a wide temperature range.

The resistivity characteristics of the wide-range type thermistor element are indicated by the resistivity and resistivity temperature coefficient. In a normal temperature sensor, it is necessary that the resistivity of the thermistor element is from 50 to 300 k$\Omega$ within a working temperature range in view of the resistivity range of the temperature detecting circuit. In case of affording a heat history from room temperature to 1000° C. to the thermistor element, the smaller a change between the resistivity after heat history and the initial resistivity, the better.

In the above Japanese Patent Publications, various thermistor elements of a perfect solid solution are suggested, but only data of the thermistor element resistivity at 300° C. or more are disclosed. Therefore, the present inventors have examined the resistivity characteristics at about room temperature of various thermistor elements in the above Japanese Patent Publications.

As a result, regarding those having a resistivity stability in the heat history from room temperature to 1000° C., the resistivity becomes higher in the temperature range from room temperature to 300° C. Therefore, it is impossible to discriminate it from insulation and the temperature can not be detected. On the other hand, regarding those satisfying low resistivity of 50 to 300 k$\Omega$ the resistivity changes by 10% or more relative to the initial resistivity in the heat history. It has been found that the stability is poor.

There has never been obtained a thermistor element which can satisfy two resistivity characteristics which are contrary to each other, i.e. low resistivity characteristics within a range from room temperature to high temperature of 1000° C. and resistivity stability in the heat history (so-called wide-range type thermistor element).

In the light of the above problems, an object of the present invention is to provide a thermistor element which has stable characteristics (i.e. small change in resistivity in the heat history from room temperature to 1000° C.) and has a resistivity of 50 to 300 k$\Omega$ within the temperature range from room temperature to 1000° C.

SUMMARY OF THE INVENTION

First Aspect (A) In the first aspect of the present invention for accomplishing the above object, the present inventors have considered that a conventional thermistor element is composed of a perfect solid solution having a perovskite type structure but it is difficult for a perfect solid solution as a single compound to satisfy the above resistivity characteristics which are liable to be contrary to each other.

Thus, the above object has been accomplished by using a novel thermistor material composed of a mixed sintered body prepared by mixing two compounds, i.e. a perovskite material (oxide) having a comparatively low resistivity and a material having a comparatively high resistivity in place of the perfect solid solution.

The present inventors have tested and studied various perovskite materials. As a result, it has been found that a composition $M^1M^2O_3$ ($M^1$ is at least one element selected from the elements of the groups II and IIIA excluding La in the Periodic Table, and $M^2$ is at least one element selected from the elements of the groups IIB, IIIB, IVA, VA, VIA, VIIA and VIII) is preferable as a material having resistivity characteristics which are suitable for accomplishing the above object.

Since La has high moisture absorption property, there is a problem that La reacts with water in the air to form an unstable hydroxide, which results in breakage of the thermistor element. Therefore, La is not used as $M^2$.

On the other hand, it has been decided that $Y_2O_3$ (yttrium oxide), which has a comparatively high resistivity and stabilizes resistivity of the thermistor material, is used as another material to be mixed, as a result of the study.

By preparing a mixed sintered body from $M^1M^2O_3$ and $Y_2O_3$, a thermistor element of a mixed sintered body $M^1M^2O_3.Y_2O_3$. The term "mixed sintered body" used herein means a sintered body wherein grains constituting the sintered body comprise a mixture of grains of a first component $M^1M^2O_3$ and grains of a second component $Y_2O_3$.

1) That is, this mixed sintered body is a mixed sintered body $M^1M^2O_3.Y_2O_3$ of the above $M^1M^2O_3$ and $Y_2O_3$, wherein $M^1$ is at least one element selected from the elements of the groups IIA and IIIA excluding La in the Periodic Table, and $M^2$ is at least one element selected from the elements of the groups IIB, IIIB, IVA, VA, VIA, VIIA and VIII in the composition $M^1M^2O_3$. More specifically, it can also be represented as $aM^1M^2O_3.bY_2O_3$.

This thermistor element was incorporated into a temperature sensor and the resistivity characteristics of the element were examined. As a result, it could be confirmed that it is stable, that is, a change in resistivity is small (e.g. few %, etc.) even in the heat history from room temperature to 1000° C. and the resistivity is from 50 to 300 kΩ within the temperature range from room temperature to 1000° C.

Therefore, according to this invention, it is possible to provide a thermistor element which can detect a temperature ranging from room temperature to high temperature of 1000° C. and has stable characteristics, that is, a change in resistivity is small even in the heat history from room temperature to 1000° C., so-called wide-range type thermistor element.

2) As a result of the study of the present inventors, regarding each element in the above perovskite compound $M^1M^2O_3$, $M^1$ is preferably at least one element selected from Y, Ce, Pr, Nd, Sm, Eu, Gd, Dy, Ho, Er, Yb, Mg, Ca, Sr, Ba and Sc, and $M^2$ is preferably at least one element selected from Ti, V, Cr, Mn, Fe, Co, Ni, Zn, Al, Ga, Zr, Nb, Mo, Hf, Ta and W, in view of the practical use.

3) As a result of a further study about a mixing ratio of $M^1M^2O_3$ and $Y_2O_3$, it has been found that the effect of the present invention can be accomplished more certainly if the mixing ratio is within a predetermined range, that is, when a molar fraction of the above $M^1M^2O_3$ is a and b is a molar fraction of the above $Y_2O_3$, these molar fraction a and b satisfy the relations $0.05 \leq a < 1.0$, $0 < b \leq 0.95$ and $a+b=1$ in the composition formula $aM^1M^2O_3 \cdot bY_2O_3$.

Since the molar fractions can be changed within a wide range in such way, the resistivity and resistivity temperature coefficient can be widely controlled by appropriately mixing both $M^1M^2O_3$ and $Y_2O_3$ and firing the mixture.

4) In the sintered body, a sintering auxiliary is added to improve the sintering property of the respective particles. As a result of the test and study about various sintering auxiliaries, it has been found that it is preferable to use a sintering auxiliary comprising at least one of $CaO$, $CaCO_3$ and $CaSiO_3$, and $SiO_2$ in case of the mixed sintered body of the present invention. Consequently, a wide-range type thermistor element having excellent sintering density can be obtained.

(B) As a result of the advancement of the test, it has been found that a detected temperature accuracy varies with the sensor in the level within the range from ±20 to 30° C. in the temperature sensor using the above thermistor element.

Hence, an examination of various conditions in the production step of the thermistor element, such as compounding, molding and firing or sintering conditions have been advanced for the purpose of improving this temperature accuracy (reduction of scatter in detected temperature accuracy between sensors).

As a result, it has been found that scatter in temperature accuracy arises as follows. That is, since the average particle diameter of $M^1M^2O_3$ as the perovskite material obtained by the calcination is larger than that of $Y_2O_3$, both components are not uniformly mixed to cause scatter in composition of the mixed sintered body, which results in scatter in resistivity of the thermistor element.

1) Therefore, the present inventors have considered that uniform mixing of the composition can be realized if the average particle diameter of $M^1M^2O_3$ is adjusted to an average particle diameter which is the same as that of $Y_2O_3$ in the mixed state before calcination, and a test and study have been made. As a result, it has been found that $M^1M^2O_3$ obtained by the calcination and $Y_2O_3$ may be mixed and ground to adjust the average particle diameter of this mixture ($M^1M^2O_3$ and $Y_2O_3$) to an average particle diameter which is not more than that of $Y_2O_3$ before mixing.

That is, when using this production method, uniform mixing is realized by atomization of $M^1M^2O_3$ and $Y_2O_3$ and a variation in composition of the mixed sintered body $M^1M^2O_3 \cdot Y_2O_3$ is reduced and, therefore, scatter in resistivity of the thermistor element can be reduced. Accordingly, it is possible to provide a wide-range type thermistor element which can realize a sensor temperature accuracy better than a conventional level within the temperature range from room temperature to 1000° C. (small scatter in temperature accuracy between sensors).

2) The mixed sintered body $Y(CrMn)O_3 \cdot Y_2O_3$ can also be obtained by a method of mixing an oxide of Cr with an oxide of Mn, calcining the mixture at 1000° C. or more to obtain $(Mn_{1.5}Cr_{1.5})O_4$, and performing direct mixing/sintering of $(Mn_{1.5}Cr_{1.5})O_4$ and $Y_2O_3$ in place of a method of mixing $Y(CrMn)O_3$ with $Y_2O_3$ and sintering the mixture. In this case, the same effect can be exerted by mixing an oxide of Cr with an oxide of Mn, calcining the mixture at 1000° C. or more to obtain $(Mn_{1.5}Cr_{1.5})O_4$ having an average particle diameter larger than that of the above $Y_2O_3$, mixing this $(Mn_{1.5}Cr_{1.5})O_4$ with the above $Y_2O_3$, grinding the mixture to adjust the average particle diameter of this mixture to an average particle diameter which is not more than that of the above $Y_2O_3$ before mixing, molding the mixture into an article having a predetermined shape and sintering the article.

3) The mixed sintered body $Y(CrMnTi)O_3 \cdot Y_2O_3$ can also be obtained by mixing an oxide of Cr with an oxide of Mn, calcining the mixture at 1000° C. or more to obtain $(Mn_{1.5}Cr_{1.5})O_4$, and performing mixing and sintering of $(Mn_{1.5}Cr_{1.5})O_4$, $Y_2O_3$ and $TiO_2$. In this case, the same effect can be obtained by mixing an oxide of Cr with an oxide of Mn, calcining the mixture at 1000° C. or more to obtain $(Mn_{1.5}Cr_{1.5})O_4$ having an average particle diameter larger than that of the above $Y_2O_3$, mixing this $(Mn_{1.5}Cr_{1.5})O_4$ with the above $Y_2O_3$ and $TiO_2$, grinding the mixture to adjust the average particle diameter of this ground mixture to an average particle diameter which is not more than that of the above $Y_2O_3$ before mixing, molding the mixture into an article having a predetermined shape and sintering the article.

(C) Furthermore, an examination of the production method of the thermistor element has been advanced for the purpose of improving the detected temperature accuracy of the temperature sensor using the thermistor element of the present invention. As a result, it has been found that scatter in composition of $M^1M^2O_3$ itself obtained by the calcination exerts an influence on scatter in composition of the mixed sintered body $M^1M^2O_3 \cdot Y_2O_3$ (i.e. scatter in resistivity of the thermistor element).

Now, the cause of scatter in the composition of $M^1M^2O_3$ obtained by the calcination in the method of producing the mixed sintered body $M^1M^2O_3 \cdot Y_2O_3$ will be described by way of the example wherein $M^1=Y$ and $M^2=Cr$ and Mn, i.e. example using $Y(Cr_{0.5}Mn_{0.5})O_3$.

For example, $Y(Cr_{0.5}Mn_{0.5})O_3$ is prepared as follows (see FIG. 20). $Y_2O_3$ (average particle diameter: about 1 μm) as a source material of $M^1$, and $Cr_2O_3$ (average particle diameter: about 4 μm) and $Mn_2O_3$ (average particle diameter: about 7 μm) as source materials of $M^2$ are compounded in a molar ratio Y:Cr:Mn=1:0.5:0.5 (compounding 1), mixed and ground by using a ball mill, and then this mixture is calcined at 1000° C. or more to obtain $Y(Cr_{0.5}Mn_{0.5})O_3$.

The present inventors have found that a problem lies in the mixing and grinding using a ball mill in the above step. That is, according to the mixing and grinding using a ball mill, the average particle diameter after the mixing and grinding is limited to about 2 μm and the average particle diameter of $Cr_2O_3$ and that of $Mn_2O_3$ are larger than that of $Y_2O_3$.

Accordingly, $Y(Cr_{0.5}Mn_{0.5})O_3$ obtained by the calcination reaction of the mixture of $Y_2O_3$, $Cr_2O_3$ and $Mn_2O_3$ becomes a mixture containing a composition shifted from Y:Cr:Mn=1:0.5:0.5 due to a difference in particle diameter of each raw material, e.g. various compositions from composition of Y:Cr:Mn=1:0.6:0.4 to composition of Y:Cr:Mn=1:0.4:0.6.

Since these compositions, from a composition of Y:Cr:Mn=1:0.6:0.4 to a composition of Y:Cr:Mn=1:0.4:0.6, have different resistivity and resistivity temperature coefficient (β value), the resistivity varies with the element to cause scatter in element resistivity.

In case that a part of $Y_2O_3$, $Cr_2O_3$ and $Mn_2O_3$ as the raw material (shifted from the composition ratio) is remained as an unreacted matter, scatter in element resistivity arises.

The present inventors have intensively studied problems such as scatter in composition of $M^1M^2O_3$ obtained in the step before obtaining $M^1M^2O_3$ by the calcination, presence of the unreacted matter, etc.

As a result, it has been found that the above drawbacks can be inhibited and the temperature accuracy becomes ±10° C. or less if the raw material of $M^2$ and that of $M^2$ are mixed and ground by using a medium stirring mill having a grinding capability higher than that of a ball mill and atomization is performed so that the average particle diameter of the raw material mixture (mixed grind) after mixing and grinding is adjusted to an average particle diameter which is not more than that of the raw material of $M^1$ and is not more than 0.5 μm.

The method of producing the thermistor element of the present invention has been accomplished based on the above finding.

1) That is, in this invention, the raw material of $M^2$ and the raw material of $M^1$ are mixed and ground to adjust the average particle diameter of this mixed grind to an average particle diameter which is not more than that of the raw material of $M^1$ before mixing and is not more than 0.5 μm in the mixing step of mixing and grinding the raw material of $M^2$ and the raw material of $M^1$. Thereafter, $M^1M^2O_3$ is obtained by calcination, and the $M^1M^2O_3$ and $Y_2O_3$ are then mixed. The mixture is molded into an article having a predetermined shape and then sintered.

According to the present invention, since uniform mixing of the composition can be realized by uniform atomization of the raw materials of $M^1$ and $M^2$, reduction of scatter in composition of $M^1M^2O_3$ formed after calcination and inhibition of the existence of the raw material unreacted reaction matter can be realized. Therefore, scatter in resistivity of the thermistor element can be reduced.

Accordingly, it is possible to provide a wide-range type thermistor element which realizes a sensor temperature accuracy better than a conventional level within the temperature range from room temperature to 1000° C. (small scatter in temperature accuracy between sensors).

When using those containing at least $Y_2O_3$ as the raw material of $M^1$, a thermistor element can also be obtained by mixing the raw material of $M^1$ and the raw material of $M^2$, grinding the mixture, calcining the mixture to form a precursor having the same composition as that of the desired mixed sintered body $M^1M^2O_3.Y_2O_3$, molding this precursor into an article having a predetermined shape, and sintering the article.

The precursor is represented by $M^1M^2O_3.Y_2O_3$, wherein $Y_2O_3$ containing excess Y in an amount larger than a theoretical amount is combined with $M^1M^2O_3$ in the above $M^1M^2O_3$ (perovskite structure). Therefore, according to this production method, a mixed sintered body, i.e. thermistor element can be obtained by previously compounding the raw materials of $M^1$ and $M^2$ so that the composition of the desired mixed sintered body can be obtained without further adding $Y_2O_3$ after calcination.

2) In addition, according to the production method using precursors containing at least $Y_2O_3$, the above precursor is obtained by mixing the raw material of $M^1$ and the raw material of $M^2$, grinding the mixture to adjust the average particle diameter of this mixed grind to an average particle diameter which is not more than that of the raw material of $M^1$ before mixing and which is 0.5 μm or less, and calcining the mixed grind.

Consequently, since uniform mixing of the composition can be realized by uniform atomization of the raw materials of $M^1$ and $M^2$, reduction of scatter in composition of the precursor formed after calcination and inhibition of the existence of the raw material unreacted reaction matter can be realized. As a result, scatter in composition of the mixed sintered body having the same composition as that of the precursor can be reduced and the same effect as that of the above item 1) can be obtained.

3) A method of mixing a raw material of $M^2$ with a raw material of $M^1$, grinding the mixture to adjust an average particle diameter of the mixed grind to an average particle diameter which is not more than that of the raw material of $M^1$ before mixing and is also not more than 0.5 μm, calcining the ground mixture to obtain $M^1M^2O_3$, mixing $M^1M^2O_3$ obtained by the calcination with $Y_2O_3$, grinding the mixture to adjust an average particle diameter of the mixture after grinding to an average particle diameter which is not more than that of the raw material of $Y_2O_3$ before mixing, molding the ground mixture into an article having a predetermined shape, and sintering the article is a combination of the above production method (B) and (C), and this method can reduce scatter in resistivity of the thermistor element to a higher level by a combination of the effects of both methods.

4) Similarly, a method of using precursors containing at least $Y_2O_3$ as a raw material of $M^1$, mixing a raw material of $M^2$ with the raw material of $M^1$, grinding the mixture to adjust an average particle diameter of the mixed grind after grinding to an average particle diameter which is not more than that of the raw material of $M^1$ before mixing and is also not more than 0.5 μm, calcining the ground mixture to obtain a precursor having the same composition as that of the mixed sintered body $M^1M^2O_3.Y_2O_3$, grinding the precursor obtained by the calcination to adjust an average particle diameter of the precursor after grinding to an average particle diameter which is not more than that of the raw material $Y_2O_3$ as the raw material of $M^1$ before mixing, molding the ground precursor into an article having a predetermined shape, and calcining the article is a combination of the above production method (B) and (C). According to this method, since the uniform mixing of $M^1M^2O_3$ and $Y_2O_3$ can be realized and a variation in composition of the mixed sintered body can be reduced in the molding and sintering as the following step, by atomizing the precursor $M^1M^2O_3.Y_2O_3$ having the same composition as that of the mixed sintered body to a level smaller than the average particle diameter of $Y_2O_3$ as the raw material of $M^1$, scatter in resistivity of the thermistor element can be reduced.

That is, according to this element, scatter in resistivity of the thermistor element can be reduced to a higher level.

Second Aspect

The material of the above conventional thermistor element is a perfect solid solution having a perovskite type structure. In case of a $YCrO_3$ perovskite type material, the valence of a Y ion of A site or Cr of a B site ion is controlled by other element ions so as to optionally control the resistivity and resistivity temperature coefficient. The present inventors have considered that the crystal structure becomes unstable by increasing the substitution element ions according to this method and it is difficult to satisfy the resistance characteristics which are liable to be contrary to each other.

Hence, the present inventors have decided to accomplish the above object by selecting the element capable of controlling the resistivity and resistivity temperature coefficient of a wide-range type thermistor element which can maintain the stability of the crystal structure and realize the stability of the resistivity even in the heat history, in a small amount to be substituted.

1) The present inventors have tested and studied various perovskite materials. As a result, it has been found that a novel composition $M^1(M^2M^3)O_3$ ($M^1$ is at least one element selected from the elements of the groups II and IIIA excluding La in the Periodic Table, and $M^2$ and $M^3$ respectively represent at least one element selected from the elements of the groups IIB, IIIB, IVA, VA, VIA, VIIA and VIII, wherein the relation of $1<b<0.1$ is satisfied when a molar fraction of $M^2$ is a, a molar fraction of $M^3$ is b and $a+b=1$ in $M^1(M^2M^3)O_3$) is preferable as a material having resistivity characteristics which are suitable for accomplishing the above object.

Since La has high moisture absorption property, there is a problem that La reacts with water in the air to form an unstable hydroxide, which results in breakage of the thermistor element. Therefore, La is not used as $M^1$.

This wide-range type thermistor element was incorporated into a temperature sensor and the resistivity characteristics of the element were examined. As a result, it could be confirmed that it is stable, that is, a change in resistivity is small even in the heat history from room temperature to 1000° C. and the resistivity is from 60 to 300 kΩ within the temperature range from room temperature to 1000° C.

Therefore, according to the above invention, it is possible to provide a wide-range type thermistor element which can detect a temperature ranging from room temperature to high temperature of 1000° C. and has stable characteristics, that is, a change in resistivity is small even in the heat history from room temperature to 1000° C.

2) As a result of the study of the present inventors, regarding each element in the above perovskite compound $M^1(M^2M^3)O_3$, $M^1$ is preferably at least one element selected from Y, Ce, Pr, Nd, Sm, Eu, Gd, Dy, Ho, Er, Yb, Mg, Ca, Sr, Ba and Sc, and $M^2$ and $M^3$ preferably represent at least one element selected from Ti, V, Cr, Mn, Fe, Co, Ni, Cu, Zn, Al, Ga, Zr, Nb, Mo, Zr, Hf, Ta and W, in view of practical use.

3) Furthermore, it has been found that the above effect can be accomplished, more certainly, if the relation of $1<b<0.1$ is satisfied when a molar fraction of $M^2$ is a, a molar fraction of $M^3$ is b and $a+b=1$ in perovskite compound $M^1(M^2M^3)O_3$ where $M^1$ is Y, $M^2$ comprises Cr and $M^3$ and $M^3$ is Ti, i.e., $Cr(MnTi)O_3$.

4) In the sintering of the above compound $M^1(M^2M^3)O_3$, a sintering auxiliary is added to improve the sintering property of the respective particles. As a result of the test and study of various sintering auxiliaries, it has been found that it is preferable to use a sintering auxiliary comprising at least one of CaO, $CaCO_3$ and $CaSiO_3$, and $SiO_2$ in case of the sintered body of the invention of this aspect. Consequently, according to this aspect, a thermistor element having excellent sintering density in the above compound $M^1(M^2M^3)O_3$ can be obtained.

DESCRIPTION OF THE PREFERRED EMBODIMENTS

First Aspect

First Embodiment

Figure 1:
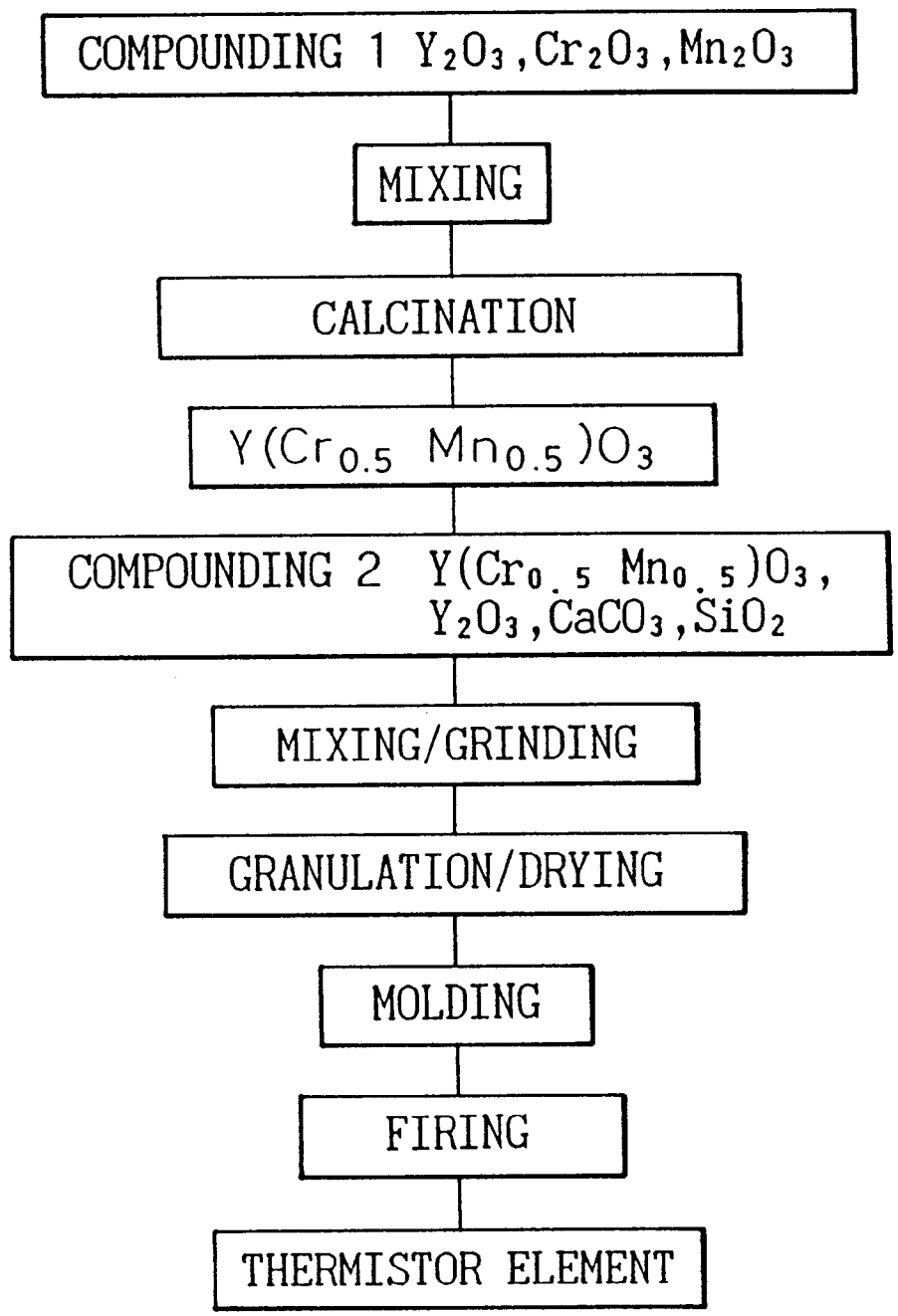
FIG. 1 is a flow chart illustrating a production step of a thermistor element of Example 1 of the present invention.

In the perovskite material $M^1M^2O_3$ of the present invention, the element $M^1$ can be selected, for example, from Mg, Ca, Sr and Ba of the group IIA and Y, Ce, Pr, Nd, Sm, Eu, Gd, Dy, Ho, Er, Yb and Sc of the group IIIA excluding La.

The element $M^2$ can be selected, for example, from Zn of the group IIB, Al and Ga of the group IIIB, Ti, Zr and Hf of the group IVA, V, Nb and Ta of the group VA, Cr, Mo and W of the group VIA, Mn, Tc and Re of the group VIIA, and Fe, Co, Ni, Ru, Rh, Pd, Os, Ir and Pt of the group VIII.

The production step of the mixed sintered body $M^1M^2O_3 \cdot Y_2O_3$ is roughly divided into a first preparation step of obtaining $M^1M^2O_3$ by calcination and a second preparation step of compounding the resulting $M^1M^2O_3$ and $Y_2O_3$ to form a mixed sintered body $M^1M^2O_3 \cdot Y_2O_3$, to thereby obtain a thermistor element.

In the first preparation step, $M^1M^2O_3$ can be obtained by compounding an oxide of $M^1$, ($M^1O_x$), and an oxide of $M^2$, ($M^2O_x$), as the raw materials of $M^1$ and $M^2$ (compounding 1), mixing and grinding the mixture (mixing step) and calcining the ground mixture (e.g. at about 1000 to 1500° C., etc.) (calcination step).

When $M^1$ is Y, an oxide ($M^2O_x$) which does not contain Y but contains only $M^2$, e.g. spinel compound $(Mn_{1.5}Cr_{1.5})O_4$ wherein $M^2$ are Mn and Cr, may be obtained even if $YM^2O_3$ is not previously obtained in the first preparation step.

In the second preparation step, the resulting $M^1M^2O_3$ or $M^2O_x$ is compounded with $Y_2O_3$ so that the desired resistivity and resistivity temperature coefficient are obtained (compounding 2). In the compounding of $M^2O_x$ and $Y_2O_3$, the compounding is performed so that Y of $Y_2O_3$ is incorporated into the $M^2O_x$ site in the solid state to form a perovskite compound $YM^2O_3$ in case of the sintering described hereinafter.

In the compounding of $M^1M^2O_3+Y_2O_3$, or $M^2O_x+Y_2O_3$, an oxide of $M^1$ or $M^2$ or a double oxide of $M^1$ and $M^2$ (e.g. $TiO_2$, $YTiO_3$, etc.) may be further compounded so that the desired resistivity and resistivity temperature coefficient can be obtained. Also, in this case, the compounding is performed so that $M^1$ or $M^2$ from these additives is incorporated into $M^1M^2O_3$ in the solid state to form a perovskite compound $M^1M^2O_3$ in case of the sintering described hereinafter (e.g. at 1500° C. or more).

Then, a thermistor element of $M^1M^2O_3.Y_2O_3$ is obtained by grinding the compounded mixture $M^1M^2O_3+Y_2O_3$ (or $M^2O_x+Y_2O_3$) (grinding step) to form a powder, incorporating a lead wire of Pt, etc., molding the powder into an article having a predetermined shape in a mold (molding step), and performing the above sintering (e.g. 1500° C. or more, etc.) (sintering step).

By the way, in the above second preparation step, the sintering density is further improved by adding a sintering auxiliary comprising at least one of CaO, $CaCO_3$ and $CaSiO_3$, and $SiO_2$ to the mixture $M^1M^2O_3+Y_2O_3$. Consequently, the resistivity of the thermistor element can be stabilized and scatter in resistivity with a variation in sintering temperature can be reduced.

The thermistor element thus obtained is a mixed sintered body prepared by uniformly mixing $M^1M^2O_3$ as the perovskite compound and $Y_2O_3$ via grain boundaries.

The resulting thermistor element is incorporated into a typical temperature assay to obtain a temperature sensor. Then, the temperature sensor was put in a high-temperature furnace and various characteristics such as resistivity, resistivity temperature coefficient β and change in resistivity ΔR in heat history from room temperature to 1000° C. are measured within the range from room temperature (e.g. 27° C., etc.) to 1000° C.

β is represented by the equation:

$$\beta(K)=\ln (R/R_0)/(1/K-1/K_0).$$

In the equation, ln represents a common logarithm, and R and $R_0$ respectively represent a resistivity of the thermistor element at room temperature (300K) and that at 1000° C. (1273K) in air. In addition, the change in resistivity ΔR represents a change in resistivity of the temperature sensor in a high-temperature durability test wherein each temperature sensor is allowed to stand in the air at 1100° C. for 100 hours, and is represented by the equation $$\Delta R (\%)=(R'_t/R_t)\times 100-100.$$

Incidentally, $R_t$ represents an initial resistivity at a predetermined temperature t (e.g. 400° C., etc., and $R'_t$ represents a resistivity at a predetermined temperature t after standing for a predetermined time.

As a result, it could be confirmed that $R_t$ is from 50 to 100 kΩ and β can be adjusted within the range from 2000 to 4000K and, furthermore, ΔR can realize a level of about few %.

In order to realize the above Rt range and respective values of β and ΔR, more certainly, the molar fractions a and b in $aM^1M^2O_3.bY_2O_3$ preferably satisfy the relations $0.05 \leq a < 1.0$, $0 < b \leq 0.95$ and $a+b=1$.

Therefore, according to this embodiment, it is possible to provide a wide-range type thermistor element which can detect a temperature ranging from room temperature to high temperature of 1000° C. and has stable characteristics, that is, a change in resistivity is small even in the heat history from room temperature to 1000° C.

Since the resistivity temperature coefficient β can be controlled to 2000–4000K smaller than that of a conventional thermistor element, scatter in resistivity with a variation in temperature can be reduced.

This embodiment will be described in more detail by way of Examples 1 to 6 and Comparative Examples 1 to 2 described hereinafter.

Second Embodiment

This second embodiment provides a method of producing a mixed sintered body $M^1M^2O_3.Y_2O_3$, and has first and second preparation steps, like the above first embodiment. Furthermore, the second embodiment has the following feature, in addition to the above first embodiment.

That is, in the above second preparation step, the average particle diameter of the resulting mixture is adjusted to an average particle diameter which is not more than that of $Y_2O_3$ before mixing in the step of mixing and grinding $M^1M^2O_3$ or $M^2O_x$ and $Y_2O_3$ (grinding step). Hereinafter, this aspect will be described, exclusively.

The temperature accuracy of the temperature sensor made by incorporating the thermistor element of the above first embodiment was examined. As a result, it has been found that the temperature accuracy varies with the sensor. The production method of this second embodiment is based on this finding. The evaluation of the temperature accuracy was performed as follows.

That is, a standard deviation σ (sigma) of the resistivity at a predetermined temperature (e.g. 350° C., etc.) is calculated from resistivity-temperature data of a lot of temperature sensors (e.g. 100 sensors, etc.). Using 6σ (standard deviation) as a scatter width (two sides), a value A obtained by dividing the value, calculated by this scatter width of the resistivity based on the temperature, by 2 is represented as "temperature accuracy±A° C." and the accuracy is evaluated. As a result, it has been found that the temperature accuracy±A° C. is ±20 to 30° C.

On the other hand, the thermistor material was observed by SEM, EPMA, etc. As a result, it has been found that the average particle diameter (e.g. 2 to 5 μm, etc.) of $M^1M^2O_3$ obtained after calcination in the first preparation step is larger than the average particle diameter (e.g. 2 μm or less, etc.) of $Y_2O_3$ to be mixed and, therefore, both components are not uniformly mixed to cause scatter in composition distribution of the mixed sintered body in the above embodiment.

Therefore, by changing the average particle diameter of mixtures $M^1M^2O_3+Y_2O_3$, $M^2O_x+Y_2O_3$, etc. after compounding and grinding in the second preparation step of the first embodiment, a relation between this average particle size and temperature accuracy±A° C. was examined. As a result, it has been found that temperature accuracy±A° C. can be reduced to ±10° C. or less if the average particle diameter of the above mixture is adjusted to the average particle diameter (about 1.0 μm) of $Y_2O_3$ before mixing.

As a grinding means for reducing the average particle diameter, a medium stirring mill can be used. As a grinding means of the medium stirring mill, a ball (e.g. 1 mmφ or less, etc.) made of $ZrO_2$ can be used.

Therefore, according to this second embodiment, since uniform mixing can be realized by atomization of $M^1M^2O_3$ and $Y_2O_3$, or $M^2O_x$ and $Y_2O_3$ and a variation in composition of the mixed sintered body $M^1M^2O_3.Y_2O_3$ can be reduced, scatter in the resistivity of the thermistor element can be reduced.

Accordingly, it is possible to provide a wide-range type thermistor element which can realize a sensor temperature accuracy better than a conventional level within the temperature range from room temperature to 1000° C. (a small scatter in temperature accuracy between sensors).

The second embodiment will be described in more detail by way of Examples 7 to 14 described hereinafter.

Third Embodiment

This third embodiment provides a method of producing a mixed sintered body $M^1M^2O_3.Y_2O_3$, and has first and second preparation steps, like the above first embodiment, but differs from the above first embodiment in the following respect.

That is, the third embodiment is characterized by mixing and grinding the raw material of $M^2$ and raw material of $M^2$ to adjust the average particle diameter of this mixed grind to an average particle diameter which is not more than that of the raw material of $M^1$ before mixing and is not more than 0.5 μm in the step of mixing and grinding the oxide of $M^1$ ($M^1O_x$) and the oxide of $M^2$ ($M^2O_x$) as the raw materials of $M^1$ and $M^2$ (mixing step) and calcining the mixed grind to obtain $M^1M^2O_3$ alone or a precursor $M^1M^2O_3.Y_2O_3$ of the mixed sintered body.

Accordingly, the method of producing the mixed sintered body $M^1M^2O_3.Y_2O_3$ in this embodiment includes two production methods wherein the calcined matter obtained in the first preparation is a precursor $M^1M^2O_3.Y_2O_3$ having the same composition as that of the mixed sintered body, or $M^1M^2O_3$ alone. The former is a first production method whereas the latter is a second production method.

As described above, the precursor $M^1M^2O_3.Y_2O_3$ is that wherein $Y_2O_3$ containing excess Y in an amount larger than a stoichiometric amount (theoretical amount) is combined with $M^1M^2O_3$ in the above $M^1M^2O_3$ (perovskite structure), and has the same composition as that of the desired mixed sintered body.

There are some overlapped portions between this third embodiment and the above first embodiment. Therefore, the different portion will be described, exclusively.

According to the first production method, in the first preparation step, those containing at least $Y_2O_3$ as the raw material of $M^1$ and an oxide of $M^2$ ($M^2O_x$) as the raw material of $M^2$ are compounded, mixed, ground and then calcined (e.g. 1000 to 1500° C., etc.) to obtain a precursor $M^1M^2O_3.Y_2O_3$.

In case of the above mixing and grinding (mixing step), the average particle diameter of the mixed grind after grinding is adjusted to an average particle diameter which is not more than that of the raw material of $M^1$ before mixing and is not more than 0.5 μm by using a medium stirring mill described in the above second embodiment, and then the mixed grind is calcined to obtain a precursor.

Thereafter, in the second preparation step, the above precursor is compounded to the desired amount. After grinding and incorporating a lead wire of Pt, the precursor is molded into an article having a desired shape and then calcined (e.g., at 1500° C. or higher) to obtain a thermistor element of a mixed sintered body $M^1M^2O_3.Y_2O_3$.

According to the second production method, in the first preparation step, an oxide of $M^1$ ($M^1O_x$) and an oxide of $M^2$ ($M^2O_x$) as the raw materials of $M^1$ and $M^2$ are compounded, mixed, ground and then calcined (e.g. at about 1000 to 1500° C., etc.) to obtain $M^1M^2O_3$.

In case of the mixing and grinding (mixing step), the average particle diameter of the mixed grind after grinding is adjusted to an average particle diameter which is not more than that of the raw material of $M^1$ before mixing and is not more than 0.5 μm by using a medium stirring mill described in the above second embodiment.

Thereafter, in the second preparation step, $M^1M^2O_3$ and $Y_2O_3$ are compounded in a desired amount and then treated in the same manner as in the first production method to obtain a thermistor element of a mixed sintered body $M^1M^2O_3.Y_2O_3$.

Consequently, since uniform mixing of the composition is realized by uniform atomization of the raw materials of $M^1$ and $M^2$, reduction of a variation in $M^1M^2O_3$ formed after calcination and a mixed sintered body and inhibition of the existence of the unreacted raw material can be realized and scatter in the resistivity of the thermistor element can be reduced.

Accordingly, it is possible to provide a wide-range type thermistor element which can detect a temperature ranging from room temperature to high temperature of 1000° C. and has stable characteristics, that is, a change in resistivity is small in the heat history from room temperature to 1000° C.

In the first and second production methods, the grinding in the grinding step of the second preparation step may be grinding using a ball mill, but may also be performed by using a medium stirring mill, as in the second embodiment.

That is, in the first production method, the precursor obtained by the calcination is mixed and ground to adjust the average particle diameter of the precursor after grinding to an average particle size which is not more than that of $Y_2O_3$ before mixing in the first preparation step. On the other hand, in the second production method, $M^1M^2O_3$ obtained by the calcination and $Y_2O_3$ are mixed and ground to adjust the average particle diameter of the precursor after grinding to an average particle size which is not more than that of $Y_2O_3$ before mixing.

Consequently, in the molding and calcining step as the post step of the grinding step, uniform mixing of $M^1M^2O_3$ and $Y_2O_3$ is performed, in addition to the above-described effect of the third embodiment of the present invention, and a variation in composition of the mixed sintered body is reduced. Therefore, scatter in the resistivity of the thermistor element can be reduced.

Accordingly, scatter in resistivity of the thermistor element can be reduced to a higher level in comparison with the method of the second embodiment of the present invention, thereby making it possible to provide a wide-range type thermistor element with good sensor temperature accuracy (a small scatter in temperature accuracy between sensors).

The temperature sensors using the wide-range type thermistor elements of the second and third embodiments of the present invention are suitable for use in map control devices to which high temperature accuracy is required, e.g. a temperature monitor for an oxygen sensor for automobile exhaust gas, etc. because the temperature accuracy is controlled within ±10° C. or less.

The third embodiment of the present invention will be described in more detail by way of Examples 15 to 20 and Comparative Example 3 described hereinafter.

The above first embodiment, second embodiment and third embodiment of the present invention will be described in more detail by way of the following Examples 1 to 6 and Comparative Examples 1 and 2, Examples 7 to 14, and Examples 15 to 20 and Comparative Example 3, respectively, but the above respective embodiments are of course not limited to these Examples and Comparative Examples.

Second Aspect

The second aspect of the present invention will be described by way of the embodiment shown in the figure.

In the perovskite material $M^1(M^2M^3)O_3$ of the present invention, the element of $M^1$ can be selected, for example, from Y, Ce, Pr, Nd, Sm, Eu, Gd, Dy, Ho, Er, Yb, Mg, Ca, Sr, Ba and Sc. The elements of $M^2$ and $M^3$ can be selected, for example, from Ti, V, Cr, Mn, Fe, Co, Ni, Cu, Zn, Al, Ga, Zr, Nb, Mo, Zr, Hf, Ta and W.

In this embodiment, a wide-range thermistor element is produced by grinding this $M^1(M^2M^3)O_3$ to form a powder, incorporating a lead wire of Pt, etc., molding the powder into an article having a predetermined shape, and sintering the article.

The resulting thermistor is incorporated into a typical temperature assay to obtain a temperature sensor. Then, the temperature sensor was put in a high-temperature furnace and various characteristics such as resistivity, resistivity temperature coefficient β and change in resistivity ΔR in heat history from room temperature to 1000° C. are measured within the range from room temperature (e.g. 27° C., etc.) to 1000° C.

β is represented by the equation:

$$\beta(K) = \ln(R/R_0)/(1/K - 1/K_0).$$

In the equation, ln represents a common logarithm, and R and $R_0$ respectively represent a resistivity of the thermistor element at room temperature (300K) and that at 1000° C. (1273K) in the air. In addition, the change in resistivity ΔR represents a change in resistivity of the temperature sensor in a high-temperature durability test wherein each temperature sensor is allowed to stand in the air at high temperature (e.g. 1100° C., etc.) for a predetermined time (e.g. 100 hours, etc.), and is represented by the equation $$\Delta R (\%) = (R'_t/R_t) \times 100 - 100.$$

Incidentally, $R_t$ represents an initial resistivity at a predetermined temperature t (e.g. 400° C., etc., and $R'_t$ represents a resistivity at a predetermined temperature t after standing for a predetermined time.

The present inventors have studied the above respective characteristics of the thermistor elements using various $M^1(M^2M^3)O_3$ and temperature sensors. As a result, it has been found that if b satisfies the relation: 0<b<0.1 when a is a molar fraction of $M^2$, b is a molar fraction of $M^3$ and a and b satisfies the relation: a+b=1, it is possible to provide a wide-range type thermistor element which can detect a temperature ranging from room temperature to a high temperature of 1000° C. and has stable characteristics, that is, a change in resistivity is small in the heat history from room temperature to 1000° C.

The present invention will be described in more detail by way of Examples 21 to 25 with respect to the compound represented by $Y(CrMnTi)O_3$ wherein $M^1$ is Y, $M^2$ represents Cr and Mn, and $M^3$ is Ti, as the perovskite compound $M^1(M^2M^3)O_3$.

In Examples 21 to 25, $Y(CrMnTi)O_3$ is represented as $Y((CrMn)_a Ti_b)O_3$, a mol fraction of the total of Cr and Mn is represented as a, a mol fraction of Ti is represented as b and a+b=1. Then, the production is performed by changing the composition of the molar fractions a and b as shown in tables in which various resistance characteristics in each composition of the thermistor elements of the figures are listed.

EXAMPLES

Example 1

In Example 1, a mixed sintered body of $Y(Cr_{0.5}Mn_{0.5})O_3 \cdot Y_2O_3$ is obtained from $Y(Cr_{0.5}Mn_{0.5})O_3$, wherein Y was selected as $M^1$ and Cr and Mn were selected as $M^2$ in $M^1M^2O_3$, and $Y_2O_3$.

A flow chart illustrating a production step of the thermistor element of Example 1 is shown in FIG. 1. This production step is roughly divided into a first preparation step from compounding 1 to formation of $Y(Cr_{0.5}Mn_{0.5})O_3$, and a second preparation step from compounding of the resulting $Y(Cr_{0.5}Mn_{0.5})O_3$ and $Y_2O_3$ to completion of a thermistor element.

In the first preparation step, $Y_2O_3$, $Cr_2O_3$ and $Mn_2O_3$ (purity of all components is not less than 99.9%) are first prepared and then weighed so that a molar ratio Y:Cr:Mn becomes 2:1:1 to make 500 g as the total amount (compounding 1).

Using a resin pot (volume: 5 liter) containing $Al_2O_3$ or $ZrO_2$ pebbles having a diameter of 15 mmφ (2.5 kg) and pebbles having a diameter of 20 mmφ (2.5 kg) as a ball mill to mix these weighed substances, the total amount of $Y_2O_3$, $Cr_2O_3$ and $Mn_2O_3$ is charged in the pot, in order to mix these weighed substances. After adding 1500 cc of purified water, the mixture was mixed at 60 rpm for 6 to 12 hours (mixing step).

A mixed slurry of $Y_2O_3$, $Cr_2O_3$ and $Mn_2O_3$ obtained after a mixing treatment is transferred to a porcelain evaporating dish, and then dried by using a hot-air dryer at 150° C. for 12 hours or more to obtain a mixed solid of $Y_2O_3$, $Cr_2O_3$ and $Mn_2O_3$. Subsequently, this mixed solid is roughly ground by using a chaser mill and passed through a sieve (# 30 mesh) to obtain a mixed powder of $Y_2O_3$, $Cr_2O_3$ and $Mn_2O_3$.

In the calcination step, this mixed powder is charged in a crucible made of 99.3% $Al_2O_3$ and then calcined in a high-temperature oven in the air at 1100 to 1300° C. for 1 to 2 hours to obtain $Y(Cr_{0.5}Mn_{0.5})O_3$. $Y(Cr_{0.5}Mn_{0.5})O_3$ as a bulk solid obtained in the calcination was roughly ground by using a chaser mill and passed through a sieve (# 30 mesh) to obtain a powder.

This $Y(Cr_{0.5}Mn_{0.5})O_3$ shows low resistivity and a low resistivity temperature coefficient at 1000 to 4000K when used alone as a thermistor material. As a wide-range type thermistor material, this $Y(Cr_{0.5}Mn_{O.5})O_3$ and $Y_2O_3$, as materials for stabilizing the resistivity of the thermistor, are used.

In the second preparation step, for the purpose of obtaining a desired resistivity and a desired resistivity temperature coefficient, $Y(Cr_{0.5}Mn_{0.5})O_3$ and commercially available $Y_2O_3$ (purity: 99.9% or more) are first weighed so that a compounding ratio (molar fraction) of $Y(Cr_{0.5}Mn_{0.5})O_3$ and $Y_2O_3$ becomes 38:62, to make 500 g as the total amount.

When the molar fraction of $Y(Cr_{0.5}Mn_{0.5})O_3$ and that of $Y_2O_3$ are a and b (a+b=1), respectively, a and b correspond to the above compounding molar ratio and, therefore, a=0.38 and b=0.62.

In case of the sintering, $SiO_2$ and $CaCO_3$, which are converted into a liquid phase within the range from 1500 to 1650° C., are used as a sintering auxiliary and $SiO_2$ and $CaCO_3$ are added in an amount of 3% by weight and 4.5% by weight, respectively, based on the total amount (500 g) of the above $Y(Cr_{0.5}Mn_{0.5})O_3$ and $Y_2O_3$ (compounding 2).

In the following grinding step (mixing/grinding in the figure), the above $Y(Cr_{0.5}Mn_{0.5})O_3$, $Y_2O_3$, $SiO_2$ and $CaCO_3$ are charged in a resin pot (volume: 5 liter) containing $Al_2O_3$ or $ZrO_2$ pebbles having a diameter of 15φ (2.5 kg) and pebbles having a diameter of 20φ (2.5 kg), in order to mix these weighed substances. After adding 1500 cc of purified water, the mixture was mixed at 60 rpm for 4 or more hours and then ground.

In the above grinding step, polyvinyl alcohol (PVA) as a binder is added to the solid content of $Y(Cr_{0.5}Mn_{0.5})O_3$ and $Y_2O_3$ in an amount of 1 g per 100 g of a mixed powder of $Y(Cr_{0.5}Mn_{0.5})O_3$ and $Y_2O_3$ while mixing, followed by grinding.

A mixed ground slurry of $Y(Cr_{0.5}Mn_{0.5})O_3$ and $Y_2O_3$ obtained after mixing and grinding is granulated and dried by using a spray dryer to obtain a mixed powder of $Y(Cr_{0.5}Mn_{0.5})O_3$ and $Y_2O_3$. This mixed powder is used as a thermistor raw material.

In the following molding step (molding), using this thermistor raw material and a lead wire (material: Pt100 (pure platinum)) having a size of 0.3 mmφ in outer diameter×10.5 mm in length, the lead wire is inserted and the thermistor raw material is molded in a mold having an outer diameter of 1.74 mmφ under a pressure of about 1000 kgf/cm$^2$ to obtain a molded article of a thermistor element (provided with a lead wire) having an outer diameter of 1.75 mmφ.

In the sintering step, the molded article of the thermistor element is arranged on a corrugated setter made of Al$_2$O$_3$ and then sintered in the air at 1400 to 1600° C. for 1 to 2 hours to obtain a thermistor element having an outer diameter of 1.60 mmφ of a mixed sintered body aY(Cr$_{0.5}$Mn$_{0.5}$)O$_3$.bY$_2$O$_3$.

Figure 2:
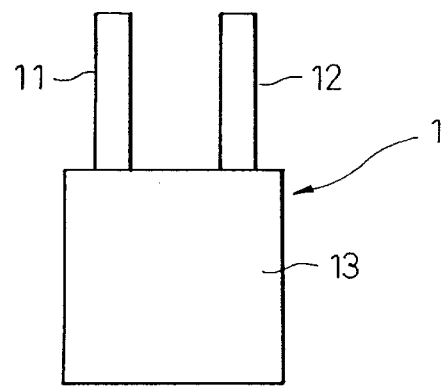
FIG. 2 is a schematic diagram illustrating the thermistor element in Example 1.

The resulting thermistor element 1 is shown in FIG. 2. The respective ends of two parallel lead wires 11, 12 are embedded in a cylindrical element portion 13 having an outer diameter of 1.60 mmφ. This thermistor element 1 is incorporated into a typical temperature sensor shown in FIG. 3 and FIG. 4 to give a temperature sensor.

Figure 3:
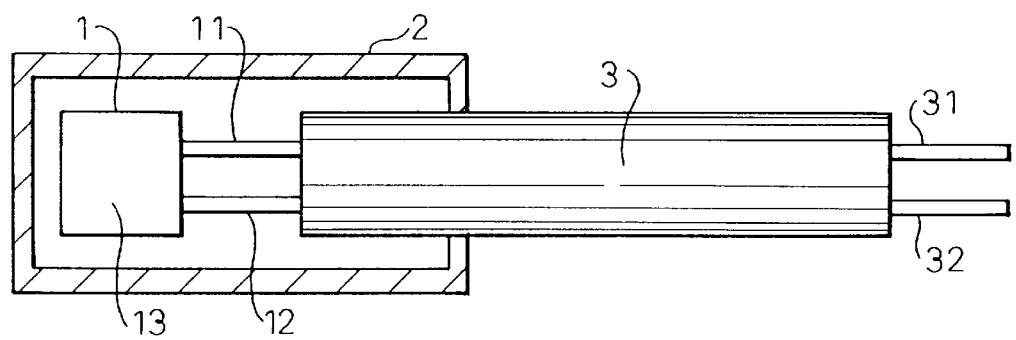
FIG. 3 is a schematic sectional view illustrating a temperature sensor using the thermistor element of FIG. 2.
Figure 4:
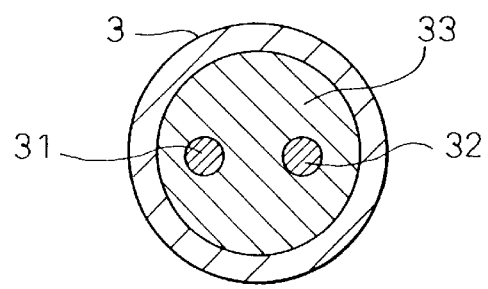
FIG. 4 is a schematic sectional view illustrating a metal pipe of the temperature sensor of FIG. 3.

The thermistor element 1 is disposed in a cylindrical heat-resistant metal case 2, as shown in FIG. 3. The lead wires 11, 12 are respectively connected to lead wires 31, 32 which pass through a metal pipe 3. As shown in FIG. 4, the metal pipe 3 is filled with a magnesia powder 33 to secure the insulating properties of the lead wires 31, 32 in the metal pipe 3. In such way, the temperature sensor is constructed.

In this Example, Examples 2 to 20 and Comparative Examples 1 to 3, thermistor elements and temperature sensors to be made have the same structure as that of thermistor elements and temperature sensors shown in FIG. 2 to FIG. 4 and the description will be omitted. Incidentally, the material composition of a mixed sintered body constituting the element portion 13 varies with each Example, as a matter of course.

Furthermore, in the above second preparation step, Y(Cr$_{0.5}$Mn$_{0.5}$)O$_3$ and Y$_2$O$_3$ are weighed so that a compounding molar ratio Y(Cr$_{0.5}$Mn$_{0.5}$)O$_3$:Y$_2$O$_3$ becomes 95:5 and 5:95. Then, a thermistor element is made in the same procedure as described above and is incorporated into a temperature sensor. The respective elements of this Example are referred to as an element No. 1, an element No. 2 and an element No. 3 in the sequence of the compounding molar ratio (corresponding to a:b) of Y(Cr$_{0.5}$Mn$_{0.5}$)O$_3$ and Y$_2$O$_3$, e.g. 38:62, 95:5 and 5:95.

The temperature sensors made by incorporating the elements No. 1 to No. 3 were put in a high-temperature oven and temperature characteristics of the resistivity were evaluated within the range from room temperature (27° C.,) to 1000° C. The evaluation results are shown in Table 1.

TABLE

<Example 1>

| No. | Raw material composition (mol %) | | Resistivity (kΩ) | | Resistivity temperature coefficient | Change in resistivity |
| --- | --- | --- | --- | --- | --- | --- |
| | Y(Cr$_{0.5}$Mn$_{0.5}$)O$_3$ | Y$_2$O$_3$ | Room temperature (27° C.) | 1000° C. | (K) | (%) |
| 1 | 38 | 62 | 50 | 0.14 | 2450 | −5.0 |
| 2 | 95 | 5 | 30 | 0.10 | 2240 | −4.0 |
| 3 | 5 | 95 | 100 | 0.20 | 2440 | −4.0 |

As shown in Table 1, the wide-range type thermistor element of Example 1 shows low resistivity of 50 to 100 kΩ required as a temperature sensor within the range where the molar fraction (a+b=1) of aY(CrMn)O$_3$.bY$_2$O$_3$ satisfy the relations: 0.05≦a<1 and 0<b≦0.95, and also shows a resistivity temperature coefficient β of 2000 to 4000K, and it is possible to widely control the resistivity and resistivity temperature coefficient. Therefore, it is possible to detect a temperature ranging from room temperature to high temperature of 1000° C.

As is apparent from the results of the high-temperature durability test (change in resistivity), a wide-range type thermistor material having stable characteristics (e.g. small change in resistivity), etc.) can be provided.

Example 2

In Example 2, a mixed sintered body of Y(Cr$_{0.5}$Mn$_{0.5}$)O$_3$.Y$_2$O$_3$ is obtained from (Mn$_{1.5}$Cr$_{1.5}$)O$_4$ and Y$_2$O$_3$. In this Example, since Y of Y$_2$O$_3$ is incorporated into (Mn$_{1.5}$Cr$_{1.5}$)O$_4$ in the solid state, Y is selected as M$^1$ and Cr and Mn are selected as M$^2$ in M$^1$M$^2$O$_3$.

Figure 5:
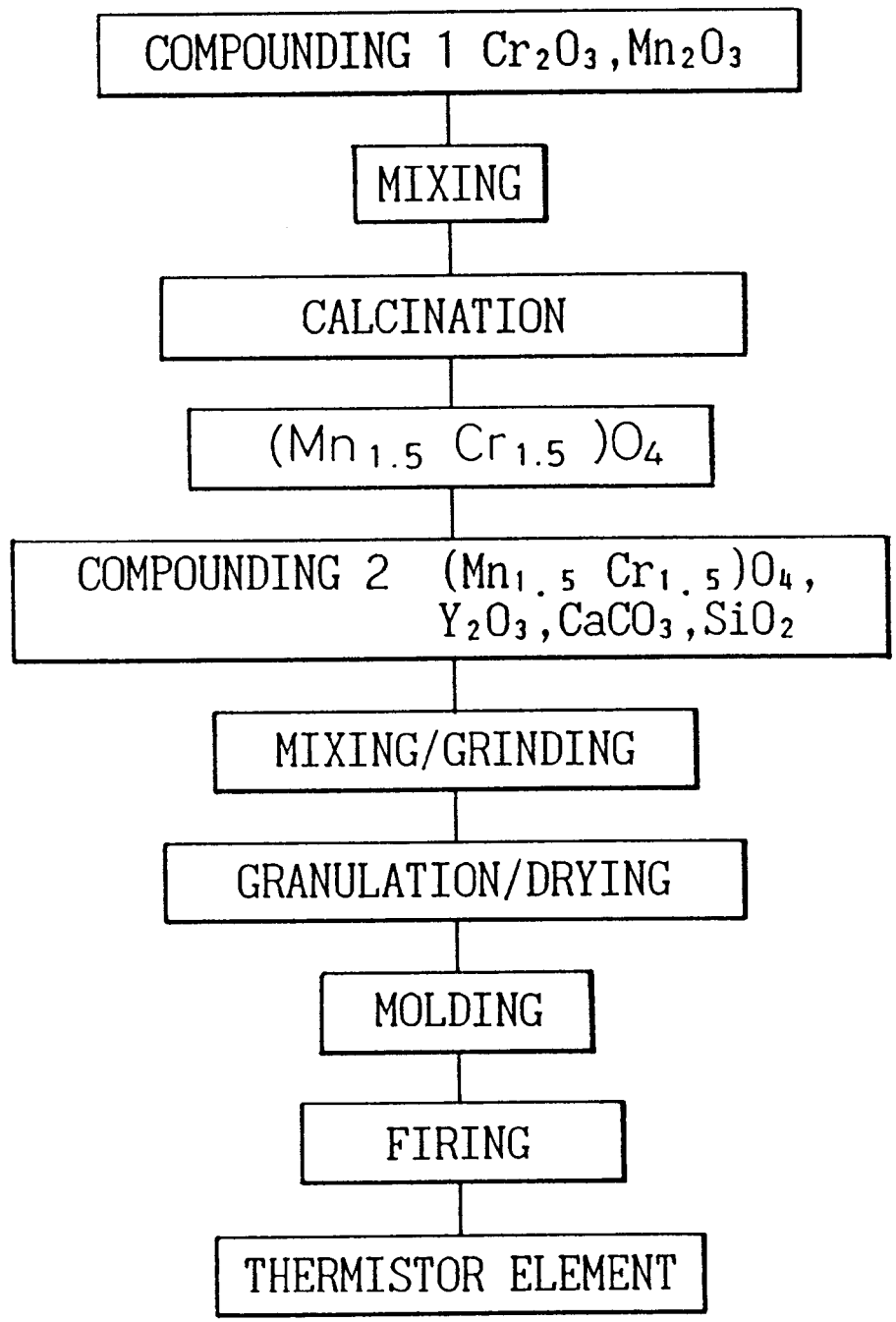
FIGS. 5 to 25 are flow charts illustrating respectively a production step of thermistor elements of Examples 2 to 11 and 15 to 25 of the present invention.

A flow chart illustrating a production step of the thermistor element of Example 2 is shown in FIG. 5. This production step is roughly divided into a first preparation step from compounding 1 to formation of (Mn$_{1.5}$Cr$_{1.5}$)O$_4$, and a second preparation step from compounding (compounding 2) of the resulting (Mn$_{1.5}$Cr$_{1.5}$)O$_4$ and Y$_2$O$_3$ to completion of a thermistor element.

In the first preparation step, Cr$_2$O$_3$ and Mn$_2$O$_3$ (purity of all components is not less than 99.9%) are first prepared and then weighed so that a molar ratio Cr:Mn becomes 1:1 to make 500 g as the total amount (compounding 1).

Subsequently, Cr$_2$O$_3$ and Mn$_2$O$_3$ as compounded are subjected to a treatment such as mixing, drying, grinding, firing, etc. in the same manner as in Example 1 to obtain (Mn$_{1.5}$Cr$_{1.5}$)O$_4$. Then, (Mn$_{1.5}$Cr$_{1.5}$)O$_4$ is roughly ground and passed through a sieve (# 30 mesh) to obtain a powder. As a wide-range type thermistor material, this (Mn$_{1.5}$Cr$_{1.5}$)O$_4$ and Y$_2$O$_3$ as a material for stabilizing the resistivity of the thermistor are used.

In the second preparation step, for the purpose of obtaining the desired resistivity and resistivity temperature coefficient, (Mn$_{1.5}$Cr$_{1.5}$)O$_4$ and Y$_2$O$_3$ are first weighed so that a compounding molar ratio of (Mn$_{1.5}$Cr$_{1.5}$)O$_4$ and Y$_2$O$_3$ becomes 14:86, to make 500 g as the total amount. In the same manner as in Example 1, a sintering auxiliary is added (compounding 2).

Subsequently, (Mn$_{1.5}$Cr$_{1.5}$)O$_4$+Y$_2$O$_3$+SiO$_2$+CaCO$_3$ as compounded are mixed, ground, granulated, dried, molded and sintered in the same manner as in Example 1 to obtain a thermistor element having Y(Cr$_{0.5}$Mn$_{0.5}$)O$_3$ and Y$_2$O$_3$ as an element portion, which is then incorporated into a temperature sensor.

Furthermore, in the above second preparation step, (Mn$_{1.5}$Cr$_{1.5}$)O$_4$ and Y$_2$O$_3$ are weighed so that a compounding molar ratio of (Mn$_{1.5}$Cr$_{1.5}$)O$_4$ and Y$_2$O$_3$ becomes 38:62 and 3:97. Then, a thermistor element is made in the same procedure as described above and is incorporated into a temperature sensor. The respective elements of this Example are referred to as an element No. 4, an element No. 5 and an element No. 6 in the sequence of the compounding molar ratio of (Mn$_{1.5}$Cr$_{1.5}$)O$_4$ and Y$_2$O$_3$, e.g. 14:86, 38:62 and 3:97.

As described above, in this Example, Y of Y$_2$O$_3$ is incorporated into (Mn$_{1.5}$Cr$_{1.5}$)O$_4$ in case of mixing and sintering and excess oxygen atoms are liberated in the air. As a result, aY(Cr$_{0.5}$Mn$_{0.5}$)O$_3$.bY$_2$O$_3$ as a mixed sintered body of perovskite type Y(Cr$_{0.5}$Mn$_{0.5}$)O$_3$ and Y$_2$O$_3$ is obtained.

Therefore, the ratio of the molar fraction a:b of $aY(Cr_{0.5}Mn_{0.5})O_3 \cdot bY_2O_3$ in this Example is slightly larger than a compounding molar ratio of the above $(Mn_{1.5}Cr_{1.5})O_4$ and $Y_2O_3$. For example, even if the compounding molar ratio is 3:97, $a \geq 0.05$ and $b \leq 0.95$. This fact has already confirmed by the examination of the composition and construction of the mixed sintered body by using SEM, EPMA, etc.

Then, the temperature sensors made by incorporating the elements No. 4 to No. 6 were put in a high-temperature oven and temperature characteristics of the resistivity were evaluated within the range from room temperature (27° C.) to 1000° C. in the same manner as in Example 1. The evaluation results are shown in Table 2.

TABLE

<Example 2>

| | Raw material composition (mol %) | | Resistivity (kΩ) | | Resistivity temperature co-efficient | Change in resistivity |
|---|---|---|---|---|---|---|
| No. | $(Cr_{1.5}Mn_{1.5})O_4$ | $Y_2O_3$ | Room temperature (27° C.) | 1000° C. | (K) | (%) |
| 4 | 14 | 86 | 60 | 0.15 | 2350 | −7.0 |
| 5 | 38 | 62 | 40 | 0.11 | 2300 | −5.0 |
| 6 | 3 | 97 | 100 | 0.22 | 2440 | −5.0 |

As shown in Table 2, the wide-range type thermistor element of Example 2 can realize the same effect as that described in Example 1 within the range where the molar fraction (a+b=1) of $aY(Cr_{0.5}Mn_{0.5})O_3 \cdot bY_2O_3$ satisfy the relations: $0.05 \leq a < 1$ and $0 < b \leq 0.95$.

Example 3

In Example 3, a mixed sintered body of $Y(CrMnTi)O_3$ and $Y_2O_3$ is obtained from $Y(Cr_{0.5}Mn_{0.5})O_3$ and $Y_2O_3$. $Y(CrMnTi)O_3$ has a perovskite structure and the composition ratio of each atom is a stoichiometric ratio, e.g. $Y(Cr_{0.45}Mn_{0.45}Ti_{0.1})O_3$. The same rule applies correspondingly to the following each $Y(CrMnTi)O_3$.

In this Example, since Ti of $TiO_2$ is incorporated into $Y(Cr_{0.5}Mn_{0.5})O_3$ in the solid state in case of mixing and sintering, Y is selected as $M^1$ and Cr, Mn and Ti are selected as $M^2$ in $M^1M^2O_3$.

Figure 6:
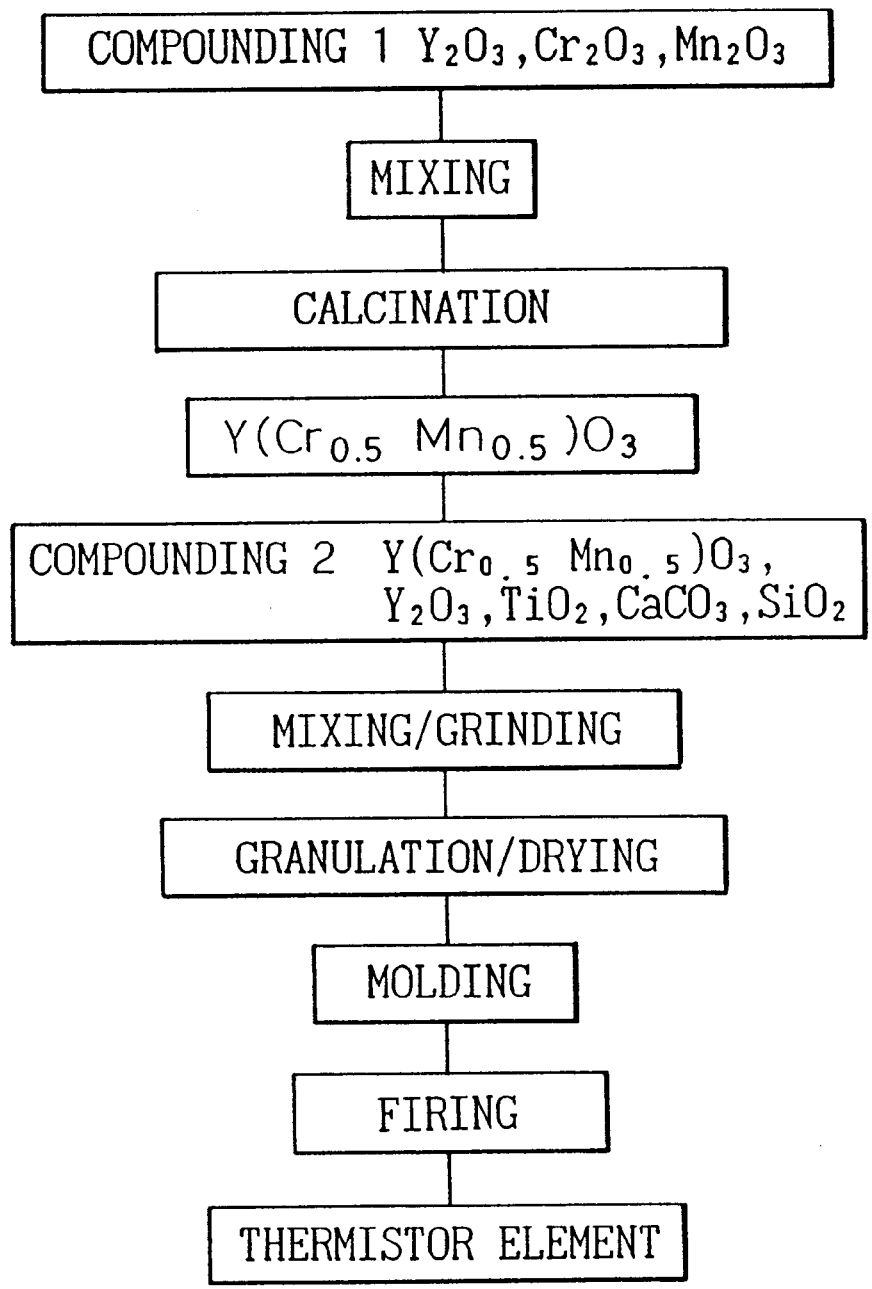

A flow chart illustrating a production step of the thermistor element of Example 3 is shown in FIG. 6. This production step is roughly divided into a first preparation step from compounding 1 to formation of $Y(Cr_{0.5}Mn_{0.5})O_3$, and a second preparation step from compounding (compounding 2) of the resulting $Y(Cr_{0.5}Mn_{0.5})O_3$, $Y_2O_3$ and $TiO_2$ to completion of a thermistor element.

The first preparation step is the same as that of Example 1 and is omitted in this Example. As a wide-range type thermistor material of this Example, this $Y(Cr_{0.5}Mn_{0.5})O_3$, $Y_2O_3$ as a material for stabilizing the resistivity of the thermistor and $TiO_2$ (additive) as a resistance for adjusting the resistivity.

In the second preparation step, for the purpose of obtaining desired resistivity and resistivity temperature coefficient, $Y(Cr_{0.5}Mn_{0.5})O_3$, $Y_2O_3$ and $TiO_2$ are first weighed so that a molar ratio $Y(Cr_{0.5}Mn_{0.5})O_3:Y_2O_3:TiO_2$ becomes 37:59:4 to make 500 g as the total amount (compounding 1). In the same manner as in Example 1, a sintering auxiliary is added (compounding 2).

Subsequently, $Y(Cr_{0.5}Mn_{0.5})O_3 + Y_2O_3 + TiO_2 + SiO_2 + CaCO_3$ are compounded, mixed, ground, granulated, dried, molded and fired in the same manner as in Example 1 to obtain a thermistor element having $Y(CrMnTi)O_3 \cdot Y_2O_3$ as an element portion, which is then incorporated into a temperature sensor.

Furthermore, in the above second preparation step, $Y(Cr_{0.5}Mn_{0.5})O_3$, $Y_2O_3$ and $TiO_2$ are weighed so that a compounding ratio $Y(Cr_{0.5}Mn_{0.5})O_3:Y_2O_3:TiO_2$ becomes 87:5:8 and 5:94.5:0.5. Then, a thermistor element is made in the same procedure as described above and is incorporated into a temperature sensor. The respective elements of this Example are referred to as an element No. 7, an element No. 8 and an element No. 9 in the sequence of the molar ratio $Y(Cr_{0.5}Mn_{0.5})O_3:Y_2O_3:TiO_2$, e.g. 37:59:4, 87:5:8 and 5:94.5:0.5.

The molar fraction (a, b) of $aY(CrMnTi)O_3 \cdot bY_2O_3$ constituting each element of Example 3 is the same as a ratio of $Y(Cr_{0.5}Mn_{0.5})O_3:Y_2O_3$ in the compounding ratio. In this connection, a:b (a+b=1) of the element No. 7, that of the element No. 8 and that of the element No. 9 are 0.39:0.61, 0.95:0.05 and 0.05:0.95, respectively.

Then, the temperature sensors made by incorporating the elements No. 7 to No. 9 were put in a high-temperature oven and temperature characteristics of the resistivity were evaluated within the range from room temperature (27° C.) to 1000° C. in the same manner as in Example 1. The evaluation results are shown in Table 3.

TABLE

<Example 3>

| | Raw material composition (mol %) | | | Resistivity (kΩ) | | Resistivity temperature co-efficient | Change in resistivity |
|---|---|---|---|---|---|---|---|
| No. | $Y(Cr_{0.5}Mn_{0.5})O_3$ | $Y_2O_3$ | $TiO_2$ | Room temperature (27° C.) | 1000° C. | (K) | (%) |
| 7 | 37 | 59 | 4 | 50 | 0.16 | 2250 | −5.0 |
| 8 | 87 | 5 | 8 | 30 | 0.10 | 2240 | −4.0 |
| 9 | 5 | 94.5 | 0.5 | 100 | 0.18 | 2480 | −4.0 |

As shown in Table 3, the wide-range type thermistor element of Example 3 can realize the same effect as that described in Example 1 within the range where the molar fraction (a+b=1) of $aY(CrMnTi)O_3 \cdot bY_2O_3$ satisfy the relations: $0.05 \leq a < 1$ and $0 < b \leq 0.95$.

Example 4

In Example 4, a mixed sintered body of $Y(CrMnTi)O_3 \cdot Y_2O_3$ is obtained from $Y(Cr_{0.5}Mn_{0.5})O_3$, $Y_2O_3$ and $YTiO_3$. In this Example, since Y and Ti of $YTiO_3$ are incorporated into $Y(Cr_{0.5}Mn_{0.5})O_3$ in the solid state in case of mixing and sintering, Y is selected as $M^1$ and Cr, Mn and Ti are selected as $M^2$ in $M^1M^2O_3$.

Figure 7:
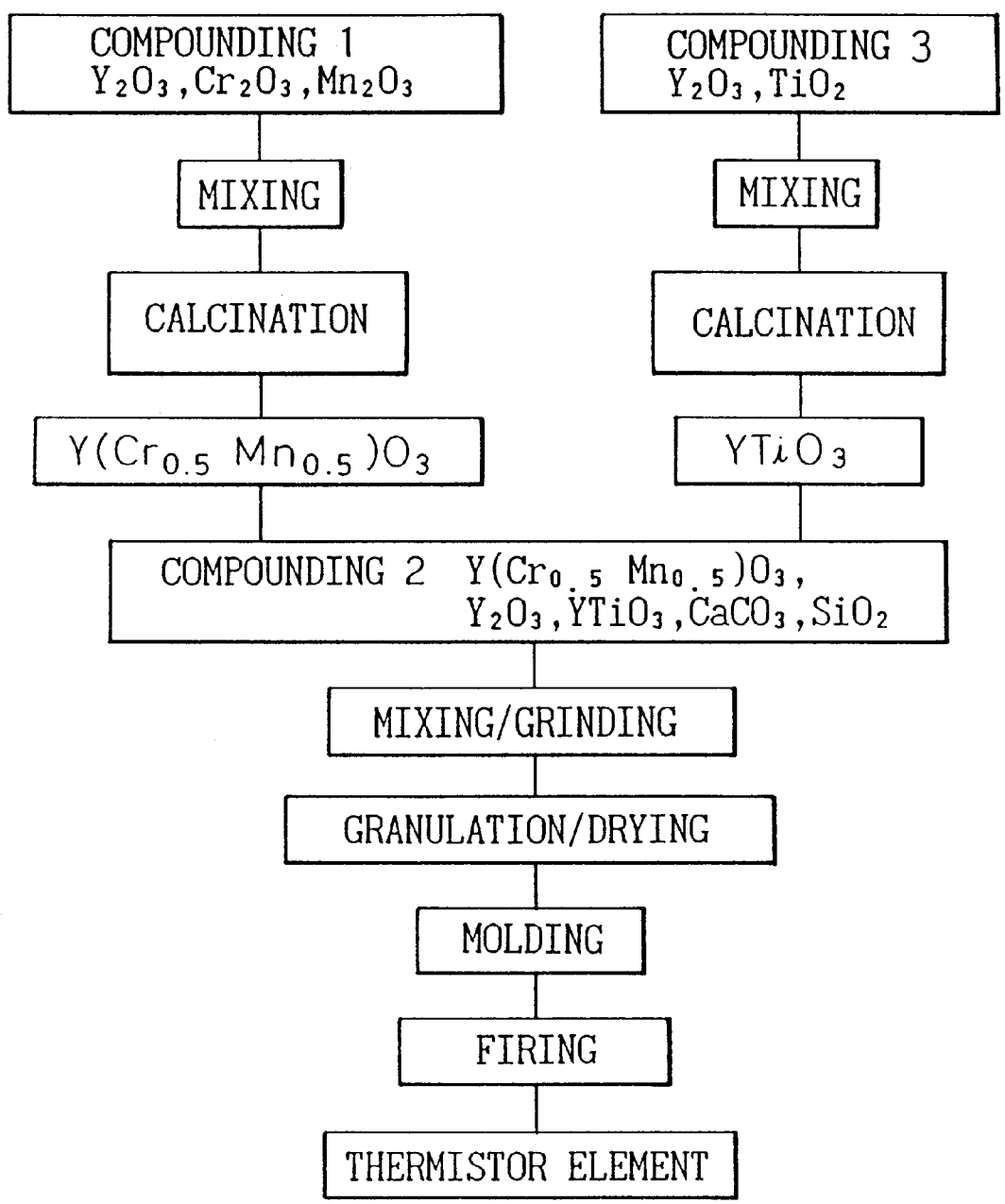

A flow chart illustrating a production step of the thermistor element of Example 4 is shown in FIG. 7. This production step is roughly divided into a first reparation step from compounding 1 to formation of $Y(Cr_{0.5}Mn_{0.5})O_3$, a second preparation step from compounding (compounding 2) of the resulting $Y(Cr_{0.5}Mn_{0.5})O_3$, $Y_2O_3$ and $YTiO_3$ to completion of a thermistor element and a third preparation step of obtaining $YTiO_3$ to be fed to the second preparation step (from compounding 3 to $YTiO_3$ in the figure).

The first preparation step is the same as that of Example 1 and is also omitted in this Example. In the third preparation step, $Y_2O_3$ and $TiO_2$ (purity of all components is not less than 99.9%) are first prepared and then weighed so that a molar ratio of Y:Ti becomes 1:1 to make 500 g as the total amount (compounding 3).

Using a resin pot (volume: 5 liter) containing $Al_2O_3$ or $ZrO_2$ pebbles having a diameter of 15ϕ (2.5 kg) and pebbles having a diameter of 20ϕ (2.5 kg) as a ball mill to mix these weighed substances, the total amount of $Y_2O_3$ and $TiO_2$ is charged in the pot, in order to mix these weighed substances. After adding 1500 cc of purified water, the mixture was mixed at 60 rpm for 6 hours (mixing step).

A mixed slurry of $Y_2O_3$ and $TiO_2$ obtained after a mixing treatment is transferred to a porcelain evaporating dish, and then dried by using a hot-air dryer at 150° C. for 12 hours or more to obtain a mixed solid of $Y_2O_3$ and $TiO_2$. Subsequently, this mixed solid is roughly ground by using a chaser mill and passed through a sieve (# 30 mesh) to obtain a mixed powder of $Y_2O_3$ and $TiO_2$.

In the calcination step, this mixed powder is charged in a crucible made of 99.3% $Al_2O_3$ and then calcined in a high-temperature oven in the air at 1100 to 1300° C. for 1 to 2 hours to obtain $YTiO_3$. $YTiO_3$ as a bulk solid obtained in the calcination was roughly ground by using a chaser mill and passed through a sieve (# 30 mesh) to obtain a powder.

As a wide-range type thermistor material of this Example, $Y(Cr_{0.5}Mn_{0.5})O_3$ obtained in the first preparation step, $Y_2O_3$ and $YTiO_3$ (additive) are used.

In the second preparation step, for the purpose of obtaining desired resistivity and resistivity temperature coefficient, $Y(Cr_{0.5}Mn_{0.5})O_3$, $Y_2O_3$ and $YTiO_3$ are first weighed so that a compounding molar ratio $Y(Cr_{0.5}Mn_{0.5})O_3:Y_2O_3:YTiO_3$ becomes 37:60:3 to make 500 g as the total amount (compounding 1). In the same manner as in Example 1, a sintering auxiliary is added (compounding 2).

Subsequently, $Y(Cr_{0.5}Mn_{0.5})O_3+Y_2O_3+YTiO_3+SiO_2+CaCO_3$ are compounded, mixed, ground, granulated, dried, molded and fired in the same manner as in Example 1 to obtain a thermistor element having $Y(CrMnTi)O_3 \cdot Y_2O_3$ as an element portion, which is then incorporated into a temperature sensor.

Furthermore, in the above second preparation step, $Y(Cr_{0.5}Mn_{0.5})O_3$, $Y_2O_3$ and $YTiO_3$ are weighed so that a compounding ratio of $Y(Cr_{0.5}Mn_{0.5})O_3:Y_2O_3:YTiO_3$ becomes 87:6:3 and 5:94.7:0.3. Then, a thermistor element is made in the same procedure as described above and is incorporated into a temperature sensor. The respective elements of this Example are referred to as an element No. 10, an element No. 11 and an element No. 12 in the sequence of the molar ratio $Y(Cr_{0.5}Mn_{0.5})O_3:Y_2O_3:YTiO_3$, e.g. 37:60:3, 87:6:3 and 5:94.7:0.3.

In each element of Example 4, since incorporation of Y and Ti of $YTiO_3$ in the solid state arises, as described above, the molar fraction (a, b) of $aY(CrMnTi)O_3 \cdot bY_2O_3$ in each element is slightly larger than a ratio of $Y(Cr_{0.5}Mn_{0.5})O_3:Y_2O_3$ in the compounding molar ratio, but is almost the same.

Then, the temperature sensors made by incorporating the elements No. 10 to No. 12 were put in a high-temperature oven and temperature characteristics of the resistivity were evaluated within the range from room temperature (27° C.) to 1000° C. in the same manner as in Example 1. The evaluation results are shown in Table 4.

TABLE

<Example 4>

| | Raw material composition (mol %) | | | Resistivity (kΩ) | | Resistivity temperature coefficient (K) | Change in resistivity (%) |
|---|---|---|---|---|---|---|---|
| No. | $Y(Cr_{0.5}Mn_{0.5})O_3$ | $Y_2O_3$ | $YTiO_3$ | Room temperature (27° C.) | 1000 ° C. | | |
| 10 | 37 | 60 | 3 | 50 | 0.17 | 2230 | −5.0 |
| 11 | 87 | 6 | 3 | 30 | 0.11 | 2200 | −4.0 |
| 12 | 5 | 94.7 | 0.3 | 100 | 0.20 | 2440 | −4.0 |

As shown in Table 4, the wide-range type thermistor element of Example 4 can realize the same effect as that described in Example 1 within the range where the molar fraction (a+b=1) of $aY(CrMnTi)O_3 \cdot bY_2O_3$ satisfy the relations: $0.05 \leq a < 1$ and $0 < b \leq 0.95$.

Example 5

In Example 5, a mixed sintered body of $Y(CrMnTi)O_3 \cdot Y_2O_3$ is obtained from $(Mn_{1.5}Cr_{1.5})O_4$, $Y_2O_3$ and $TiO_2$. In this Example, since Y of $Y_2O_3$ and Ti of $TiO_2$ are incorporated into $(Mn_{1.5}Cr_{1.5})O_4$ in the solid state in case of mixing and sintering, Y is selected as $M^1$ and Cr, Mn and Ti are selected as $M^2$ in $M^1M^2O_3$.

Figure 8:
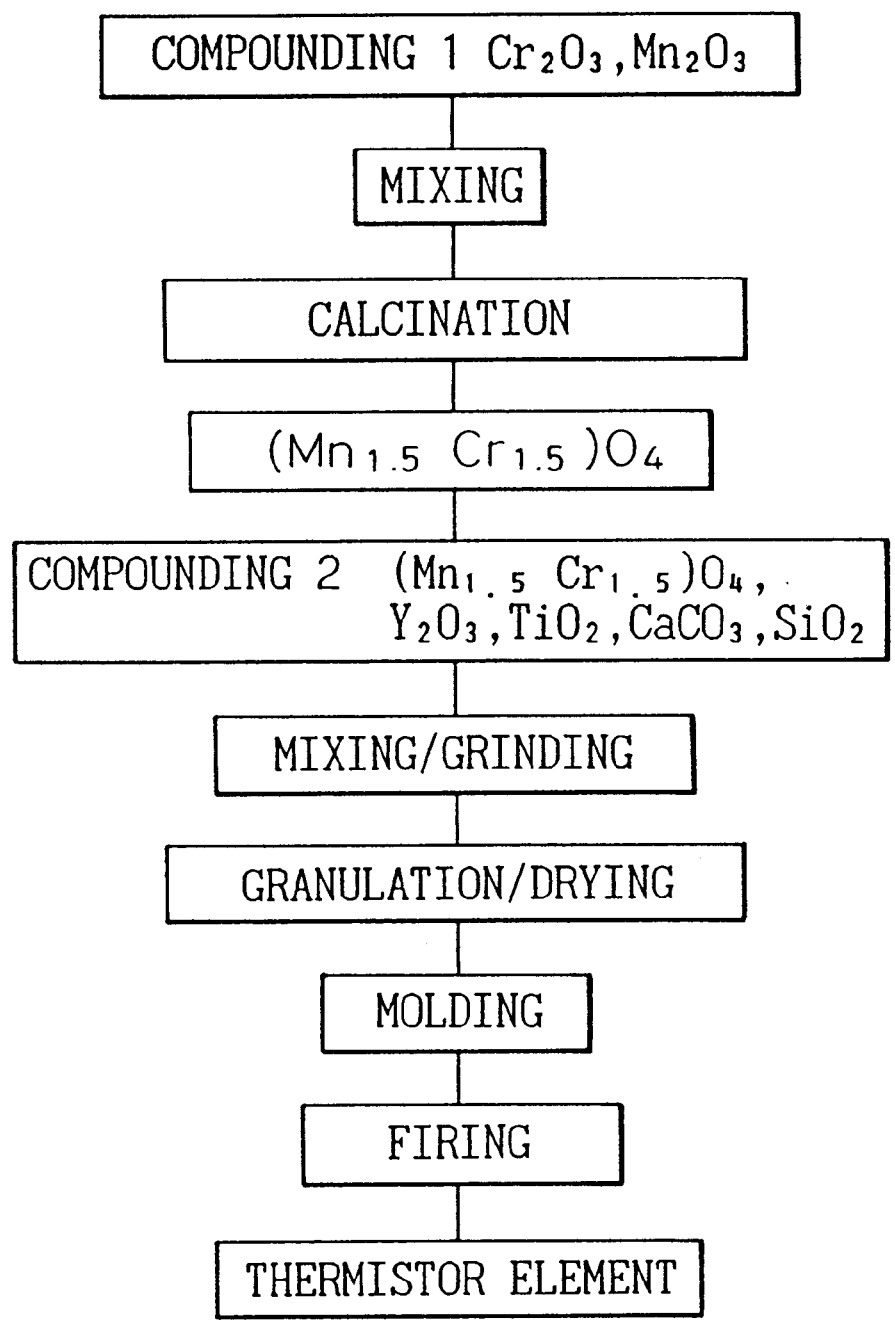
Figure 9:
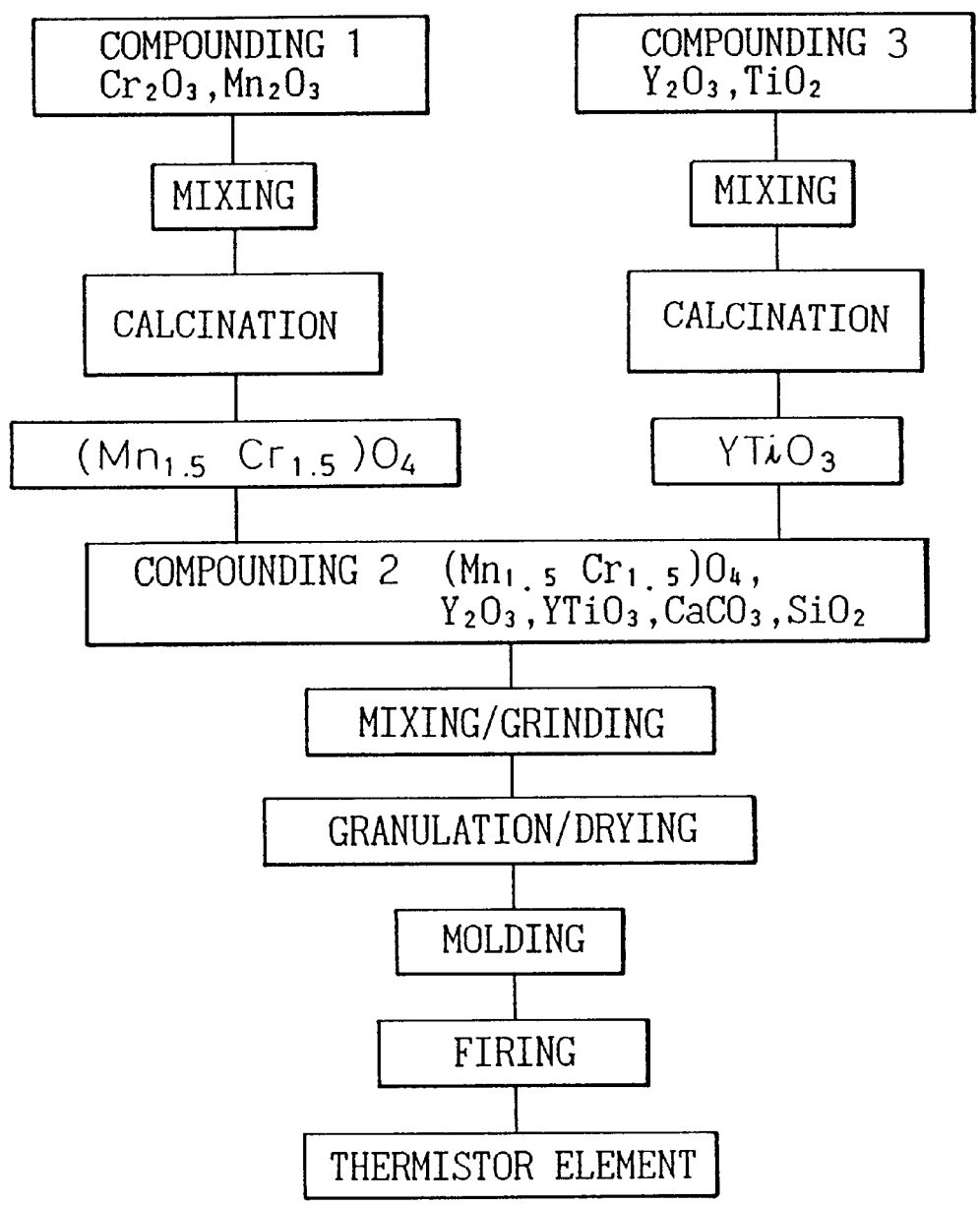

A flow chart illustrating a production step of the thermistor element of Example 5 is shown in FIG. 8. This production step is roughly divided into a first preparation step from compounding 1 to formation of $(Mn_{1.5}Cr_{1.5})O_4$ and a second preparation step from compounding (compounding 2) of the resulting $(Mn_{1.5}Cr_{1.5})O_4$, $Y_2O_3$ and $TiO_2$ to completion of a thermistor element.

The first preparation step is the same as that of Example 2 and is omitted in this Example. As a wide-range type thermistor material of this Example, the above $(Mn_{1.5}Cr_{1.5})O_4$, $Y_2O_3$ and $TiO_2$ (additive) are used.

In the second preparation step, for the purpose of obtaining desired resistivity and resistivity temperature coefficient, $(Mn_{1.5}Cr_{1.5})O_4$, $Y_2O_3$ and $TiO_2$ are first weighed so that a compounding molar ratio of $(Mn_{1.5}Cr_{1.5})O_4:Y_2O_3:TiO_2$ becomes 12:84:4, to make 500 g as the total amount. In the same manner as in Example 1, a sintering auxiliary is added (compounding 2).

Subsequently, $(Mn_{1.5}Cr_{1.5})O_4+Y_2O_3+TiO_2+SiO_2+CaCO_3$ are compounded, mixed, ground, granulated, dried, molded and calcined in the same manner as in Example 1 to obtain a thermistor element having $Y(CrMnTi)O_3 \cdot Y_2O_3$ as an element portion, which is then incorporated into a temperature sensor.

Furthermore, in the above second preparation step, $(Mn_{1.5}Cr_{1.5})O_4$, $Y_2O_3$ and $TiO_2$ are weighed so that a compounding molar ratio of $(Mn_{1.5}Cr_{1.5})O_4:Y_2O_3:TiO_2$ becomes 36:61:3 and 4:95.7:0.3. Then, a thermistor element is made in the same procedure as described above and is incorporated into a temperature sensor. The respective elements of Example 5 are referred to as an element No. 13, an element No. 14 and an element No. 15 in the sequence of the compounding molar ratio $(Mn_{1.5}Cr_{1.5})O_4:Y_2O_3:TiO_2$, e.g. 12:84:4, 36:61:3 and 4:95.7:0.3.

As described above, in Example 5, Y of $Y_2O_3$ and Ti of $TiO_2$ are incorporated into $(Mn_{1.5}Cr_{1.5})O_4$ in the solid state in case of mixing and sintering and excess oxygen atoms are liberated in the air. As a result, $aY(CrMnTi)O_3.bY_2O_3$ as a mixed sintered body of perovskite type $Y(CrMnTi)O_3$ and $Y_2O_3$.

Therefore, the ratio of the molar fraction a:b of $aY(CrMnTi)O_3.bY_2O_3$ in Example 5 is slightly larger than a compounding molar ratio of the above $(Mn_{1.5}Cr_{1.5})O_4:Y_2O_3$. For example, even if the compounding molar ratio is 4:95.7, $a \geq 0.05$ and $b \leq 0.95$. This fact has already confirmed by the examination of the composition and construction of the mixed sintered body by using SEM, EPMA, etc.

Then, the temperature sensors made by incorporating the elements No. 13 to No. 15 were put in a high-temperature oven and temperature characteristics of the resistivity were evaluated within the range from room temperature (27° C.) to 1000° C. in the same manner as in Example 1. The evaluation results are shown in Table 5.

TABLE

<Example 5>

| No. | Raw material composition (mol %) | | | Resistivity (kΩ) Room temperature (27° C.) | 1000 ° C. | Resistivity temperature coefficient (K) | Change in resistivity (%) |
|---|---|---|---|---|---|---|---|
| | $(Cr_{1.5}Mn_{1.5})O_4$ | $Y_2O_3$ | $TiO_2$ | | | | |
| 13 | 12 | 84 | 4 | 60 | 0.15 | 2350 | −5.0 |
| 14 | 36 | 61 | 3 | 40 | 0.11 | 2300 | −4.0 |
| 15 | 4 | 95.7 | 0.3 | 100 | 0.22 | 2400 | −4.0 |

As shown in Table 5, the wide-range type thermistor element of Example 5 can realize the same effect as that described in Example 1 within the range where the molar fraction (a+b=1) of $aY(CrMnTi)O_3.bY_2O_3$ satisfy the relations: $0.05 \leq a < 1$ and $0 < b \leq 0.95$.

Example 6

In Example 6, a mixed sintered body of $Y(CrMnTi)O_3.Y_2O_3$ is obtained from $(Mn_{1.5}Cr_{1.5})O_4$, $Y_2O_3$ and $YTiO_3$. In this Example, since Y and Ti of $YTiO_3$ are incorporated into $(Mn_{1.5}Cr_{1.5})O_4$ in the solid state in case of mixing and sintering, Y is selected as $M^1$ and Cr, Mn and Ti are selected as $M^2$ in $M^1M^2O_3$.

Figure 14:
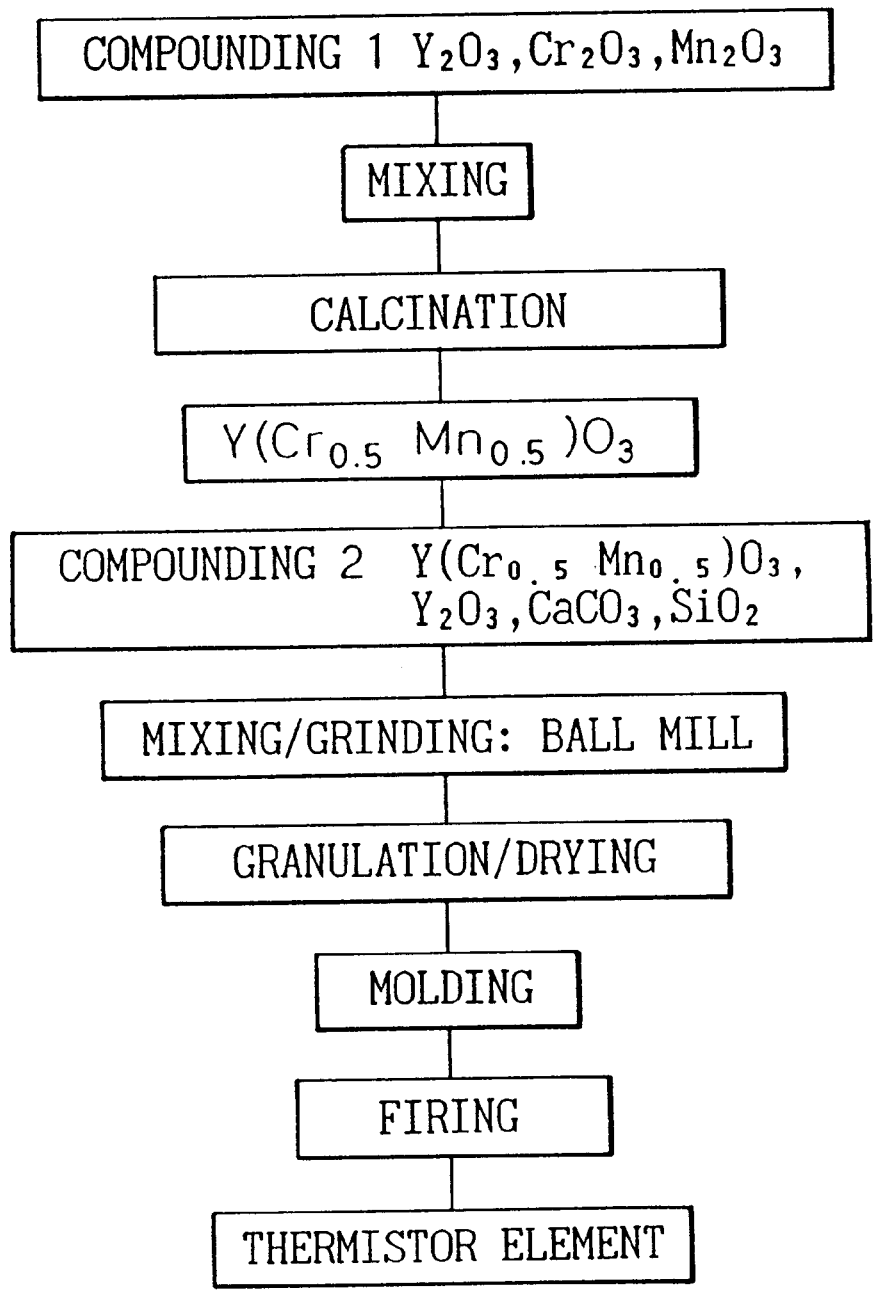

A flow chart illustrating a production step of the thermistor element of Example 6 is shown in FIG. 14. This production step is roughly divided into a first preparation step from compounding 1 to formation of $(Mn_{1.5}Cr_{1.5})O_4$, a second preparation step from compounding (compounding 2) of the resulting $(Mn_{1.5}Cr_{1.5})O_4$, $Y_2O_3$ and $YTiO_3$ to completion of a thermistor element and a third preparation step of obtaining $YTiO_3$ to be fed to the second preparation step (from compounding 3 to $YTiO_3$ in the figure).

The first preparation step is the same as that of Example 2 and is omitted in this Example. As a wide-range type thermistor material of this Example, $(Mn_{1.5}Cr_{1.5})O_4$ obtained in the first preparation step, $Y_2O_3$ and $YTiO_3$ (additive) obtained in the third preparation step are used.

In the second preparation step, for the purpose of obtaining desired resistivity and resistivity temperature coefficient, $(Mn_{1.5}Cr_{1.5})O_4$, $Y_2O_3$ and $YTiO_3$ are first weighed so that a compounding molar ratio of $(Mn_{1.5}Cr_{1.5})O_4$, $Y_2O_3$ and $YTiO_3$ becomes 13:84:3, to make 500 g as the total amount. In the same manner as in Example 1, a sintering auxiliary is added (compounding 2).

Subsequently, $(Mn_{1.5}Cr_{1.5})O_4 + Y_2O_3 + YTiO_3 + SiO_2 + CaCO_3$ are compounded, mixed, ground, granulated, dried, molded and calcined in the same manner as in Example 1 to obtain a thermistor element having $Y(CrMnTi)O_3.Y_2O_3$ as an element portion, which is then incorporated into a temperature sensor.

Furthermore, in the above second preparation step, $(Mn_{1.5}Cr_{1.5})O_4$, $Y_2O_3$ and $YTiO_3$ are weighed so that a compounding molar ratio of $(Mn_{1.5}Cr_{1.5})O_4$, $Y_2O_3$ and $YTiO_3$ becomes 37:61:2 and 4:95.8:0.2. Then, a thermistor element is made in the same procedure as described above and is incorporated into a temperature sensor.

The respective elements of Example 6 are referred to as an element No. 16, an element No. 17 and an element No. 18 in the sequence of the compounding molar ratio of $Y(Cr_{1.5}Mn_{1.5})O_4:Y_2O_3:YTiO_3$, e.g. 13:84:3, 37:61:2 and 4:95.8:0.2.

As described above, in Example 6, Y of $Y_2O_3$ and Ti of $YTiO_3$ are incorporated into $(Mn_{1.5}Cr_{1.5})O_4$ in the solid state in case of mixing and sintering and excess oxygen atoms are liberated into the air. As a result, $aY(CrMnTi)O_3.bY_2O_3$ as a mixed sintered body of a perovskite type $Y(CrMnTi)O_3$ and $Y_2O_3$.

Therefore, the ratio of the molar fraction a:b of $aY(CrMnTi)O_3.bY_2O_3$ in Example 6 is slightly larger than a compounding molar ratio of the above $(Mn_{1.5}Cr_{1.5})O_4:Y_2O_3$. For example, even if the compounding molar ratio is 4:95.8, $a \geq 0.05$ and $b \leq 0.95$. This fact has already confirmed by the examination of the composition and construction of the mixed sintered body by using SEM, EPMA, etc.

Then, the temperature sensors made by incorporating the elements No. 16 to No. 18 were put in a high-temperature oven and temperature characteristics of the resistivity were evaluated within the range from room temperature (27° C.) to 1000° C. in the same manner as in Example 1. The evaluation results are shown in Table 6.

TABLE

<Example 6>

| No. | Raw material composition (mol %) | | | Resistivity (kΩ) Room temperature (27° C.) | 1000 ° C. | Resistivity temperature coefficient (K) | Change in resistivity (%) |
|---|---|---|---|---|---|---|---|
| | $(Cr_{1.5}Mn_{1.5})O_4$ | $Y_2O_3$ | $YTiO_3$ | | | | |
| 16 | 13 | 84 | 3 | 58 | 0.15 | 2340 | −5.0 |
| 17 | 37 | 61 | 2 | 35 | 0.11 | 2260 | −4.0 |
| 18 | 4 | 95.8 | 0.2 | 100 | 0.20 | 2440 | −4.0 |

As shown in Table 6, the wide-range type thermistor element of Example 6 can realize the same effect as that described in Example 1 within the range where the molar fraction (a+b=1) of $aY(CrMnTi)O_3.bY_2O_3$ satisfy the relations: $0.05 \leq a < 1$ and $0 < b \leq 0.95$.

Comparative Example 1

As Comparative Example 1, a temperature sensor using a thermistor element having the composition of $Y(Cr_{0.5}Mn_{0.5})O_3$ alone without using $Y_2O_3$ for stabilizing the resistivity will be described.

In the same manner as in Example 1, $Y(Cr_{0.5}Mn_{0.5})O_3$ is obtained. A temperature sensor using $Y(Cr_{0.5}Mn_{0.5})O_3$ prepared as a raw material was evaluated. The results are shown in Table 7. The resistivity characteristics were evaluated in the same manner as in Example 1.

TABLE

<Example 7>

| Composition of element portion | Resistivity (kΩ) | | Resistivity temperature coefficient (K) | Change in resistivity (%) | |
|---|---|---|---|---|---|
| | Room temperature (27° C.) | 1000° C. | | | |
| $Y(Cr_{0.5}Mn_{0.5})O_3$ | 10 | 0.05 | 2080 | −20.0 | Comparative Example 1 |
| $YTiO_3$ | >1000 | 0.2 | 12200 | −40.0 | Comparative Example 2 |

As is apparent from Table 7, in case that $Y_2O_3$ for stabilizing the resistivity is not used, the resistivity at high temperature range (e.g. 1000° C., etc.) is too low and, therefore, the temperature cannot be detected. As is also apparent from the results of the high-temperature durability test (change in resistivity), the change in resistivity ΔR exceeds ±20% and, therefore, a wide-range thermistor element having stable characteristics can not be provided.

Accordingly, the thermistor element having the composition of $Y(Cr_{0.5}Mn_{0.5})O_3$ alone in Comparative Example 1 cannot be used as the element of the desired temperature sensor of the present invention.

Comparative Example 2

As Comparative Example 2, a temperature sensor using a thermistor element having the composition of $YTiO_3$ alone without using $Y_2O_3$ for stabilizing the resistivity will be described.

In the same manner as in Example 4, $YTiO_3$ is obtained. A temperature sensor using $YTiO_3$ prepared as a raw material was evaluated. The results are shown in Table 7. The resistivity characteristics were evaluated in the same manner as in Example 1.

As is apparent from Table 7, in the thermistor element having the composition of $YTiO_3$ alone, the resistivity at low temperature range (e.g. 27° C., etc.) is remarkably large (e.g. 1000 kΩ or more), etc.) and, therefore, the temperature cannot be detected. As is also apparent from the results of the high-temperature durability test, the change in resistivity ΔR exceeds ±20% and, therefore, a wide-range thermistor element having stable characteristics cannot be provided. Accordingly, the thermistor element having the composition of $YTiO_3$ alone can not be used as the element of the desired temperature sensor of the present invention.

Example 7

Figure 10:
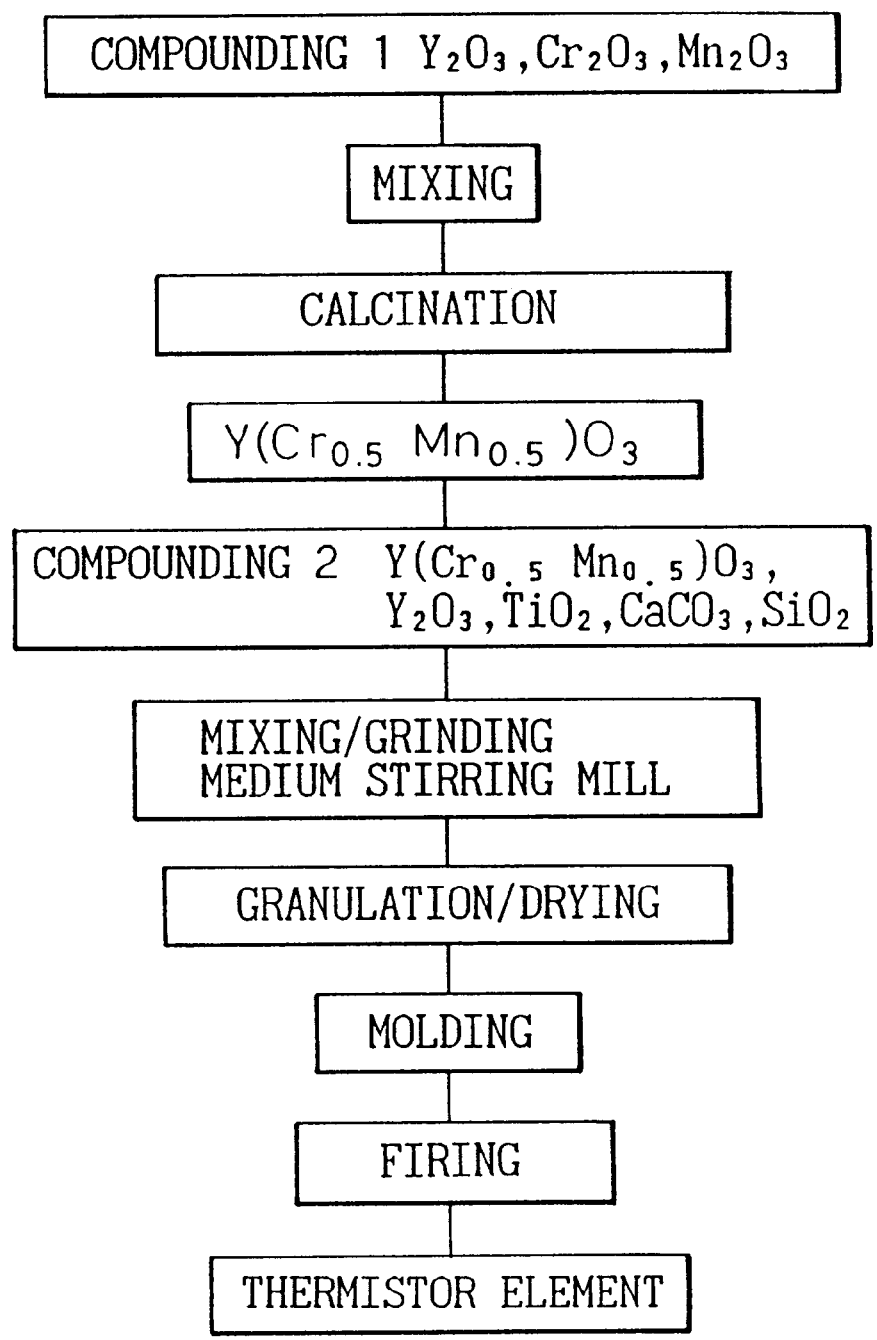

In Example 7, as the raw material for obtaining a mixed sintered body ($M^1$=Y, $M^2$=Cr, Mn) of $Y(Cr_{0.5}Mn_{0.5})O_3$ and $Y_2O_3$, $Y(Cr_{0.5}Mn_{0.5})O_3$ is first prepared. A flow chart illustrating a production step of the thermistor element of Example 7 is shown in FIG. 10. This Example relates to a production method according to the above second aspect.

As the starting material, $Y_2O_3$, $Cr_2O_3$ and $Mn_2O_3$, high purity (99.9%) raw materials are used. The average particle diameter of $Y_2O_3$, that of $Cr_2O_3$ and that of $Mn_2O_3$ are 1.0 μm, 2.0 to 4.0 μm and 7.0 to 15.0 μm, respectively. The average particle diameters of the respective raw materials were the same as those in the following Examples 8 to 20 as well as Comparative Examples 1 and 2.

In the first preparation step (from compounding 1 to $Y(Cr_{0.5}Mn_{0.5})O_3$ in the figure), $Y_2O_3$ (268.8 g), $Cr_2O_3$ (101 g) and $Mn_2O_3$ (104 g) are weighed so that a molar ratio (Y:Cr:Mn) becomes 2:1:1 (compounding 1).

Using a resin pot (volume: 5 liter) containing $Al_2O_3$ or $ZrO_2$ pebbles having a diameter of 15φ (2.5 kg) and pebbles having a diameter of 20φ (2.5 kg) as a ball mill to mix these weighed substances, $Y_2O_3$, $Cr_2O_3$ and $Mn_2O_3$ are charged in the pot, in order to mix these weighed substances. After adding 1500 cc of purified water, the mixture was mixed at 60 rpm for 4 hour (mixing step).

A mixed slurry of $Y_2O_3$, $Cr_2O_3$ and $Mn_2O_3$ obtained after a mixing treatment is transferred to a porcelain evaporating dish, and then dried by using a hot-air dryer at 100 to 150° C. for 12 to 17 hours to obtain a mixed solid of $Y_2O_3$, $Cr_2O_3$ and $Mn_2O_3$. Subsequently, this mixed solid is roughly ground by using a chaser mill and passed through a sieve (# 30 mesh) to obtain a mixed powder of $Y_2O_3$, $Cr_2O_3$ and $Mn_2O_3$.

In the temporary calcination step, the mixed powder of $Y_2O_3$, $Cr_2O_3$ and $Mn_2O_3$ is charged in a crucible made of 99.3% $Al_2O_3$ and then heat-treated in a high-temperature oven in an atmosphere under a normal pressure at 1100° C. for 2 hours to obtain $Y(Cr_{0.5}Mn_{0.5})O_3$. $Y(Cr_{0.5}Mn_{0.5})O_3$ as a bulk solid obtained in the calcination was roughly ground by using a chaser mill and passed through a sieve (# 30 mesh) to obtain a powder.

The above $Y(Cr_{0.5}Mn_{0.5})O_3$ and $Y_2O_3$ are used as the thermistor material.

In the second preparation step (starting from compounding 2 in the figure), for the purpose of obtaining desired resistivity and resistivity temperature coefficient, $Y(Cr_{0.5}Mn_{0.5})O_3$ (average particle diameter: 2 to 5 μm, 1560 g) and $Y_2O_3$ (average particle diameter: 1.0 μm, 440 g) are first weighed so that a compounding molar ratio of $Y(Cr_{0.5}Mn_{0.5})O_3$ and $Y_2O_3$ becomes 100:22, to make 2000 g as the total amount.

In case of the firing, $SiO_2$ and $CaCO_3$, which are converted into a liquid phase within the range from 1500 to 1650° C., are used as a sintering auxiliary and $SiO_2$ and $CaCO_3$ are added in an amount of 3% by weight (60 g) and 4.5% by weight (90 g), respectively, based on the total amount (2000 g) of the above $Y(Cr_{0.5}Mn_{0.5})O_3$ and $Y_2O_3$ (compounding 2).

Accordingly, 2150 g of the total of $Y(Cr_{0.5}Mn_{0.5})O_3$, $Y_2O_3$, $SiO_2$ and $CaCO_3$ is used as a ground raw material.

In the following grinding step (mixing/grinding in the figure), a pearl mill device (manufactured by Ashizawa Co., Ltd., RV1V, effective volume: 1.0 liter, actual volume: 0.5 liter) is used as a medium stirring mill to granulate thermistor raw materials. Regarding the operation conditions of this pearl mill device, 3.0 kg of zirconia balls having a diameter of 0.5 mm are used as a grinding medium and 80% of the volume of a stirring vessel are filled with zirconia balls.

The operation conditions are as follows: circumferential rate: 12 m/sec, revolution: 3110 rpm. Using 4.5 liter of distilled water as a dispersing medium relative to 2150 g of the raw material, a binder, a releasant and a dispersant are added, followed by mixing and grinding for 10 hours. As the binder, polyvinyl alcohol (PVA) is added in an amount of 1 g per 100 g of the ground raw material.

The raw slurry of the thermistor material subjected to the grinding treatment was evaluated by using a laser type granulometer. As a result, the average particle diameter was 0.4 $\mu$m (micron meter). This average particle diameter is smaller than the average particle diameter 1.0 $\mu$m of $Y_2O_3$.

The raw slurry of the resulting thermistor material is granulated and dried under the conditions of a drying chamber inlet temperature of 200° C. and an outlet temperature of 120° C. by using a spray drier. The resulting granulated powders of the thermistor material are spherical powders having an average particle diameter of 30 $\mu$m, and molding of the thermistor element is performed by using these granulated powders.

The molding step is performed by a molding method. Pt100 (0.3$\phi$×10.5) as a lead wire is put in a male mold and a granulated powder is charged in a female mold of 1.74$\phi$, and then molding is performed under a pressure of about 1000 kgf/cm² to obtain a molded article of a thermistor element provided with a lead wire. In the firing step, the molded article of the thermistor element is arranged on a corrugated setter made of $Al_2O_3$ and then fired in the air at 1500 to 1600° C. for 1 to 2 hours to obtain a thermistor element.

The resulting thermistor element and temperature sensor have the same structure as that of thermistor elements and temperature sensors shown in FIG. 2 to FIG. 4.

The evaluation results of the resulting temperature sensor are shown in Table 8.

TABLE

<Example 8>

| | Raw material component in case of grinding | Average particle diameter after grinding($\mu$m) | Temperature accuracy (° C.) |
|---|---|---|---|
| Example 7 | Y(CrMn)O$_3$, Y$_2$O$_3$ | 0.4 | ±10 |
| Example 8 | (Mn$_{1.5}$Cr$_{1.5}$)O$_4$, Y$_2$O$_3$ | 0.5 | ±10 |
| Example 9 | Y(CrMn)O$_3$, Y$_2$O$_3$, TiO$_2$ | 0.4 | ±8.0 |
| Example 10 | (Mn$_{1.5}$Cr$_{1.5}$)O$_4$, Y$_2$O$_3$, TiO$_2$ | 0.5 | ±8.0 |
| Example 11 | Y(CrMn)O$_3$, Y$_2$O$_3$ | 2.7 | ±25 |
| Example 12 | (Mn$_{1.5}$Cr$_{1.5}$)O$_4$, Y$_2$O$_3$ | 2.7 | ±30 |
| Example 13 | Y(CrMn)O$_3$, Y$_2$O$_3$, TiO$_2$ | 3.0 | ±25 |
| Example 14 | (Mn$_{1.5}$Cr$_{1.5}$)O$_4$, Y$_2$O$_3$, TiO$_2$ | 3.0 | ±25 |

In Table 8, Y(CrMn)O$_3$ represents Y(Cr$_{0.5}$Mn$_{0.5}$)O$_3$. The raw material component in case of grinding represents a raw material component in the grinding step of the second preparation step (Y(Cr$_{0.5}$Mn$_{0.5}$)O$_3$ and Y$_2$O$_3$ in this Example) and the average particle diameter ($\mu$m) after grinding represents an average particle diameter of a raw slurry after grinding of the second preparation step (0.4 $\mu$m in this Example). The same rule applies correspondingly to the following Examples 8 to 14.

Regarding the temperature sensor of Example 7, a temperature accuracy of ±10° C. can be obtained.

As described in the above second aspect, the evaluation method of the temperature accuracy is as follows.

That is, a standard deviation σ (sigma) of the resistivity at 350° C. is calculated from resistivity-temperature data of 100 temperature sensors. Using 6σ (standard deviation) as a scatter width (two sides), a value A obtained by dividing the value, calculated by this scatter width of the resistivity based on the temperature, by 2 is represented as "temperature accuracy±A° C." and the accuracy is evaluated.

Example 8

Figure 11:
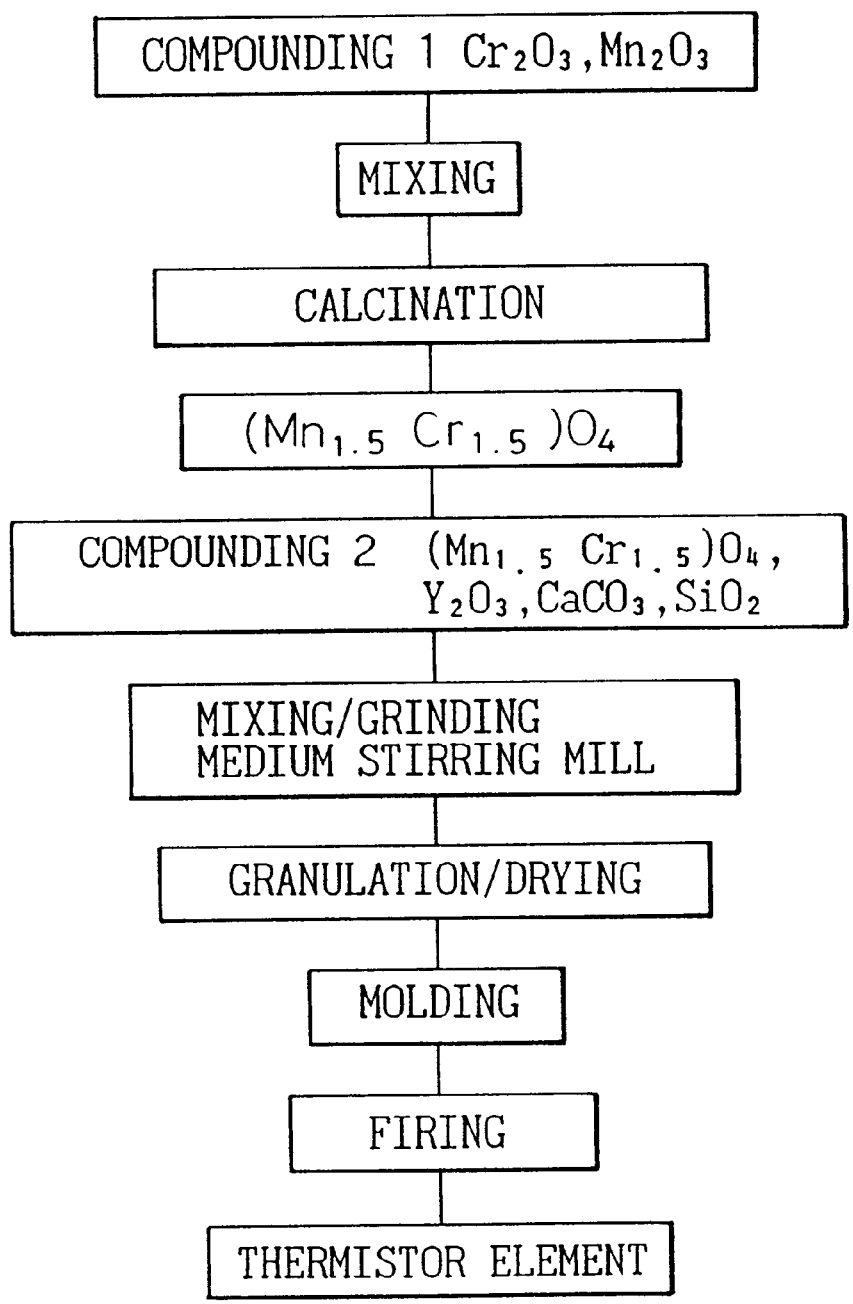

In Example 8, as the raw material for obtaining a mixed sintered body (M¹=Y, M²=Cr, Mn) of Y(Cr$_{0.5}$Mn$_{0.5}$)O$_3$ and Y$_2$O$_3$, (Mn$_{1.5}$Cr$_{1.5}$)O$_4$ obtained by calcining a mixture of an oxide of Cr and an oxide of Mn at 1000° C. or more is first prepared. A flow chart illustrating a production step of the thermistor element of Example 8 is shown in FIG. 11. This Example relates to a production method according to the above second embodiment.

In the first preparation step (from compounding 1 to (Mn$_{1.5}$Cr$_{1.5}$)O$_4$ in the figure), Cr$_2$O$_3$ (101 g) and Mn$_2$O$_3$ (104 g) are weighed so that a molar ratio (Cr:Mn) becomes 1:1 (compounding 1).

These Cr$_2$O$_3$ and Mn$_2$O$_3$ are mixed (6 hours), dried, ground and heat-treated in the same manner as in Example 7 to obtain (Mn$_{1.5}$Cr$_{1.5}$)O$_4$. (Mn$_{1.5}$Cr$_{1.5}$)O$_4$ as a bulk solid obtained by the heat treatment was roughly ground by using a chaser mill and passed through a sieve (# 30 mesh) to obtain a powder.

The above (Mn$_{1.5}$Cr$_{1.5}$)O$_4$ and Y$_2$O$_3$ are used as the thermistor material.

In the second preparation step (starting from compounding 2 in the figure), for the purpose of obtaining the desired resistivity and resistivity temperature coefficient, (Mn$_{1.5}$Cr$_{1.5}$)O$_4$ (average particle diameter: 2 to 5 $\mu$m, 630 g) and Y$_2$O$_3$ (average particle diameter: 1.0 $\mu$m, 1370 g) are first weighed so that a compounding molar ratio of (Mn$_{1.5}$Cr$_{1.5}$)O$_4$:Y$_2$O$_3$ becomes 100:216, to make 2000 g as the total amount. In the same manner as in Example 7, SiO$_2$ (60 g) and CaCO$_3$ (90 g) are added as a sintering auxiliary (compounding 2).

In order to perform atomization of the thermistor material, a pearl mill device is used in the same manner as in Example 7. The raw slurry of the thermistor material subjected to the grinding treatment was evaluated by using a laser type granulometer. As a result, the average particle diameter was 0.5 $\mu$m. This average particle diameter is smaller than the average particle diameter (1.0 $\mu$m) of Y$_2$O$_3$ before mixing.

The raw slurry of the resulting thermistor material is granulated and dried to obtain a granulated powder of the thermistor material. The grinding conditions of the pearl mill device and drying conditions of the spray drier are the same as those of Example 7.

The molding is performed by the molding method in the same manner as in Example 7 to obtain a thermistor element, which is incorporated into a temperature sensor assay to give a temperature sensor.

The evaluation results are shown in Table 8. Regarding the temperature sensor of Example 8, a temperature accuracy of ±10° C. can be obtained. The evaluation method of the temperature accuracy is the same as that of Example 7.

Example 9

Figure 12:
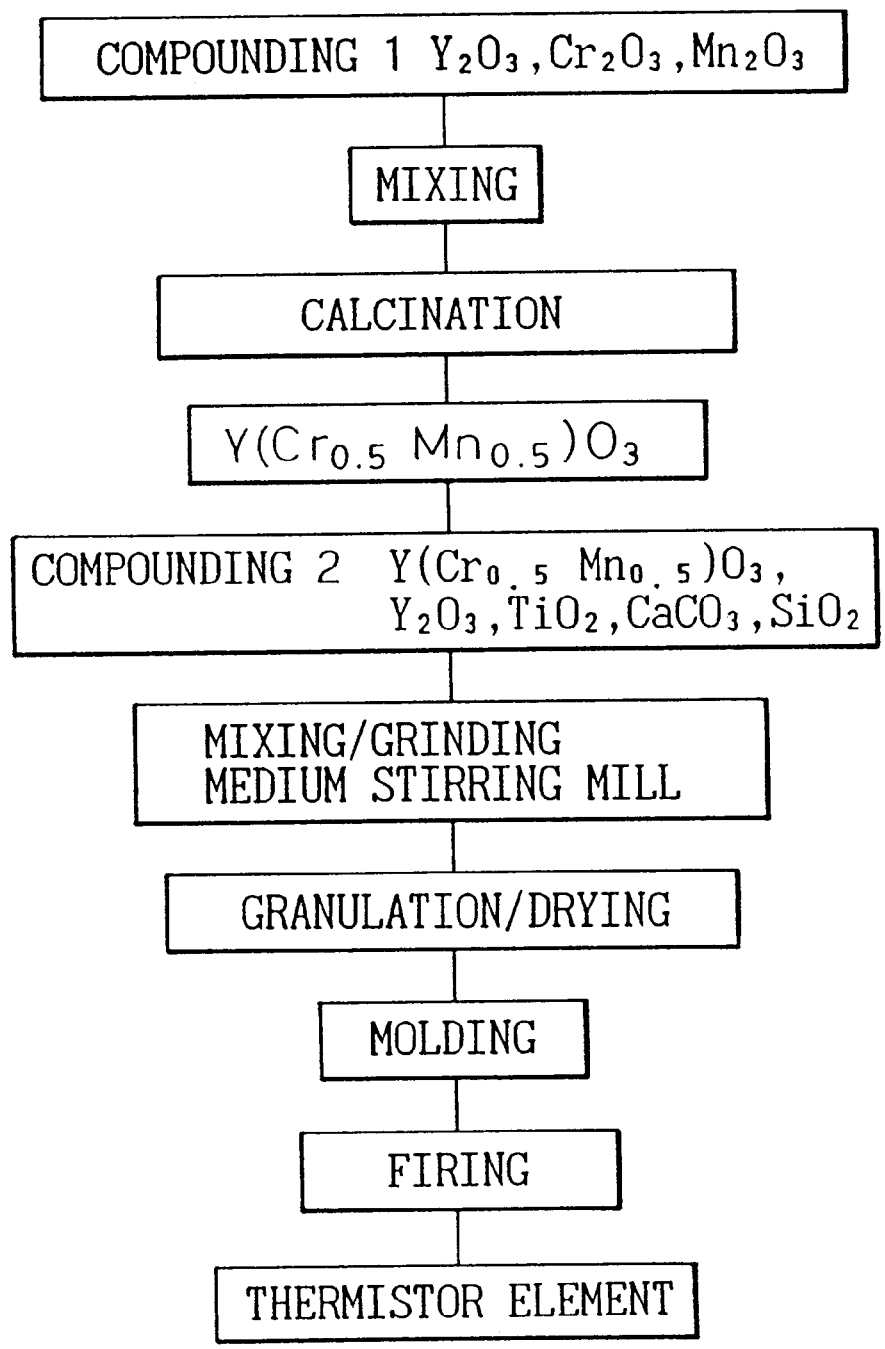

In Example 9, as the raw material for obtaining a mixed sintered body Y(CrMnTi)O$_3$ (M¹=Y, M²=Cr, Mn, Ti), Y(Cr$_{0.5}$Mn$_{0.5}$)O$_3$ is first prepared from Y(Cr$_{0.5}$Mn$_{0.5}$)O$_3$, Y$_2$O$_3$ and TiO$_2$. A flow chart illustrating a production step of the thermistor element of Example 9 is shown in FIG. 12. This Example relates to a production method according to the above second embodiment.

In the first preparation step, Y(Cr$_{0.5}$Mn$_{0.5}$)O$_3$ is obtained in the same manner as in Example 7. The above Y(Cr$_{0.5}$Mn$_{0.5}$)O$_3$, Y$_2$O$_3$ and TiO$_2$ are used as the thermistor material.

In the second preparation step (starting from compounding 2 in the figure), for the purpose of obtaining desired resistivity and resistivity temperature coefficient, Y(Cr$_{0.5}$Mn$_{0.5}$)O$_3$ (average particle diameter: 2 to 5 $\mu$m, 1520 g), $Y_2O_3$ (average particle diameter: 1.0 μm, 400 g) and $TiO_2$ (80 g) are first weighed so that a compounding molar ratio $Y(Cr_{0.5}Mn_{0.5})O_3:Y_2O_3:TiO_2$ becomes 100:22:10, to make 2000 g as the total amount. In the same manner as in Example 7, $SiO_2$ (60 g) and $CaCO_3$ (90 g) are added as a sintering auxiliary (compounding 2).

Accordingly, 2150 g of the total of $Y(Cr_{0.5}Mn_{0.5})O_3$, $Y_2O_3$, $TiO_2$, $SiO_2$ and $CaCO_3$ is used as the ground raw material.

Then, in order to perform atomization of the thermistor material, a pearl mill device is used in the same manner as in Example 7. The raw slurry of the thermistor material subjected to the grinding treatment was evaluated by using a laser type granulometer. As a result, the average particle diameter was 0.4 μm (micrometer). This average particle diameter is smaller than the average particle diameter 1.0 μm of $Y_2O_3$ before mixing.

The raw slurry of the resulting thermistor material is granulated and dried to obtain a granulated powder of the thermistor material. The grinding conditions of the pearl mill device and drying conditions of the spray drier are the same as those of Example 7.

The molding is performed by the molding method in the same manner as in Example 7 to obtain a thermistor element, which is incorporated into a typical temperature sensor assay to give a temperature sensor.

The evaluation results are shown in Table 8. Regarding the temperature sensor of Example 9, a temperature accuracy of ±8° C. can be obtained. The evaluation method of the temperature accuracy is the same as that of Example 7.

Example 10

Figure 13:
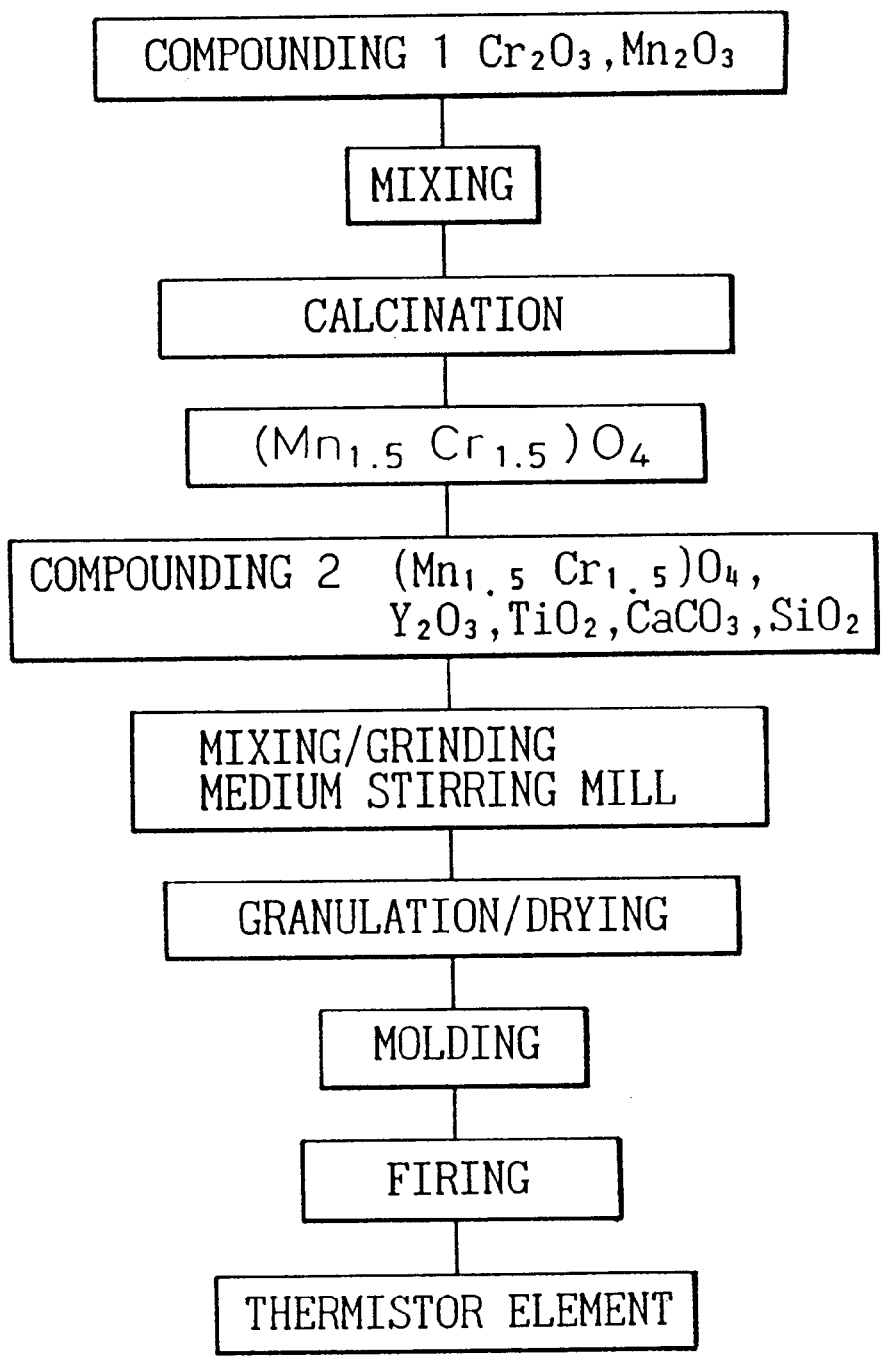

In Example 10, as the raw material for obtaining a mixed sintered body ($M^1$=Y, $M^2$=Cr, Mn, Ti) of $Y(CrMnTi)O_3$ and $Y_2O_3$ from $(Mn_{1.5}Cr_{1.5})O_4$, $Y_2O_3$ and $TiO_2$, $(Mn_{1.5}Cr_{1.5})O_4$ obtained by calcining a mixture of an oxide of Cr and an oxide of Mn at 1000° C. or more is first prepared. A flow chart illustrating a production step of the thermistor element of Example 10 is shown in FIG. 13. This Example relates to a production method according to the above second embodiment.

In the first preparation step, $(Mn_{1.5}Cr_{1.5})O_4$ is obtained in the same manner as in Example 8.

The above $(Mn_{1.5}Cr_{1.5})O_4$, $Y_2O_3$ and $TiO_2$ are used as the thermistor material.

In the second preparation step (starting from compounding 2 in the figure), for the purpose of obtaining desired resistivity and resistivity temperature coefficient, $(Mn_{1.5}Cr_{1.5})O_4$ (average particle diameter: 2 to 5 μm, 578 g), $Y_2O_3$ (average particle diameter: 1.0 μm, 1355 g) and $TiO_2$ (67 g) are first weighed so that a compounding molar ratio $(Mn_{1.5}Cr_{1.5})O_4:Y_2O_3:TiO_2$ becomes 30:70:10, to make 2000 g as the total amount. In the same manner as in Example 7, $SiO_2$ (60 g) and $CaCO_3$ (90 g) are added as a sintering auxiliary (compounding 2).

Then, in order to perform atomization of the thermistor material, a pearl mill device is used as a medium stirring mill. The raw slurry of the thermistor material subjected to the grinding treatment was evaluated by using a laser type granulometer. As a result, the average particle diameter was 0.5 μm (micrometer). This average particle diameter is smaller than the average particle diameter 1.0 μm of $Y_2O_3$ before mixing.

The raw slurry of the resulting thermistor material is granulated and dried to obtain a granulated powder of the thermistor material. The grinding conditions of the pearl mill device and drying conditions of the spray drier are the same as those of Example 7.

The molding is performed by the molding method in the same manner as in Example 7 to obtain a thermistor element, which is incorporated into a typical temperature sensor assay to give a temperature sensor.

The evaluation results are shown in Table 8. Regarding the temperature sensor of Example 8, a temperature accuracy of ±8° C. can be obtained. The evaluation method of the temperature accuracy is the same as that of Example 7.

Example 11

A flow chart illustrating a production step of the thermistor element of Example 11 is shown in FIG. 14. Regarding Examples 11 to 14, the mixing and grinding are performed by using a ball mill as a conventional method for comparison with Examples 7 to 10 wherein the mixing and grinding (grinding step) in the second preparation step are performed by using a medium stirring mill.

Regarding Example 11, a ball mill as a conventional method is used in the grinding step in the second preparation step of Example 7. In the first preparation step, $Y(Cr_{0.5}Mn_{0.5})O_3$ is obtained in the same manner as in the first preparation step of Example 7.

In the second preparation step, for the purpose of obtaining desired resistivity and resistivity temperature coefficient, $Y(Cr_{0.5}Mn_{0.5})O_3$ (average particle diameter: 2 to 5 μm, 390 g) and $Y_2O_3$ (average particle diameter: 1.0 μm, 110 g) are first weighed to make 500 g as the total amount. In addition, $SiO_2$ and $CaCO_3$ are used as a sintering auxiliary, and $SiO_2$ (15 g) and $CaCO_3$ (23 g) are added (compounding 2). Accordingly, 538 g of the total of $Y(Cr_{0.5}Mn_{0.5})O_3$, $Y_2O_3$, $SiO_2$ and $CaCO_3$ is used as the mixing/grinding raw material.

Regarding the operation conditions of the mixing and grinding, the thermistor raw material is charged in a resin pot (volume: 5 liter) containing $Al_2O_3$ pebbles having a diameter of 15ϕ (2.5 kg) and pebbles having a diameter of 20ϕ (2.5 kg) and, after adding 1800 cc of purified water, the mixture was mixed and ground at 60 rpm for 6 hours.

The raw slurry of the thermistor material subjected to the grinding treatment was evaluated by using a laser type granulometer. As a result, the average particle diameter was 3.0 μm (micron meter). This average particle diameter is smaller than the average particle diameter 1.0 μm of $Y_2O_3$ before mixing.

The raw slurry of the resulting thermistor material was granulated and dried to obtain a granulated powder of the thermistor material. The grinding conditions of the pearl mill device and drying conditions of the spray drier are the same as those of Example 7. The molding is performed by the molding method in the same manner as in Example 7 to obtain a thermistor element, which is incorporated into a typical temperature sensor assay to give a temperature sensor.

The evaluation results are shown in Table 8. Regarding the temperature sensor of Example 11, a temperature accuracy of ±30° C. can be obtained. The evaluation method of the temperature accuracy is the same as that of Example 7.

In Example 11, the thermistor element incorporated into the temperature sensor shows temperature characteristics with good resistivity as the object of the present invention. That is, it shows low resistivity (50 to 100 kΩ), good resistivity temperature coefficient β (2000 to 4000 (K)) and small change in resistivity (±10% or less).

Example 12

In Example 12, a ball mill as a conventional method is used in the grinding step (mixing and grinding) in the second preparation step in Example 8. As the raw material for obtaining a mixed sintered body of $Y(CrMn)O_3$ and $Y_2O_3$, $(Mn_{1.5}Cr_{1.5})O_4$ and $Y_2O_3$ are used. In the first preparation step, $(Mn_{1.5}Cr_{1.5})O_4$ is obtained in the same manner as in the first preparation step of Example 8.

In the second preparation step, for the purpose of obtaining the desired resistivity and resistivity temperature coefficient, $(Mn_{1.5}Cr_{1.5})O_4$ (average particle diameter: 2 to 5 μm 158 g) and $Y_2O_3$ (average particle diameter: 1.0 μm, 342 g) are first weighed to make 500 g as the total amount. In addition, $SiO_2$ and $CaCO_3$ are used as a sintering auxiliary, and $SiO_2$ (15 g) and $CaCO_3$ (23 g) are added (compounding 2). Accordingly, 538 g of the total of $(Mn_{1.5}Cr_{1.5})O_4$, $Y_2O_3$, $SiO_2$ and $CaCO_3$ is used as the mixing/grinding raw material.

Regarding the operation conditions of the mixing and grinding, the mixing and grinding are performed in the same manner as in Example 11. The raw slurry of the thermistor material subjected to the grinding treatment was evaluated by using a laser type granulometer. As a result, the average particle diameter was 2.7 μm. This average particle diameter is smaller than the average particle diameter (1.0 μm) of $Y_2O_3$ before mixing.

The raw slurry of the resulting thermistor material is granulated and dried to obtain a granulated powder of the thermistor material. The grinding conditions of the pearl mill device and drying conditions of the spray drier are the same as those of Example 7. The molding is performed by the molding method in the same manner as in Example 7 to obtain a thermistor element, which is incorporated into a typical temperature sensor assay to give a temperature sensor.

The evaluation results are shown in Table 8. Regarding the temperature sensor of Example 12, a temperature accuracy of ±30° C. can be obtained. The evaluation method of the temperature accuracy is the same as that of Example 7. Also in Example 11, the thermistor element incorporated into the temperature sensor shows temperature characteristics with good resistivity.

Example 13

In Example 13, a ball mill as a conventional method is used in the grinding step (mixing and grinding) in the second preparation step of Example 9. As the raw material for obtaining a mixed sintered body of $Y(CrMn)O_3$ and $Y_2O_3$, $Y(CrMn)O_3$, $Y_2O_3$ and $TiO_2$ are used. In the first preparation step, $Y(Cr_{0.5}Mn_{0.5})O_3$ is obtained in the same manner as in the first preparation step of Example 7.

In the second preparation step, for the purpose of obtaining the desired resistivity and resistivity temperature coefficient, $Y(Cr_{0.5}Mn_{0.5})O_3$ (average particle diameter: 2 to 5 μm, 380 g), $Y_2O_3$ (average particle diameter: 1.0 μm, 100 g) and $TiO_3$ (20 g) are first weighed to make 500 g as the total amount. In addition, $SiO_2$ and $CaCO_3$ are used as a sintering auxiliary, and $SiO_2$ (15 g) and $CaCO_3$ (23 g) are added (compounding 2). Accordingly, 538 g of the total of $Y(Cr_{0.5}Mn_{0.5})O_3$, $Y_2O_3$, $SiO_2$ and $CaCO_3$ is used as the mixing/grinding raw material.

Regarding the operation conditions of the mixing and grinding, the mixing and grinding are performed in the same manner as in Example 11. The raw slurry of the thermistor material subjected to the grinding treatment was evaluated by using a laser type granulometer. As a result, the average particle diameter was 3.0 μm (micron meter). This average particle diameter is smaller than the average particle diameter 1.0 μm of $Y_2O_3$ before mixing.

The raw slurry of the resulting thermistor material is granulated and dried to obtain a granulated powder of the thermistor material. The grinding conditions of the pearl mill device and drying conditions of the spray drier are the same as those of Example 7. The molding is performed by the molding method in the same manner as in Example 7 to obtain a thermistor element, which is incorporated into a typical temperature sensor assay to give a temperature sensor.

The evaluation results are shown in Table 8. Regarding the temperature sensor of Example 13, a temperature accuracy of ±25° C. can be obtained. The evaluation method of the temperature accuracy is the same as that of Example 13.

Also in Example 12, the thermistor element incorporated into the temperature sensor shows temperature characteristics with good resistivity.

Example 14

In Example 14, a ball mill as a conventional method is used in the grinding step (mixing and grinding) in the second preparation step of Example 10. As the raw material for obtaining a mixed sintered body of $Y(CrMnTi)O_3$ and $Y_2O_3$, $(Mn_{1.5}Cr_{1.5})O_4$, $Y_2O_3$ and $TiO_2$ are used. In the first preparation step, $(Mn_{1.5}Cr_{1.5})O_4$ is obtained in the same manner as in the first preparation step of Example 8.

In the second preparation step, for the purpose of obtaining the desired resistivity and resistivity temperature coefficient, $(Mn_{1.5}Cr_{1.5})O_4$ (average particle diameter: 2 to 5 μm, 145 g), $Y_2O_3$ (average particle diameter: 1.0 μm, 338 g) and $TiO_2$ (17 g) are first weighed to make 500 g as the total amount. In addition, $SiO_2$ and $CaCO_3$ are used as a sintering auxiliary, and $SiO_2$ (15 g) and $CaCO_3$ (23 g) are added (compounding 2). Accordingly, 538 g of the total of $(Mn_{1.5}Cr_{1.5})O_4$, $Y_2O_3$, $TiO_2$, $SiO_2$ and $CaCO_3$ is used as the mixing/grinding raw material.

Regarding the operation conditions of the mixing and grinding, the mixing and grinding are performed in the same manner as in Example 11. The raw slurry of the thermistor material subjected to the grinding treatment was evaluated by using a laser type granulometer. As a result, the average particle diameter was 3.0 μm. This average particle diameter is smaller than the average particle diameter (1.0 μm) of $Y_2O_3$ before mixing.

The raw slurry of the resulting thermistor material is granulated and dried to obtain a granulated powder of the thermistor material. The grinding conditions of the pearl mill device and drying conditions of the spray drier are the same as those of Example 7. The molding is performed by the molding method in the same manner as in Example 7 to obtain a thermistor element, which is incorporated into a typical temperature sensor assay to give a temperature sensor.

The evaluation results are shown in Table 8. Regarding the temperature sensor of Example 14, a temperature accuracy of ±25° C. can be obtained. The evaluation method of the temperature accuracy is the same as that of Example 7.

Also in Example 14, the thermistor element incorporated into the temperature sensor shows temperature characteristics with good resistivity as in Example 11.

As described above, when Examples 7 to 14 are compared, all thermistor elements show temperature characteristics with good resistivity as the object of the present invention, but it can be said that the production methods described in Examples 7 to 10 are superior in temperature accuracy of a sensor to those described in Examples 11 to 14.

That is, in the production methods described in Examples 7 to 10, uniform mixing of the composition is realized by atomization of the thermistor material while accomplishing the effect described in the above first aspect and a variation in composition of a mixed sintered body $M^1M^2O_3 \cdot Y_2O_3$ is reduced, thereby making it possible to reduce scatter in resistivity.

Accordingly, in case that the thermistor element of the present invention is produced by the production method according to the second embodiment (Examples 7 to 10), it is possible to provide a thermistor element capable of improving the temperature accuracy at room temperature to 1000° C. to ±10° C. or less in comparison with the production process using a conventional ball mill (Examples 1 to 14, temperature accuracy: ±20 to 30° C.) and realizing high accuracy of the temperature sensor.

Example 15

Figure 15:
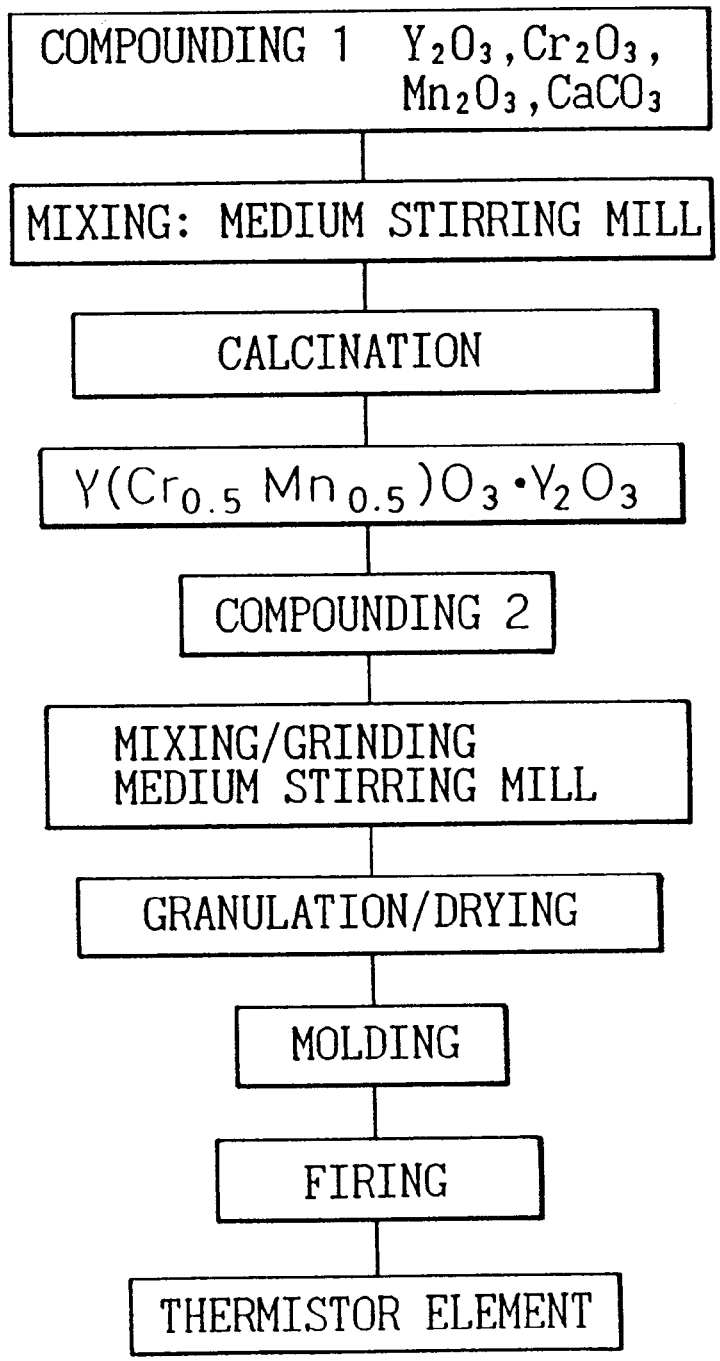

In Example 15, a mixed sintered body ($M^1$=Y, $M^2$=Cr, Mn) of $Y(Cr_{0.5}Mn_{0.5})O_3 \cdot Y_2O_3$ is obtained from $Y_2O_3$, $Cr_2O_3$, $Mn_2O_3$ and $CaCO_3$ as the raw material. A flow chart illustrating a production step of the thermistor element of Example 15 is shown in FIG. 15.

This Example relates to the first production method described in the above third embodiment. That is, the above precursor is obtained in the first preparation step (from compounding 1 to $Y(Cr_{0.5}Mn_{0.5})O_3 \cdot Y_2O_3$), and a medium stirring mill is used in the grinding step of the mixing step of the first preparation step and the grinding step of the second preparation step (starting from compounding 2 in the figure).

$Y_2O_3$, $Cr_2O_3$, $Mn_2O_3$ and $CaCO_3$ (the purity of all components is not less than 99.9%) are prepared. In the compounding 1, these components are compounded so that the desired resistivity and resistivity temperature coefficient as the thermistor element can be obtained.

Specifically, $Y_2O_3$, $Cr_2O_3$ and $Mn_2O_3$ are weighed so that a and b (molar fraction) (a:b) of $aY(Cr_{0.5}Mn_{0.5})O_3 \cdot bY_2O_3$ becomes 38:62 to make 2000 g as the total amount. Furthermore, 36 g of $CaCO_3$ is added and 2036 g of the total of $Y_2O_3$, $Cr_2O_3$, $Mn_2O_3$ is used as a mixed raw material.

In the following mixing step, a medium stirring mill is used to atomize the raw material. As the medium stirring mill, a pearl mill device (manufactured by Ashizawa Co., Ltd., RV1V, effective volume: 1.0 liter, actual volume: 0.5 liter) is used. Regarding the mixing conditions of this pearl mill device, 3.0 kg of zirconia balls having a diameter of 0.5 mm are used as a grinding medium and 80% of the volume of a stirring vessel are filled with zirconia balls.

The operation conditions are as follows: circumferential rate: 12 m/sec, revolution: 3110 rpm. Using 4.5 liter of distilled water as a dispersing medium relative to 2036 g of the mixed raw material, a dispersant and a binder are added, followed by mixing and grinding for 10 hours. As the binder, polyvinyl alcohol (PVA) is added in an amount of 20 g per 2036 g of the mixed raw material.

The raw slurry of the thermistor material subjected to the mixing/grinding treatment was evaluated by using a laser type granulometer. As a result, the average particle diameter was 0.4 µm (micron meter). This average particle diameter is smaller than the average particle diameter (1.0 µm) of $Y_2O_3$ and smaller than 0.5 µm.

The raw slurry of the resulting thermistor material is dried under the conditions of a drying chamber inlet temperature of 200° C. and an outlet temperature of 120° C. by using a spray drier. The resulting granulated powders of the thermistor material are spherical powders having an average particle diameter of 30 µm, and this raw material powder is charged in a crucible made of 99.3% $Al_2O_3$ and then calcined in a high-temperature oven in the air at 1100 to 1300° C. for 1 to 2 hours to obtain a precursor $Y(Cr_{0.5}Mn_{0.5})O_3 \cdot Y_2O_3$ (calcination step).

The precursor $Y(Cr_{0.5}Mn_{0.5})O_3 \cdot Y_2O_3$ as a bulk solid obtained in the calcination was roughly ground by using a chaser mill and passed through a sieve (#30 mesh) to obtain a powder of precursor $Y(Cr_{0.5}Mn_{0.5})O_3 \cdot Y_2O_3$.

In the following compounding 2, a powder of the above precursor $Y(Cr_{0.5}Mn_{0.5})O_3 \cdot Y_2O_3$ (2000 g) is prepared.

In the grinding step, a pearl mill device is used similar to the above mixing step. To the precursor prepared in the compounding 2, a dispersant, a binder and a releasant are added, followed by mixing and further grinding to perform atomization. The grinding conditions of this pearl mill device are the same as the conditions of the above mixing step.

The raw slurry of the thermistor material subjected to the grinding treatment was evaluated by using a laser type granulometer. As a result, the average particle diameter was 0.3 µm (micron meter). This average particle diameter is smaller than the average particle diameter 1.0 µm of $Y_2O_3$.

The slurry of the precursor $Y(Cr_{0.5}Mn_{0.5})O_3 \cdot Y_2O_3$ obtained after grinding was granulated by using a spray dried under the same conditions as those of the above drying step to obtain a granulated powder of $Y(Cr_{0.5}Mn_{0.5})O_3 \cdot Y_2O_3$. A thermistor element is molded by using this granulated powder of $Y(Cr_{0.5}Mn_{0.5})O_3 \cdot Y_2O_3$.

The molding step is performed by a molding method. Pt100 (0.3 mmφ×10.5 mm) as a lead wire is put in a male mold and a granulated powder of $Y(Cr_{0.5}Mn_{0.5})O_3 \cdot Y_2O_3$ is charged in a female mold of 1.89 mmφ, and then molding is performed under a pressure of about 1000 kgf/cm² to obtain a molded article of a thermistor element provided with a lead wire. The molded article of the thermistor element is arranged on a corrugated setter made of $Al_2O_3$ and then calcined in the air at 1400 to 1600° C. for 1 to 2 hours to obtain a thermistor element having an outer diameter of 1.60 mmφ (mixed sintered body).

This thermistor element is incorporated into a temperature sensor assay to give a temperature sensor. The resulting thermistor element and temperature sensor have the same structure as that of thermistor elements and temperature sensors shown in FIG. 2 to FIG. 4.

Then, the temperature sensor was put in a high-temperature furnace and resistivity temperature characteristics are evaluated within the range from room temperature (e.g. 27° C., etc.) to 1000° C. in the same manner as in Example 1. The evaluation results are shown in Table 9. The temperature accuracy of the resulting temperature sensor are evaluated in the same manner as in Example 7. The results are shown in Table 10.

TABLE

<Example 9>

| | Raw material composition (mol %) | | Resistivity (kΩ) | | Resistivity temperature coefficient | Change in resistivity |
|---|---|---|---|---|---|---|
| No. | $Y(Cr_{0.5}Mn_{0.5})O_3$ | $Y_2O_3$ | Room temperature (27° C.) | 1000° C. | (K) | (%) |
| 19 | 38 | 62 | 50 | 0.14 | 2450 | −5.0 |
| 20 | 95 | 5 | 30 | 0.10 | 2240 | −4.0 |
| 21 | 5 | 95 | 100 | 0.20 | 2440 | −4.0 |

TABLE

<Example 10>

| | Raw material component in case of grinding | Average particle diameter after grinding (μm) | Average particle diameter after grinding (μm) | Temperature accuracy (° C.) |
|---|---|---|---|---|
| Example 15 | $Y(CrMn)O_3 \cdot Y_2O_3$ | 0.4 | 0.4 | ±7 |
| Example 16 | $Y(CrMn)O_3$ and $Y_2O_3$ | 0.3 | 0.4 | ±5 |
| Example 17 | $Y(CrMn)O_3 \cdot Y_2O_3$ | 0.4 | 1.8 | ±10 |
| Example 18 | $Y(CrMn)O_3$ and $Y_2O_3$ | 0.3 | 1.8 | ±10 |
| Example 19 | $Y(CrMn)O_3 \cdot Y_2O_3$ | 2.0 | 3.0 | ±30 |
| Example 20 | $Y(CrMn)O_3$ and $Y_2O_3$ | 1.7 | 2.7 | ±25 |
| Comparative Example 1 | $Y(Cr_{0.5}Mn_{0.5})O_3$ | 2.0 | 3.0 | ±30 |
| Comparative Example 2 | $YTiO_3$ | 2.0 | 3.0 | ±25 |
| Comparative Example 3 | | | | |

In Table 10, the raw material component in case of grinding represents a raw material component in the grinding step of the second preparation step ($Y(Cr_{0.5}Mn_{0.5})O_3 \cdot Y_2O_3$ in this Example), the average particle diameter (μm) after mixing represents an average particle diameter of a raw slurry after grinding in the mixing step of the first preparation step (0.4 μm in this Example) and the average particle diameter (μm) after grinding represents an average particle diameter of a raw slurry after grinding in the grinding step of the second preparation step (0.3 μm in this Example). The same rule applies correspondingly to the following Examples 16 to 20 and Comparative Examples 1 and 2 evaluated in Comparative Example 3.

Regarding the temperature sensor of Example 15, a temperature accuracy of ±7° C. can be obtained.

Furthermore, in the compounding 1, a thermistor element was produced by using a thermistor raw material prepared so that a molar ratio (a:b) of $Y(Cr_{0.5}Mn_{0.5})O_3:Y_2O_3$ becomes 95:5 and 5:95 in the same manner as described above and the thermistor element was evaluated. The results (resistivity temperature characteristics) are shown in Table 9. In Example 15, the respective elements are referred to as an element No. 19, an element No. 20 and an element No. 21 in the sequence of the above molar ratio a:b, e.g. 38:62, 95:5 and 5:95. They are shown in Table 9.

As shown in Table 9, the thermistor element of Example 15 shows low resistivity of 50 to 100 kΩ required of a temperature sensor within the range where the molar fraction (a+b=1) of $aY(Cr_{0.5}Mn_{0.5})O_3 \cdot bY_2O_3$ satisfy the relations: $0.05 \leq a < 1$ and $0 < b \leq 0.95$, and also shows a resistivity temperature coefficient β of 2000 to 4000 (K), and is capable of widely controlling the resistivity and resistivity temperature coefficient. Therefore, it is possible to detect a temperature ranging from room temperature to high temperature of 1000° C.

As is apparent from the results of the high-temperature durability test (change in resistivity), a wide-range type thermistor material having stable characteristics (e.g. small change in resistivity), etc.) can be provided.

Example 16

Figure 16:
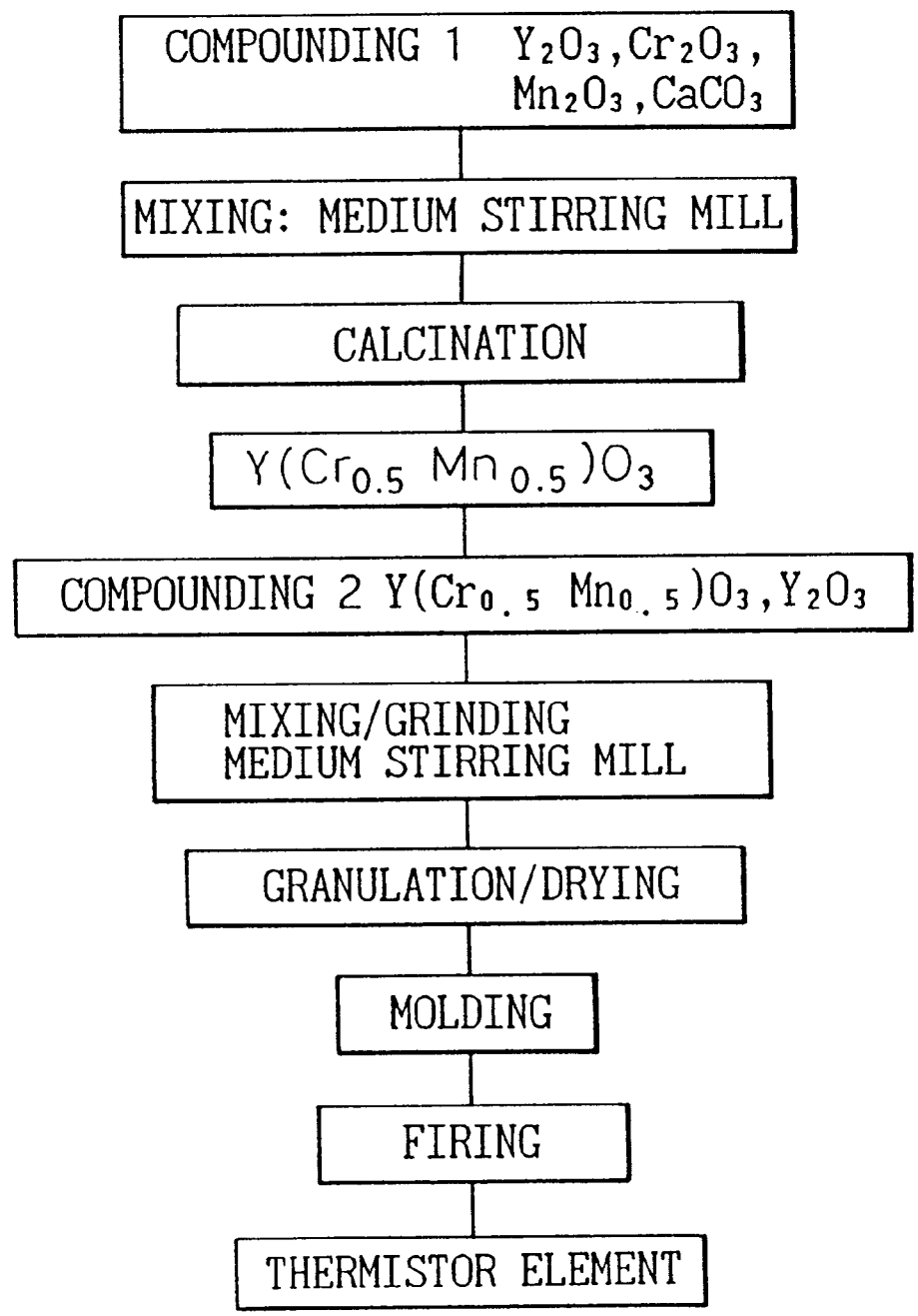

In Example 16, a mixed sintered body ($M^1$=Y, $M^2$=Cr, Mn) of $Y(Cr_{0.5}Mn_{0.5})O_3 \cdot Y_2O_3$ is obtained from $Y(Cr_{0.5}Mn_{0.5})O_3$ and $Y_2O_3$. A flow chart illustrating a production step of the thermistor element of Example 16 is shown in FIG. 16.

This Example relates to the second production method described in the above third embodiment. That is, $Y(Cr_{0.5}Mn_{0.5})O_3$ is obtained in the first preparation step (from compounding 1 to $Y(Cr_{0.5}Mn_{0.5})O_3$), and a medium stirring mill is used in the mixing step of the first preparation step and the grinding step of the second preparation step (starting from compounding 2 in the figure).

$Y_2O_3$, $Cr_2O_3$, $Mn_2O_3$ and $CaCO_3$ (purity of all components is not less than 99.9%) are prepared. In the compounding 1, $Y_2O_3$, $Cr_2O_3$ and $Mn_2O_3$ are weighed so that a molar fraction of Y:Cr:Mn becomes 2:1:1 to make 644 g as the total amount. Furthermore, 36 g of $CaCO_3$ is added and 680 g of the total of $Y_2O_3$, $Cr_2O_3$, $Mn_2O_3$ and $CaCO_3$ is used as a mixed raw material.

In the following mixing step, a medium stirring mill is used to atomize the raw material in the same manner as in Example 15. The mixing conditions are the same as those of Example 15. In this mixing step, the raw slurry of the thermistor material subjected to the mixing/grinding treatment was evaluated by using a laser type granulometer. As a result, the average particle diameter was 0.3 μm (micron meter). This average particle diameter is smaller than the average particle diameter 1.0 μm of $Y_2O_3$ before mixing and is smaller than 0.5 μm.

The resulting raw slurry is granulated and dried by using a spray drier in the same manner as in Example 15, and then calcined to obtain $Y(Cr_{0.5}Mn_{0.5})O_3$. $Y(Cr_{0.5}Mn_{0.5})O_3$ as a bulk solid obtained in the temporary calcination is roughly ground by using a chaser mill and passed through a sieve (# 30 mesh) to obtain a powder of $Y(Cr_{0.5}Mn_{0.5})O_3$.

In the following compounding 2, compounding is performed so that the desired resistivity and resistivity temperature coefficient as the thermistor element can be obtained. Specifically, $Y(Cr_{0.5}Mn_{0.5})O_3$ and $Y_2O_3$ are weighed so that a to b (a:b) of $aY(Cr_{0.5}Mn_{0.5})O_3 \cdot bY_2O_3$ becomes 38:62 to make 2000 g as the total amount.

In the grinding step, $Y(Cr_{0.5}Mn_{0.5})O_3$ and $Y_2O_3$ are mixed and ground by using a pearl mill device similar to the mixing step to perform atomization. The grinding conditions of the pearl mill device are the same as those of the mixing step. In this grinding step, a dispersant, a binder and a releasant are added, followed by mixing and further steps.

The raw slurry of the thermistor material subjected to the grinding treatment was evaluated by using a laser type granulometer. As a result, the average particle diameter was 0.4 μm (micron meter). This average particle diameter is smaller than the average particle diameter 1.0 μm of $Y_2O_3$ before compounding in the compounding 2.

The slurry of $Y(Cr_{0.5}Mn_{0.5})O_3$ and $Y_2O_3$ obtained after grinding is granulated, molded and then calcined to obtain a thermistor element in the same manner as in Example 15. This thermistor element is incorporated into a temperature sensor assay to give a temperature sensor in the same manner as in Example 15.

The resulting thermistor element and temperature sensor have the same structure as that of thermistor elements and temperature sensors shown in FIG. 2 to FIG. 4.

The above temperature sensor was evaluated in the same manner as in Example 15. The evaluation results of the resistivity temperature characteristics are shown in Table 11 and those of the temperature accuracy are shown in Table 10.

TABLE

<Example 11>

| | Raw material composition (mol %) | | Resistivity (kΩ) | | Resistivity temperature coefficient | Change in resistivity |
|---|---|---|---|---|---|---|
| No. | $Y(Cr_{0.5}Mn_{0.5})O_3$ | $Y_2O_3$ | Room temperature (27° C.) | 1000° C. | (K) | (%) |
| 22 | 38 | 62 | 60 | 0.15 | 2350 | −7.0 |
| 23 | 95 | 5 | 40 | 0.11 | 2300 | −5.0 |
| 24 | 5 | 95 | 100 | 0.22 | 2400 | −5.0 |

Regarding the temperature sensor of Example 16, a temperature accuracy of ±5° C. can be obtained, as shown in Table 10. In Example 16, grinding and atomization are performed by using a medium stirring mill in the mixing step of the first preparation step and grinding step of the second preparation step. Therefore, there can be provided a thermistor element whose temperature accuracy is improved in comparison with Example 7 (temperature accuracy: ±10° C.) wherein grinding and atomization were performed only in the latter step using a medium stirring mill.

Furthermore, a thermistor element was produced by using a thermistor raw material prepared so that a molar ratio (a:b) $Y(Cr_{0.5}Mn_{0.5})O_3:Y_2O_3$ becomes 95:5 and 5:95 in the grinding step in the same manner as described above and the thermistor element was evaluated. The results are shown in Table 11. In Example 16, the respective elements are referred to as an element No. 22, an element No. 23 and an element No. 24 in the sequence of the above molar ratio a:b, e.g. 38:62, 95:5 and 5:95. They are shown in Table 11.

As shown in Table 11, the thermistor element of Example 16 shows the low resistivity of 50 to 100 kΩ required of a temperature sensor within the range where the molar fraction (a+b=1) of $aY(Cr_{0.5}Mn_{0.5})O_3.bY_2O_3$ satisfy the relations: $0.05 \leq a<1$ and $0<b \leq 0.95$, and also shows a resistivity temperature coefficient β of 2000 to 4000 (K), and is capable of widely controlling the resistivity and resistivity temperature coefficient. Therefore, it is possible to detect a temperature ranging from room temperature to high temperature of 1000° C.

As is apparent from the results of the high-temperature durability test (change in resistivity), a wide-range type thermistor material having stable characteristics (e.g. small change in resistivity), etc.) can be provided.

Example 17

Figure 17:
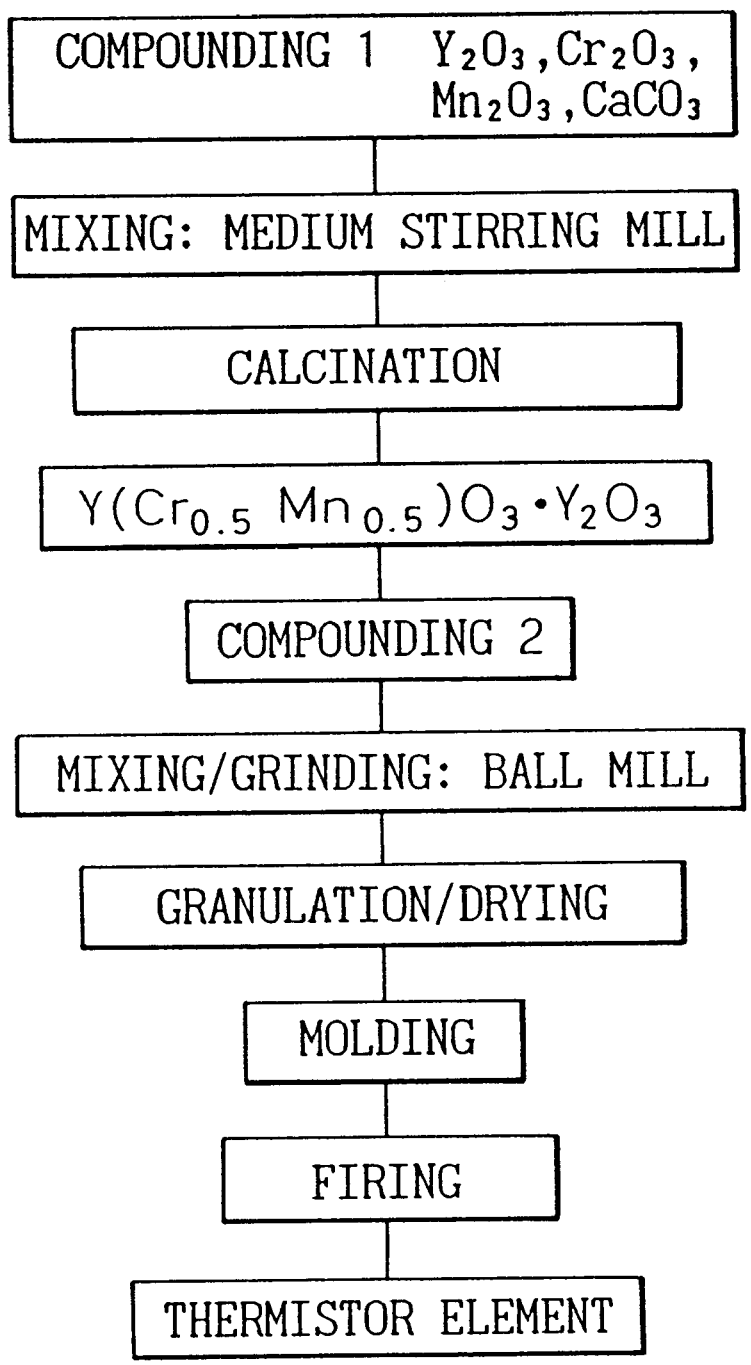

In Example 17, a mixed sintered body ($M^1$=Y, $M^2$=Cr, Mn) of $Y(Cr_{0.5}Mn_{0.5})O_3.Y_2O_3$ is obtained from $Y_2O_3$, $Cr_2O_3$, $Mn_2O_3$ and $CaCO_3$ as the raw material. A flow chart illustrating a production step of the thermistor element of Example 17 is shown in FIG. 17.

Example 17 relates to the first production method described in the above third embodiment. That is, the above precursor is obtained in the first preparation step (from compounding 1 to $Y(Cr_{0.5}Mn_{0.5})O_3.Y_2O_3$), a medium stirring mill is used in the grinding step of the mixing step of the first preparation step and a ball mill is used in the grinding step of the second preparation step (starting from compounding 2 in the figure). That is, the ball mill is used in place of the medium stirring mill in the grinding step in Example 15.

The first preparation step of this Example is the same as that of Example 15 and its description is omitted. Also in Example 17, a and b (molar fraction)(a:b) of $aY(Cr_{0.5}Mn_{0.5})O_3.bY_2O_3$ is 38:62. The raw slurry of the thermistor material subjected to the mixing/grinding treatment was evaluated by using a laser type granulometer. As a result, the average particle diameter was 0.4 μm (micron meter).

In the following compounding 2, a powder (2000 g) of the precursor $Y(Cr_{0.5}Mn_{0.5})O_3.Y_2O_3$ obtained in the first preparation step is prepared.

In the following grinding step, a ball mill device is used to add a dispersant, a binder and a releasant to $Y(Cr_{0.5}Mn_{0.5})O_3.Y_2O_3$ prepared in the compounding 2, followed by mixing and further grinding.

Regarding the grinding conditions of this ball mill device, the powder (2000 g) prepared in the compounding 2 is charged in a resin pot (volume: 20 liter) containing $Al_2O_3$ pebbles having a diameter of 15φ (10 kg) and pebbles having a diameter of 20φ (10 kg) and, after adding 6000 cc of purified water, the mixture was mixed and ground at 60 rpm for 6 hours.

The raw slurry of the thermistor material subjected to the grinding treatment was evaluated by using a laser type granulometer. As a result, the average particle diameter was 1.8 μm. This average particle diameter is smaller than the average particle diameter (1.0 μm) of $Y_2O_3$ before compounding in the compounding 1.

The slurry of $Y(Cr_{0.5}Mn_{0.5})O_3$ and $Y_2O_3$ obtained after grinding was granulated, molded and then calcined to obtain a thermistor element in the same manner as in Example 15. This thermistor element is incorporated into a temperature sensor assay to give a temperature sensor in the same manner as in Example 15. The resulting thermistor element and temperature sensor have the same structure as that of thermistor elements and temperature sensors shown in FIG. 2 to FIG. 4.

Then, the above temperature sensor was evaluated in the same manner as in Example 15. The resistivity temperature characteristics were the same as those of Example 15 (resistivity temperature characteristics of a:b=38:62 in FIG. 24). In addition, the evaluation results of the temperature accuracy are shown in Table 10. Regarding the temperature sensor of Example 17, a temperature accuracy of ±10° C. can be obtained as in Example 17.

Furthermore, a thermistor element was produced by using a thermistor raw material prepared so that a molar ratio of $Y(Cr_{0.5}Mn_{0.5})O_3$:$Y_2O_3$ becomes 95:5 and 5:95 in the mixing step and the thermistor element was evaluated. As a result, the resistivity temperature characteristics of this thermistor element were good and the same as those of the thermistor element having the same molar ratio as that of Example 15 (see Table 9).

Accordingly, the thermistor element of Example 17 shows low resistivity of 50 to 100 kΩ required as a temperature sensor within the range where the molar fraction (a+b=1) of $aY(Cr_{0.5}Mn_{0.5})O_3 \cdot bY_2O_3$ satisfy the relations: $0.05 \leq a < 1$ and $0 < b \leq 0.95$, and also shows a resistivity temperature coefficient β of 2000 to 4000 (K), and is capable of widely controlling the resistivity and resistivity temperature coefficient. Therefore, it is possible to detect a temperature ranging from room temperature to high temperature of 1000° C.

As is apparent from the results of the high-temperature durability test (change in resistivity), a wide-range type thermistor material having stable characteristics (e.g. small change in resistivity), etc.) can be provided.

Example 18

Figure 18:
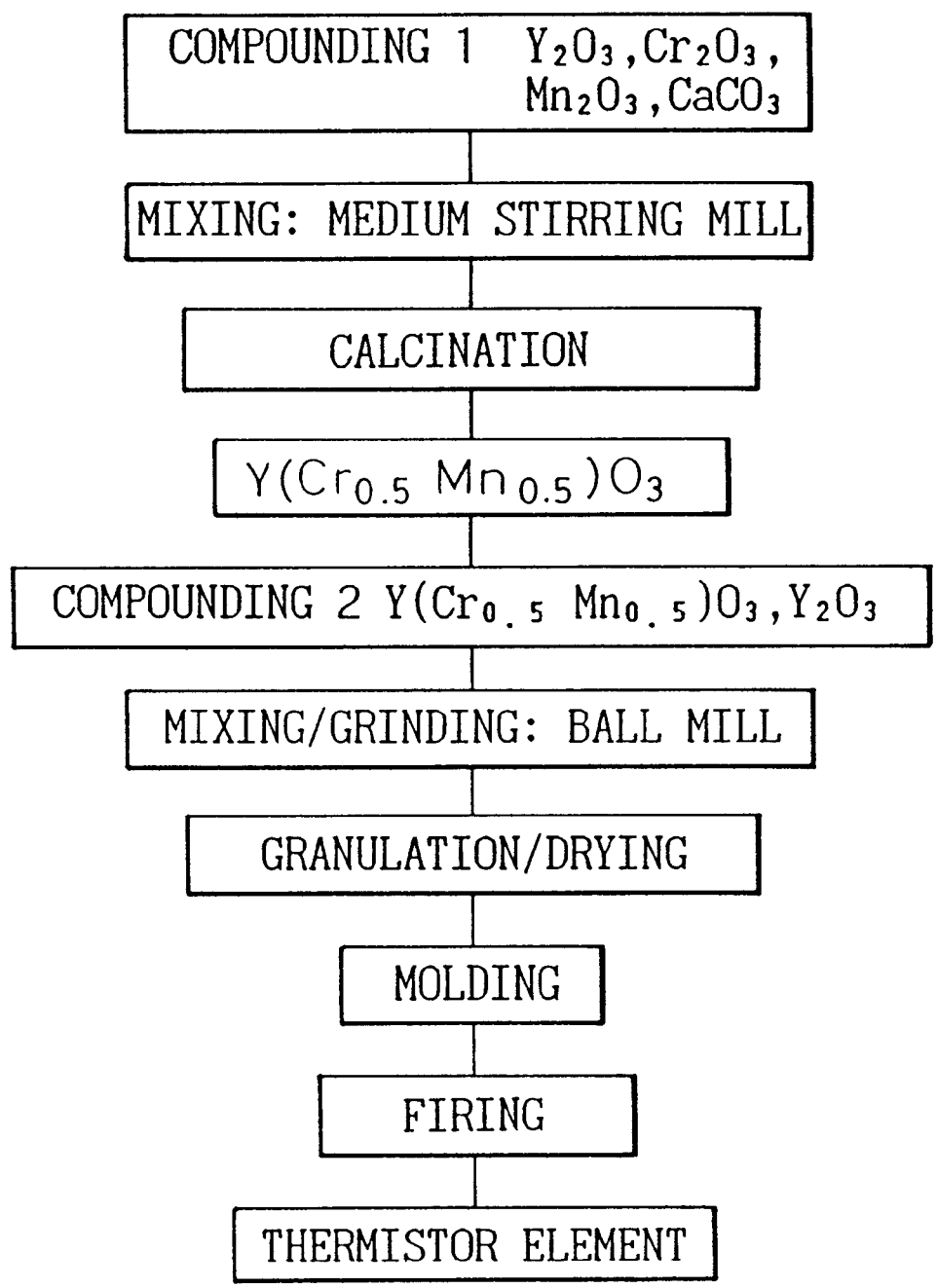

In Example 18, a mixed sintered body ($M^1$=Y, $M^2$=Cr, Mn) of $Y(Cr_{0.5}Mn_{0.5})O_3 \cdot Y_2O_3$ is obtained from $Y(Cr_{0.5}Mn_{0.5})O_3$ and $Y_2O_3$. A flow chart illustrating a production step of the thermistor element of Example 18 is shown in FIG. 18.

Example 18 relates to the second production method described in the above third embodiment. That is, $Y(Cr_{0.5}Mn_{0.5})O_3$ is obtained in the first preparation step (from compounding 1 to $Y(Cr_{0.5}Mn_{0.5})O_3$), a medium stirring mill is used in the mixing step of the first preparation step and a ball mill is used in the grinding step of the second preparation step (starting from compounding 2 in the figure). That is, the ball mill is used in place of the medium stirring mill in the grinding step in Example 16.

The first preparation step of this Example is the same as that of Example 6 and its description is omitted. Also in Example 18, the raw slurry of the thermistor material subjected to the mixing/grinding treatment in the mixing step in the compounding 1 was evaluated by using a laser type granulometer. As a result, the average particle diameter was 0.3 μm (micrometer).

Then, a powder of temporarily calcined $Y(Cr_{0.5}Mn_{0.5})O_3$ is obtained from the first preparation step.

In the following compounding 2, for the purpose of obtaining the desired resistivity and resistance temperature coefficient as the thermistor element, $Y(Cr_{0.5}Mn_{0.5})O_3$ (powder) and $Y_2O_3$ are weighed so that a and b (a:b) of $Y(Cr_{0.5}Mn_{0.5})O_3$ (powder) and $bY_2O_3$ becomes 38:62, to make 2000 g as the total amount.

In the following grinding step, a ball mill device is used to mix and grind $Y(Cr_{0.5}Mn_{0.5})O_3$ and $Y_2O_3$ weighed in the compounding 2. Regarding the grinding conditions of this ball mill device, the mixed weighed substance (2000 g) is charged in a resin pot (volume: 20 liter) containing $Al_2O_3$ pebbles having a diameter of 15φ (10 kg) and pebbles having a diameter of 20φ (10 kg) and, after adding 6000 cc of purified water, the mixture was mixed and ground at 60 rpm for 6 hours.

The raw slurry of the thermistor material subjected to the grinding treatment was evaluated by using a laser type granulometer. As a result, the average particle diameter was 1.8 μm. This average particle diameter is smaller than the average particle diameter (1.0 μm) of $Y_2O_3$ before compounding in the compounding 2. In the mixing and grinding step, a dispersant, a binder and a releasant are added and, at the same time, the mixture is ground.

The slurry of $Y(Cr_{0.5}Mn_{0.5})O_3 \cdot Y_2O_3$ obtained after grinding was granulated, molded and then calcined to obtain a thermistor element in the same manner as in Example 15. This thermistor element is incorporated into a temperature sensor assay to give a temperature sensor in the same manner as in Example 15. The resulting thermistor element and temperature sensor have the same structure as that of thermistor elements and temperature sensors shown in FIG. 2 to FIG. 4.

Then, the above temperature sensor was evaluated in the same manner as in Example 15. The resistivity temperature characteristics were the same as those of Example 16 (resistivity temperature characteristics of a:b=38:62 in FIG. 11).

In addition, the evaluation results of the temperature accuracy are shown in Table 10. Regarding the temperature sensor of Example 18, a temperature accuracy of ±10° C. can be obtained as in Example 17.

Furthermore, a thermistor element was produced by using a thermistor raw material prepared so that a molar ratio of $Y(Cr_{0.5}Mn_{0.5})O_3$:$Y_2O_3$ becomes 95:5 and 5:95 in the mixing step and the thermistor element was evaluated. As a result, the resistivity temperature characteristics of this thermistor element were good and the same as those (see Table 11) of the thermistor element having the same molar ratio as that of Example 16.

Accordingly, the thermistor element of Example 18 shows low resistivity of 50 to 100 kΩ required as a temperature sensor within the range where the molar fraction (a+b=1) of $aY(Cr_{0.5}Mn_{0.5})O_3 \cdot bY_2O_3$ satisfy the relations: $0.05 \leq a < 1$ and $0 < b \leq 0.95$, and also shows a resistivity temperature coefficient β of 2000 to 4000 (K), and is capable of widely controlling the resistivity and resistivity temperature coefficient. Therefore, it is possible to detect a temperature ranging from room temperature to high temperature of 1000° C.

As is apparent from the results of the high-temperature durability test (change in resistivity), a wide-range type thermistor material having stable characteristics (e.g. small change in resistivity), etc.) can be provided.

Example 19

Figure 19:
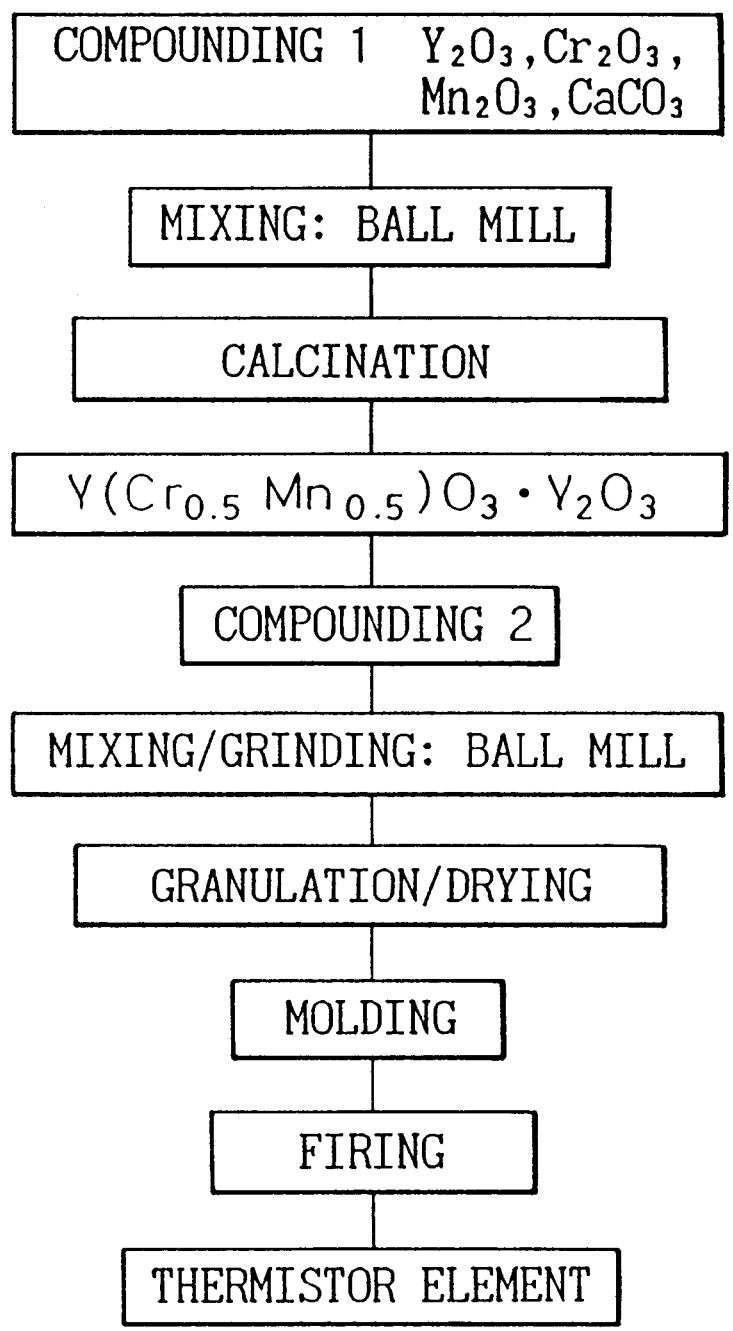

Example 19 is basically the same as Example 15 and Example 17. That is, a precursor is formed by using $Y_2O_3$, $Cr_2O_3$, $Mn_2O_3$ and $CaCO_3$ as the raw material to obtain a mixed sintered body ($M^1$=Y, $M^2$=Cr, Mn) of $Y(Cr_{0.5}Mn_{0.5})O_3 \cdot Y_2O_3$. A flow chart illustrating a production step of the thermistor element of Example 19 is shown in FIG. 19.

In Example 19, a ball mill device as a conventional method is used in the mixing step and grinding step in the production method of Example 15.

In the same manner as in Example 15, $Y_2O_3$, $Cr_2O_3$, $Mn_2O_3$ and $CaCO_3$ (all of the purity is not less than 99.9%) are prepared. In the compounding 1, these respective components are compounded to obtain the desired resistivity and resistivity temperature coefficient as the thermistor element.

Specifically, $Y_2O_3$, $Cr_2O_3$ and $Mn_2O_3$ are weighed so that a and b (molar fraction) (a:b) of $aY(Cr_{0.5}Mn_{0.5})O_3 \cdot bY_2O_3$ becomes 38:62 to make 2000 g as the total amount. Furthermore, 36 g of $CaCO_3$ is added and 2036 g of the total of $Y_2O_3$, $Cr_2O_3$, $Mn_2O_3$ and $CaCO_3$ is used as a mixed raw material.

Then, this mixed raw material is mixed and ground by using a ball mill device in the mixing step. Regarding the operation conditions, the thermistor raw material is charged in a resin pot (volume: 20 liter) containing $Al_2O_3$ pebbles having a diameter of 15φ (10 kg) and pebbles having a diameter of 20φ (10 kg) and, after adding 6000 cc of purified water, the mixture was mixed and ground at 60 rpm for 6 hours.

The raw slurry of the thermistor material subjected to the grinding treatment was evaluated by using a laser type granulometer. As a result, the average particle diameter was 2.0 μm. This average particle diameter is smaller than the average particle diameter (1.0 μm) of $Y_2O_3$ before mixing.

The raw slurry of the resulting thermistor material is dried under the conditions of a drying chamber inlet temperature of 200° C. and an outlet temperature of 120° C. by using a spray drier. The resulting granulated powders of the thermistor material are spherical powders having an average particle diameter of 30 μm, and this raw material powder is charged in a crucible made of 99.3% $Al_2O_3$ and then calcined in a high-temperature oven in the air at 1100 to 1300° C. for 1 to 2 hours to obtain a precursor $Y(Cr_{0.5}Mn_{0.5})O_3 \cdot Y_2O_3$.

The precursor $Y(Cr_{0.5}Mn_{0.5})O_3 \cdot Y_2O_3$ as a bulk solid obtained in the calcination was roughly ground by using a chaser mill and passed through a sieve (# 30 mesh) to obtain a powder of precursor $Y(Cr_{0.5}Mn_{0.5})O_3 \cdot Y_2O_3$.

In the following grinding step, a ball mill device is used to atomize this powder similar to the mixing step. The grinding conditions of this ball mill device are the same as the conditions of the mixing step.

The raw slurry of the thermistor material subjected to the grinding treatment was evaluated by using a laser type granulometer. As a result, the average particle diameter was 3.0 μm (micron meter).

The resulting raw slurry of the thermistor material was granulated, dried, molded and then calcined to obtain a thermistor element in the same manner as in Example 15. This thermistor element is incorporated into a temperature sensor assay to give a temperature sensor. The resulting thermistor element and temperature sensor have the same structure as that of thermistor elements and temperature sensors shown in FIG. 2 to FIG. 4.

Then, the temperature sensor was evaluated in the same manner as in Example 15. The resistivity temperature characteristics of this thermistor element were good and the same as those of the thermistor element having the same molar ratio (a:b=38:62) as that of Example 15 (see Table 9).

In addition, the evaluation results of the temperature accuracy are shown in Table 10. Regarding the temperature sensor of Example 19, a temperature accuracy of ±30° C. can be obtained as in Example 17.

Example 20

Figure 20:
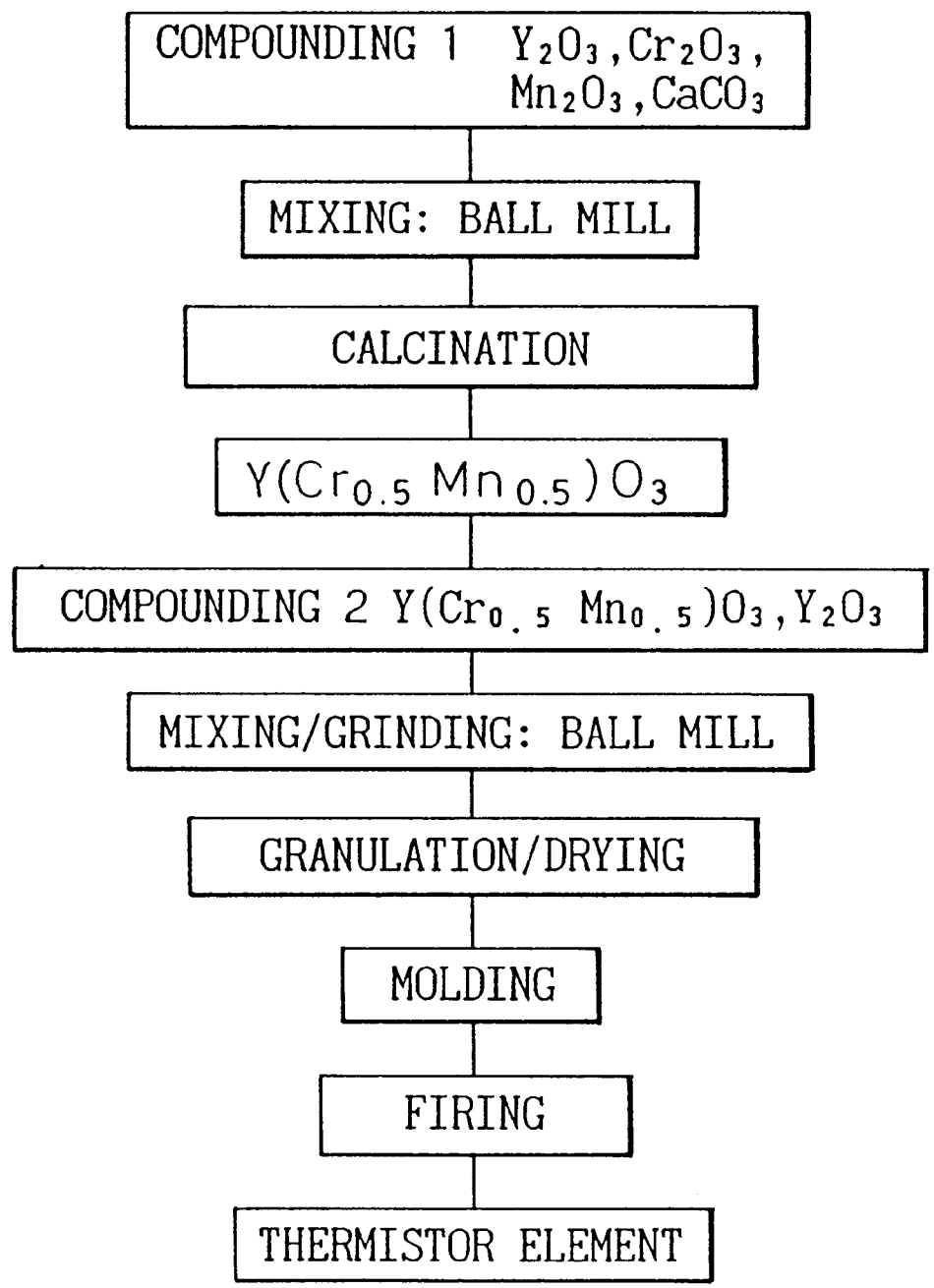

Example 20 is basically the same as Example 16 and Example 18. That is, $Y(Cr_{0.5}Mn_{0.5})O_3$ is formed by using $Y_2O_3$, $Cr_2O_3$, $Mn_2O_3$ and $CaCO_3$ as the raw material in the temporary calcination to obtain a mixed sintered body ($M^1=Y$, $M^2=Cr, Mn$) of $Y(Cr_{0.5}Mn_{0.5})O_3 \cdot Y_2O_3$. A flow chart illustrating a production step of the thermistor element of Example 20 is shown in FIG. 20.

In Example 20, a ball mill device as a conventional method is used in the mixing step and grinding step in the production method of Example 16.

In the same manner as in Example 16, $Y_2O_3$, $Cr_2O_3$, $Mn_2O_3$ and $CaCO_3$ (all of the purity is not less than 99.9%) are prepared. In the compounding 1, $Y_2O_3$, $Cr_2O_3$ and $Mn_2O_3$ are weighed so that a molar ratio of Y:Cr:Mn becomes 2:1:1 to make 644 g as the total amount. Furthermore, 36 g of $CaCO_3$ is added and 680 g of the total of $Y_2O_3$, $Cr_2O_3$, $Mn_2O_3$ and $CaCO_3$ is used as a mixed raw material.

In the mixing step, the mixed raw material obtained in the compounding 1 is mixed and ground by using a ball mill device. Regarding the operation conditions, the thermistor raw material is charged in a resin pot (volume: 5 liter) containing $Al_2O_3$ pebbles having a diameter of 15 mmφ (2.5 kg) and pebbles having a diameter of 20 mmφ (2.5 kg) and, after adding 1800 cc of purified water, the mixture was mixed and ground at 60 rpm for 6 hours.

The raw slurry of the thermistor material subjected to the grinding treatment was evaluated by using a laser type granulometer. As a result, the average particle diameter was 1.7 μm. This average particle diameter is smaller than the average particle diameter (1.0 μm) of $Y_2O_3$ before mixing.

The raw slurry of the resulting thermistor material is granulated, dried and then temporarily calcined to obtain $Y(Cr_{0.5}Mn_{0.5})O_3$ in the same manner as in Example 15. $Y(Cr_{0.5}Mn_{0.5})O_3$ as a bulk solid obtained in the temporary calcination was roughly ground by using a chaser mill and passed through a sieve (# 30 mesh) to obtain a powder of $Y(Cr_{0.5}Mn_{0.5})O_3$.

In the following compounding 2, for the purpose of obtaining desired resistivity and resistivity temperature coefficient, $Y(Cr_{0.5}Mn_{0.5})O_3$ and $Y_2O_3$ are first weighed so that a and b (molar fraction)(a:b) of $aY(Cr_{0.5}Mn_{0.5})O_3 \cdot bY_2O_3$ becomes 38:62, to make 2000 g as the total amount.

A ball mill device is used to atomize $Y(Cr_{0.5}Mn_{0.5})O_3 \cdot Y_2O_3$ in the grinding step similar to in mixing step. Regarding the grinding conditions of this ball mill device, the thermistor raw material obtained in the compounding 2 is charged in a resin pot (volume: 20 liter) containing $Al_2O_3$ pebbles having a diameter of 15φ (10 kg) and pebbles having a diameter of 20φ (10 kg) and, after adding 6000 cc of purified water, the mixture was mixed and ground at 60 rpm for 6 hours.

The raw slurry of the thermistor material subjected to the grinding treatment was evaluated by using a laser type granulometer. As a result, the average particle diameter was 2.7 μm (micron meter).

The resulting raw slurry of the thermistor material is granulated, dried, molded and then fired to obtain a thermistor element in the same manner as in Example 15. This thermistor element is incorporated into a temperature sensor assay to give a temperature sensor in the same manner as in Example 15. The resulting thermistor element and temperature sensor have the same structure as that of thermistor elements and temperature sensors shown in FIG. 2 to FIG. 4.

Then, the above temperature sensor was evaluated in the same manner as in Example 15. The resistivity temperature characteristics were the same as those of Example 16 having the same molar ratio (a:b=38:62) (see Table 11).

In addition, the evaluation results of the temperature accuracy are shown in Table 10. The temperature accuracy of the temperature sensor of Example 20 is ±25° C.

Comparative Example 3

In Comparative Examples 1 and 2, the average particle diameter (μm) after mixing, average particle diameter (μm)

after grinding and temperature were evaluated in the same manner as in Example 15. The results are shown in Table 10.

As described above, when Examples 15 to 20 are compared, all thermistor elements show temperature characteristics with good resistivity as the object of the present invention.

Regarding the temperature sensor, however, the production methods of Examples 15 to 18 according to the production method of the above third embodiment are superior to those of Examples 19 and 20. Furthermore, the production methods of Examples 15 and 16 are superior to those of Examples 17 and 18.

That is, the larger the number of steps of performing atomization using the medium stirring mill so that the particle diameter of the raw material is smaller than a predetermined value in the mixing step in the first preparation step before firing and grinding step in the second preparation step, the more the temperature accuracy is improved.

Other Modification Examples

By the way, it is also possible to provide a wide-range type thermistor element comprising a mixed sintered body of Y(CrMnTi)O$_3$ and Y$_2$O$_3$ as in Examples 3 to 6 from a composition of Y(Cr$_{0.5}$Mn$_{0.5}$)O$_3$, (Mn$_{1.5}$Cr$_{1.5}$)O$_4$ and TiO$_2$ or from Y(Cr$_{0.5}$Mn$_{0.5}$)O$_3$, (Mn$_{1.5}$Cr$_{1.5}$)O$_4$, Y$_2$O$_3$ and YTiO$_3$, other than Examples 1 to 20.

It is possible to prepare a wide-range type thermistor element composed of a mixed sintered body of Y(CrMn)O$_3$ and Y$_2$O$_3$ like Examples 1 and 2 from a yttrium compound (e.g. Y$_2$O$_3$, etc.), a chromium compound (e.g. Cr$_2$O$_3$, etc.) and a manganese compound (e.g. Mn$_2$O$_3$, etc.), as a matter of course.

It is also possible to prepare a wide-range type thermistor element composed of a mixed sintered body of Y(CrMnTi)O$_3$ and Y$_2$O$_3$ like Examples 3 to 6 from a yttrium compound (e.g. Y$_2$O$_3$, etc.), a chromium compound (e.g. Cr$_2$O$_3$, etc.) and a manganese compound (e.g. Mn$_2$O$_3$, etc.), as a matter of course.

In Examples 1 to 20, in the first preparation step, the mixed solid is hot-air dried before firing, roughly ground by using a chaser mill and then calcined. It is also possible to provide a wide-range type thermistor element by adding a binder in the mixing step, granulating and drying a mixed powder and calcining the mixed powder in order to realize uniformity of the composition.

In the same manner as described above, a wide-range type thermistor element can also be provided by carrying out the calcination in the production method of the thermistor element two or more times.

In Examples 1 to 20, as the lead wire, a wire (material: Pt100 (pure platinum)) having a wire diameter of 0.3φ and a length of 10.5 mm was used, but the shape, wire diameter and length of the lead wire can be optionally selected according to the shape, dimension and working atmosphere/condition of the temperature sensor. The material of the lead wire is not limited to Pt100 (pure platinum), and there can also be used a high-melting temperature metal having a melting point enough to endure the firing or sintering temperature of the thermistor element and providing satisfactory conductivity as the lead wire, e.g. Pt$_{80}$Ir$_{20}$ (platinum 80%, iridium 20%), etc.

For the purpose of preventing the lead wire from breaking, the section can take any shape other than circular shape, e.g. rectangular shape, half-round shape, etc. It is also possible to use the lead wire of the thermistor element after providing irregularities on the lead wire surface by knuring.

In Examples 1 to 20, as a molding method of the thermistor element, molding is performed after inserting the lead wire. It is also possible to form a lead wire by molding a thermistor raw material (powder) to form a cylindrical molded article, making a hole for providing the lead wire, inserting the lead wire, followed by calcination, thereby making it possible to obtain a thermistor element.

It is also possible to form a thermistor element by forming a lead wire after calcining the cylindrical molded article.

It is also possible to obtain a thermistor element provided with a lead wire by adding a binder, a resin material, etc. to raw materials of the thermistor element, mixing them, adjusting the viscosity and hardness of the mixture to those suitable for extrusion molding, performing extrusion molding of the mixture to obtain a molded article of the thermistor element with a hole for providing a lead wire, inserting the lead wire, followed by calcination.

It is also possible to obtain a thermistor element provided with a lead wire by adding a binder, a resin material, etc. to raw materials of the thermistor element, mixing them, adjusting the viscosity and hardness of the mixture to those suitable for sheet molding, performing sheet molding of the mixture to obtain a sheet-like thermistor sheet having a thickness of 200 μm, laminating five thermistor sheets each other to form a laminate having a thickness of 1 mm, molding the laminate in a mold to obtain a molded article of a thermistor element with a hole having a diameter of 0.4 mmφ for providing a lead wire having an outer diameter of 1.8 mmφ, inserting the lead wire, followed by firing.

The present invention was described hereinabove, but the thermistor element of the present invention is a material represented by the general formula: aM$^1$M$^2$O$_3$·b(Y$_2$O$_3$), composed of a mixed sintered body of M$^1$M$^2$O$_3$ showing low resistivity and low resistance temperature coefficient (e.g. 1000 to 4000 (K)) and Y$_2$O$_3$ as a material for stabilizing the resistivity of the thermistor element.

Consequently, since the resistivity and resistance temperature coefficient can be widely controlled by appropriately mixing both components and calcining the mixture, it is possible to provide a thermistor element which can detect a temperature ranging from room temperature to high temperature of 1000° C. and has stable characteristics (e.g. no change in resistivity, etc.) in view of the reliability of heat history from room temperature to 1000° C. (Examples 1 to 20).

According to the method of producing the thermistor element of the present invention, uniform mixing of the composition is realized by atomization of the thermistor raw material and scatter in resistivity of the thermistor element is reduced by reducing a variation in composition, thereby making it possible to provide a thermistor element wherein the temperature accuracy is improved to ±10° C. or less at room temperature to 1000° C. (±25 to 30° C. in the prior art) and high accuracy of the temperature sensor can be realized (Examples 7–10 and 15–18).

Example 21

In this Example, Y(CrMnTi)O$_3$, wherein Y was selected as M$^1$, Cr and Mn were selected as M$^2$ and Ti was selected as M$^3$ in M$^1$(M$^2$M$^3$)O$_3$, is obtained.

Figure 21:
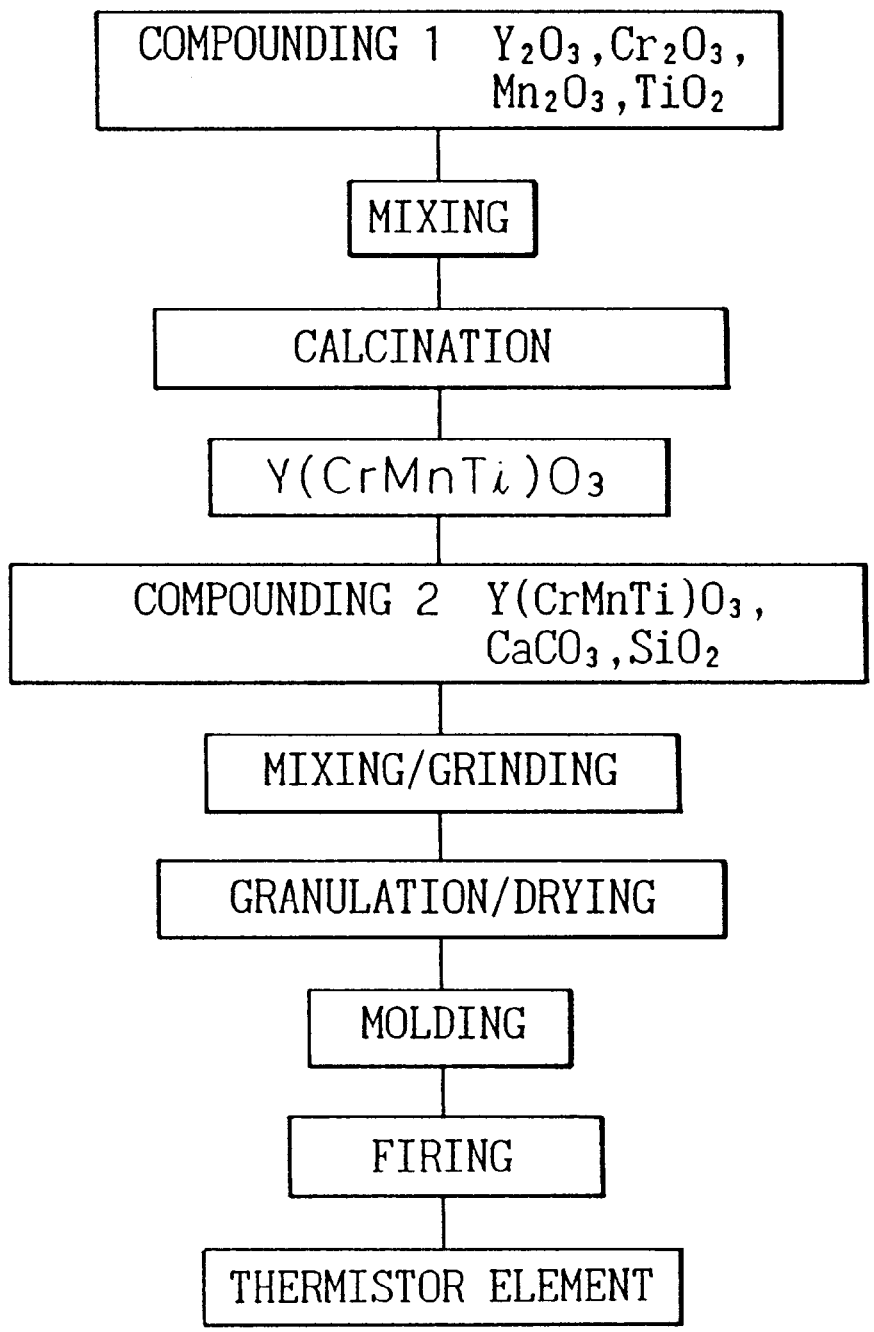

A flow chart illustrating a production step of the thermistor element of Example 21 is shown in FIG. 21.

First, Y$_2$O$_3$, Cr$_2$O$_3$, Mn$_2$O$_3$ and TiO$_2$ (purity of all components is not less than 99.9%) are prepared and then weighed so that a molar ratio of Y:Cr:Mn:Ti becomes 100:48:48:4 to make 500 g as the total amount in the step of the compounding 1 (compounding 1). Then, the total amount of these weighed substances is charged in a resin pot (volume: 5 liter) containing $Al_2O_3$ or $ZrO_2$ pebbles having a diameter of 15φ (2.5 kg) and pebbles having a diameter of 20φ (2.5 kg) and, after adding 1500 cc of purified water, the mixture was mixed at 60 rpm for 6 to 12 hours.

A mixed slurry of $Y_2O_3$, $Cr_2O_3$, $Mn_2O_3$ and $TiO_2$ obtained after a mixing treatment is transferred to a porcelain evaporating dish, and then dried by using a hot-air dryer at 150° C. for 12 hours or more to obtain a mixed solid of $Y_2O_3$, $Cr_2O_3$, $Mn_2O_3$ and $TiO_2$.

Subsequently, this mixed solid is roughly ground by using a chaser mill and passed through a sieve (# 30 mesh) to obtain a mixed powder of $Y_2O_3$, $Cr_2O_3$, $Mn_2O_3$ and $TiO_2$. This mixed powder is charged in a crucible made of 99.3% $Al_2O_3$ and then calcined in a high-temperature oven in the air at 1100 to 1300° C. for 1 to 2 hours to obtain $Y(Cr_{0.48}Mn_{0.48}Ti_{0.04})O_3$. $Y(Cr_{0.48}Mn_{0.48}Ti_{0.04})O_3$ as a bulk solid obtained in the calcination was roughly ground by using a chaser mill and passed through a sieve (# 30 mesh) to obtain a powder.

In the step of the compounding 2, $SiO_2$ and $CaCO_3$, which are converted into a liquid phase within the range from 1500 to 1650° C., are used as a sintering auxiliary in case of firing and $SiO_2$ and $CaCO_3$ are added in an amount of 3% by weight and 4.5% by weight, respectively, based on the total amount of the above $Y(Cr_{0.48}Mn_{0.48}Ti_{0.04})O_3$.

In the mixing and grinding step, the above $Y(Cr_{0.48}Mn0.48Ti_{0.04})O_3$, $Y_2O_3$, $SiO_2$ and $CaCO_3$ are charged in a resin pot (volume: 5 liter) containing $Al_2O_3$ or $ZrO_2$ pebbles having a diameter of 15φ (2.5 kg) and pebbles having a diameter of 20φ (2.5 kg), in order to mix these weighed substances. After adding 1500 cc of purified water, the mixture was mixed at 60 rpm for 4 or more hours and then ground. In this case, polyvinyl alcohol (PVA) as a binder is added in an amount of 1 g per 100 g of a $Y(Cr_{0.48}Mn_{0.48}Ti_{0.04})O_3$ powder while mixing, followed by grinding.

A mixed ground slurry of $Y(Cr_{0.48}Mn_{0.48}Ti_{0.04})O_3$ obtained after mixing and grinding is granulated and dried by using a spray dryer to obtain a granulated powder of $Y(Cr_{0.48}Mn_{0.48}Ti_{0.04})O_3$. This granulated powder is used as a thermistor raw material.

Subsequently, using this thermistor raw material and a lead wire (material: $Pt_{100}$ (pure platinum)) having a size of 0.3 mmφ in outer diameter×10.5 mm in length, the lead wire is inserted and the thermistor raw material is molded in a mold having an outer diameter of 1.74 mmφ under a pressure of about 1000 kgf/cm² to obtain a molded article of a thermistor element (provided with a lead wire) having an outer diameter of 1.75 mmφ.

The molded article of the thermistor element is arranged on a corrugated setter made of $Al_2O_3$ and then calcined in the air at 1400 to 1600° C. for 1 to 2 hours to obtain a thermistor element having an outer diameter of 1.60 mmφ.

This thermistor element 1 has a structure as shown in FIG. 3, and is composed of lead wires 11, 12 and an element portion 13 (prepared by calcining a molded article of the above thermistor element). The thermistor element 1 is incorporated into a typical temperature sensor as shown in FIG. 4 and FIG. 5 to give a temperature sensor. Thus, a temperature sensor using a thermistor having a composition of element No. 23 in Table 12 is obtained.

As shown in FIG. 5, a metal pipe 3 is filled with a magnesia powder 33 to secure insulating properties of lead wires 11, 12, 31, 32 in the metal pipe 3.

The temperature sensor was put in a high-temperature oven and temperature characteristics of the resistivity were evaluated within the range from room temperature (27° C.) to 1000° C.

Using the temperature sensor, with respect to a change in resistivity of the temperature sensor in a high-temperature durability test in the air at 1100° C. for 100 hours, a resistivity after 100 hours to an initial resistivity was evaluated by the following change in resistivity ΔR.

ΔR (%)=(Resistivity after 100 hours/Initial resistivity)×100−100

Furthermore, in the step of the compounding 1, thermistor element materials were prepared according to the compositions of elements No. 31, No. 32, No. 34 and No. 34 by changing the molar ratio of Y:Cr:Mn:Ti, as shown in Table 12, and thermistor elements were made and the resulting temperature sensors were evaluated. The respective resistance characteristics of the compositions of the elements No. 31 to No. 35 are shown in Table 12.

TABLE

<Example 12>

| No. | Composition of thermistor element (mol %) | Resistivity (kΩ) Room temperature (27° C.) | Resistivity (kΩ) 1000° C. | Resistivity temperature coefficient (K) | Change in resistivity (%) |
|---|---|---|---|---|---|
| 31 | $Y(Cr_{0.495}Mn_{0.495}Ti_{0.01})O_3$ | 60 | 0.1 | 2510 | −5.0 |
| 32 | $Y(Cr_{0.49}Mn_{0.49}Ti_{0.02})O_3$ | 80 | 0.1 | 2620 | −4.0 |
| 33 | $Y(Cr_{0.48}Mn_{0.48}Ti_{0.04})O_3$ | 100 | 0.1 | 2710 | −4.0 |
| 34 | $Y(Cr_{0.47}Mn_{0.47}Ti_{0.06})O_3$ | 200 | 0.08 | 3070 | −4.0 |
| 35 | $Y(Cr_{0.455}Mn_{0.455}Ti_{0.09})O_3$ | 300 | 0.06 | 3340 | −4.0 |

As shown in this table, the wide-range type thermistor material of this Example shows the resistivity of 50 to 100 kΩ required as a temperature sensor. Therefore, it is possible to detect a temperature ranging from room temperature to high temperature of 1000° C.

The resistivity temperature coefficient β was calculated by the resistivity at room temperature (27° C.) and that at 1000° C.

As is apparent from the results of the high-temperature durability test, it can be confirmed that a wide-range type thermistor material having stable characteristics (e.g. small change in resistivity), etc.) is provided.

Example 22

In this Example, $M^1(M^2M^3)O_3$ wherein Y was selected as $M^1$, Cr and Mn were selected as $M^2$ and Ti was selected as $M^3$, i.e., $Y(CrMnTi)O_3$, is obtained, and is prepared from $(MnCr)O_4$ spinel, $Y_2O_3$ and $TiO_2$.

Figure 22:
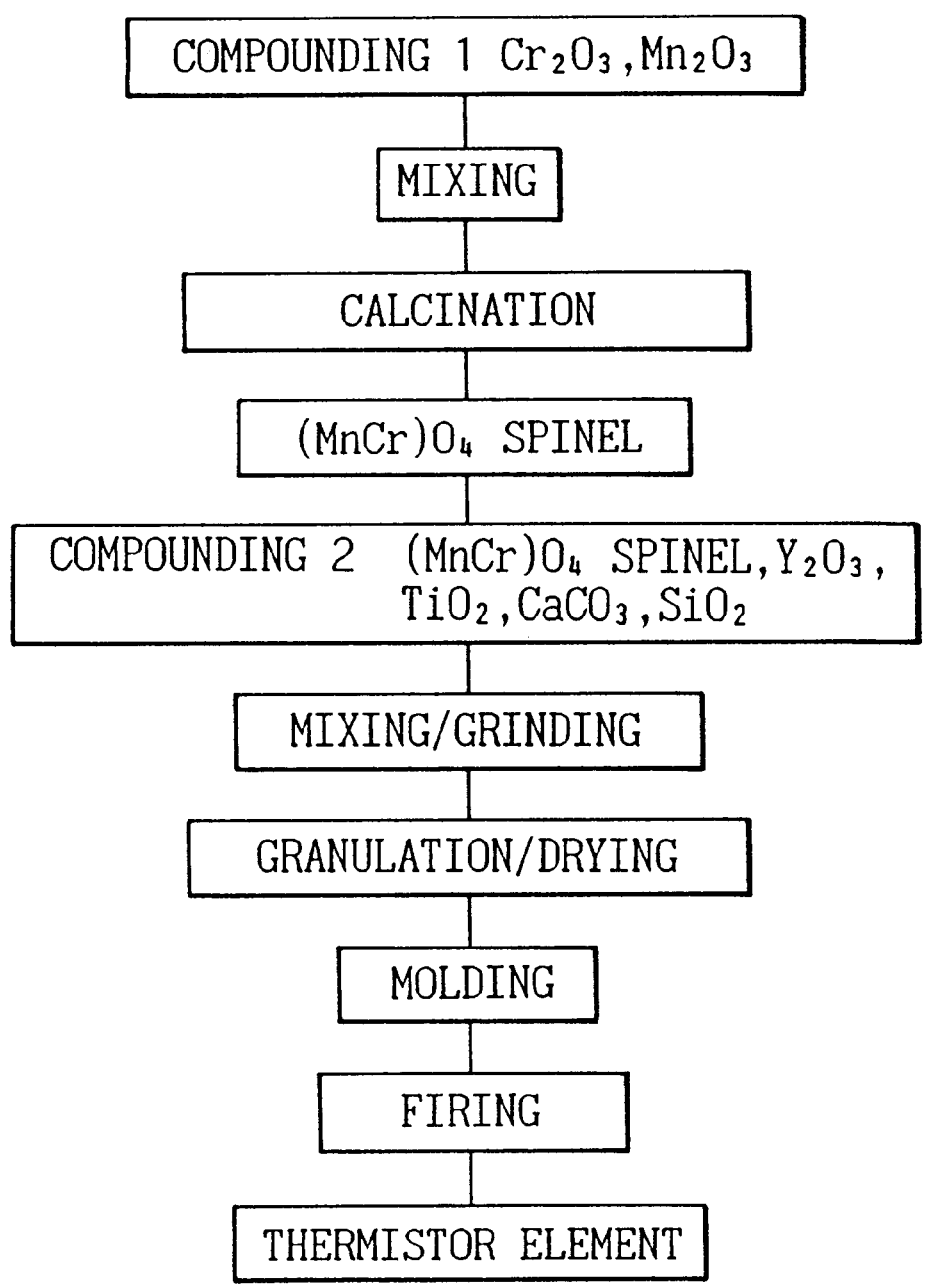

A flow chart illustrating a production step of the thermistor element of Example 22 is shown in FIG. 22.

$(MnCr)O_4$ spinel is prepared as follows. That is, $Cr_2O_3$ and $Mn_2O_3$ (purity of all components is not less than 99.9%) are first prepared and then weighed so that a molar ratio Cr:Mn becomes 1:1 to make 500 g as the total amount (compounding 1). Then, the total amount of these weighed substances is charged in a resin pot (volume: 5 liter) containing $Al_2O_3$ or $ZrO_2$ pebbles having a diameter of 15φ (2.5 kg) and pebbles having a diameter of 20φ (2.5 kg) and, after adding 1500 cc of purified water, the mixture was mixed at 60 rpm for 6 to 12 hours. A mixed slurry of $Cr_2O_3$ and $Mn_2O_3$ obtained after a mixing treatment is transferred to a porcelain evaporating dish, and then dried by using a hot-air dryer at 150° C. for 12 hours or more to obtain a mixed solid of $Cr_2O_3$ and $Mn_2O_3$.

Subsequently, this mixed solid is roughly ground by using a chaser mill and passed through a sieve (# 30 mesh) to obtain a mixed powder of $Cr_2O_3$ and $Mn_2O_3$. This mixed powder is charged in a crucible made of 99.3% $Al_2O_3$ and then temporarily calcined in a high-temperature oven in an atmosphere under a normal pressure (in the air) at 1100 to 1300° C. for 1 to 2 hours to obtain $(Mn_{1.5}Cr_{1.5})O_4$. $(Mn_{1.5}Cr_{1.5})O_4$ as a bulk solid obtained in the temporary calcination was roughly ground by using a chaser mill and passed through a sieve (# 30 mesh) to obtain a powder.

In the following step of the compounding 2, for the purpose of obtaining the composition of the element No. 33 in Table 12, $(MnCr)O_4$ spinel, $Y_2O_3$ and $TiO_2$ are weighed to make 500 g as the total amount, followed by mixing and grinding treatment. In the same manner as in Example 21, $SiO_2$ and $CaCO_3$ are added as a sintering auxiliary, but $SiO_2$ and $CaCO_3$ are added in an amount of 3% by weight and 4.5% by weight, respectively, based on the total amount of the above $(Mn_{1.5}Cr_{1.5})O_4$ and $Y_2O_3$.

The above $(MnCr)O_4$, $Y_2O_3$, $SiO_2$ and $CaCO_3$ are charged in a resin pot (volume: 5 liter) containing $Al_2O_3$ or $ZrO_2$ pebbles having a diameter of 15 mm$\phi$ (2.5 kg) and pebbles having a diameter of 20 mm$\phi$ (2.5 kg). After adding 500 cc of purified water, the mixture was mixed at 60 rpm for 4 or more hours and then ground.

Mixing, grinding, granulation, molding and firing are performed in the same manner as in Example 21 to obtain a thermistor element. This thermistor and a temperature sensor made by incorporating this thermistor element have the same structure as that shown in FIG. 3 to FIG. 5 like Example 21. The temperature sensor is evaluated in the same manner as in Example 21.

Furthermore, in the step of the compounding 2, thermistor element were prepared by adjusting a molar ratio of $(MnCr)O_4$ spinel, $Y_2O_3$ and $TiO_2$ becomes the compositions of elements No. 31, No. 32, No. 34 and No. 35 in Table 12, and thermistor elements were made and the resulting temperature sensors were evaluated.

As a result, according to the production method of Example 22, the same results as in Table 12 are obtained. Therefore, the wide-range type thermistor element of this Example can provide a wide-range type thermistor element having stable characteristics causing little change in resistivity.

Example 23

In this Example, $M^1(M^2M^3)O_3$ wherein Y was selected as $M^1$, Cr and Mn were selected as $M^2$ and Ti was selected as $M^3$, i.e., $Y(CrMnTi)O_3$, is obtained, and $Y(CrMnTi)O_3$ is prepared from $Y(CrMn)O_3$, $Y_2O_3$ and $TiO_2$.

Figure 23:
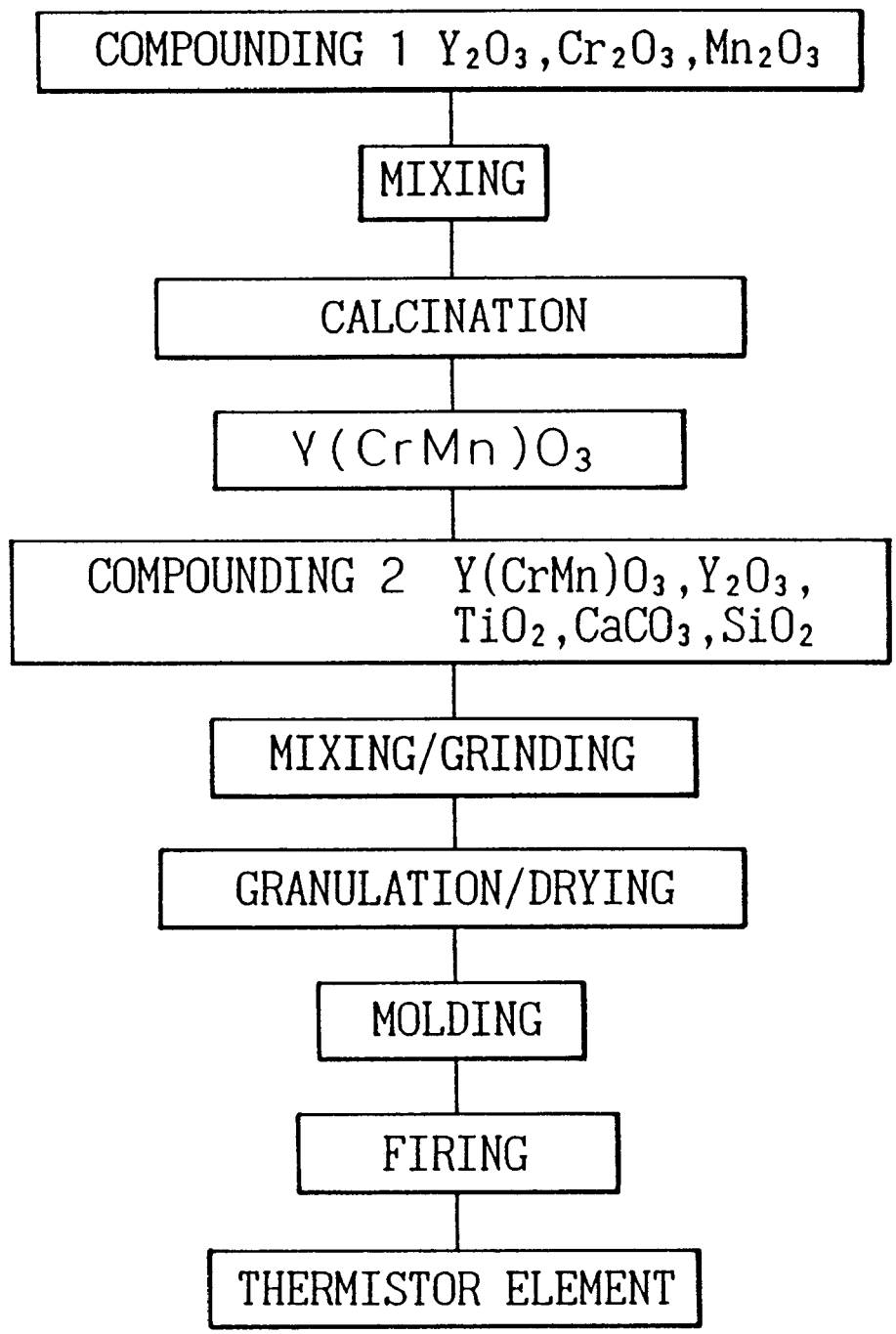

A flow chart illustrating a production step of the thermistor element of Example 23 is shown in FIG. 23.

In the production of $Y(CrMn)O_3$, $Y_2O_3$, $Cr_2O_3$ and $Mn_2O_3$ (purity of all components is not less than 99.9%) are first prepared and then weighed so that a molar ratio Y:Cr:Mn becomes 2:1:1 to make 500 g as the total amount (compounding 1).

Then, the total amount of $Y_2O_3$, $Cr_2O_3$ and $Mn_2O_3$ is charged in a resin pot (volume: 5 liter) containing $Al_2O_3$ or $ZrO_2$ pebbles having a diameter of 15 mm$\phi$ (2.5 kg) and pebbles having a diameter of 20 mm$\phi$ (2.5 kg) and, after adding 1500 cc of purified water, the mixture was mixed at 60 rpm for 6 to 12 hours. A mixed slurry of $Y_2O_3$, $Cr_2O_3$ and $Mn_2O_3$ obtained after a mixing treatment is transferred to a porcelain evaporating dish, and then dried by using a hot-air dryer at 150° C. for 12 hours or more to obtain a mixed solid of $Y_2O_3$, $Cr_2O_3$ and $Mn_2O_3$.

Subsequently, the mixed solid of $Y_2O_3$, $Cr_2O_3$ and $Mn_2O_3$ is roughly ground by using a chaser mill and passed through a sieve (# 30 mesh) to obtain a mixed powder of $Y_2O_3$, $Cr_2O_3$ and $Mn_2O_3$. The mixed powder of $Y_2O_3$, $Cr_2O_3$ and $Mn_2O_3$ is charged in a crucible made of 99.3% $Al_2O_3$ and then calcined in a high-temperature oven in the air at 1100 to 1300° C. for 1 to 2 hours to obtain $Y(Cr_{0.5}Mn_{0.5})O_3$. $Y(Cr_{0.5}Mn_{0.5})O_3$ as a bulk solid obtained in the calcination was roughly ground by using a chaser mill and passed through a sieve (# 30 mesh) to obtain a powder.

In the step of the compounding 2, for the purpose of obtaining the composition of the element No. 33 in Table 12, $Y(Cr_{0.5}Mn_{0.5})O_3$, $Y_2O_3$ and $TiO_2$ are weighed to make 500 g as the total amount, followed by mixing and grinding treatment. In the same manner as in Examples 21 to 22, $SiO_2$ and $CaCO_3$ are added as a sintering auxiliary, but $SiO_2$ and $CaCO_3$ are added in an amount of 3% by weight and 4.5% by weight, respectively, based on the total amount of the above $Y(Cr_{0.5}Mn_{0.5})O_3$, $Y_2O_3$ and $TiO_2$.

In the mixing and grinding step, the above $Y(CrMn)O_3$, $Y_2O_3$, $TiO_2$, $SiO_2$ and $CaCO_3$ are charged in a resin pot (volume: 5 liter) containing $Al_2O_3$ or $ZrO_2$ pebbles having a diameter of 15$\phi$ (2.5 kg) and pebbles having a diameter of 20$\phi$ (2.5 kg). After adding 1500 cc of purified water, the mixture was mixed at 60 rpm for 4 or more hours and then ground.

Mixing, grinding, granulation, molding and firing are performed in the same manner as in Example 21 to obtain a thermistor element. This thermistor and a temperature sensor made by incorporating this thermistor element have the same structure as that, shown in FIG. 3 to FIG. 5, of Example 21. The temperature sensor is evaluated in the same manner as in Example 21.

Furthermore, in the step of the compounding 2, thermistor element were prepared by adjusting a molar ratio of $Y(Cr_{0.5}Mn_{0.5})O_3$, $Y_2O_3$ and $TiO_2$ becomes the compositions of elements No. 31, No. 32, No. 34 and No. 35 in Table 12, and thermistor elements were made and the resulting temperature sensors were evaluated.

As a result, according to the production method of Example 23, the same results as in Table 12 are obtained. Therefore, the wide-range type thermistor element of this Example can provide a wide-range type thermistor element having stable characteristics causing little change in resistivity.

Example 24

In this Example, $M^1(M^2M^3)O_3$ wherein Y was selected as $M^1$, Cr and Mn were selected as $M^2$ and Ti was selected as $M^3$, i.e., $Y(CrMnTi)O_3$, is obtained, and $Y(CrMnTi)O_3$ is prepared from $Y(Cr_{0.5}Mn_{0.5})O_3$, $Y_2O_3$ and $YTiO_3$.

Figure 24:
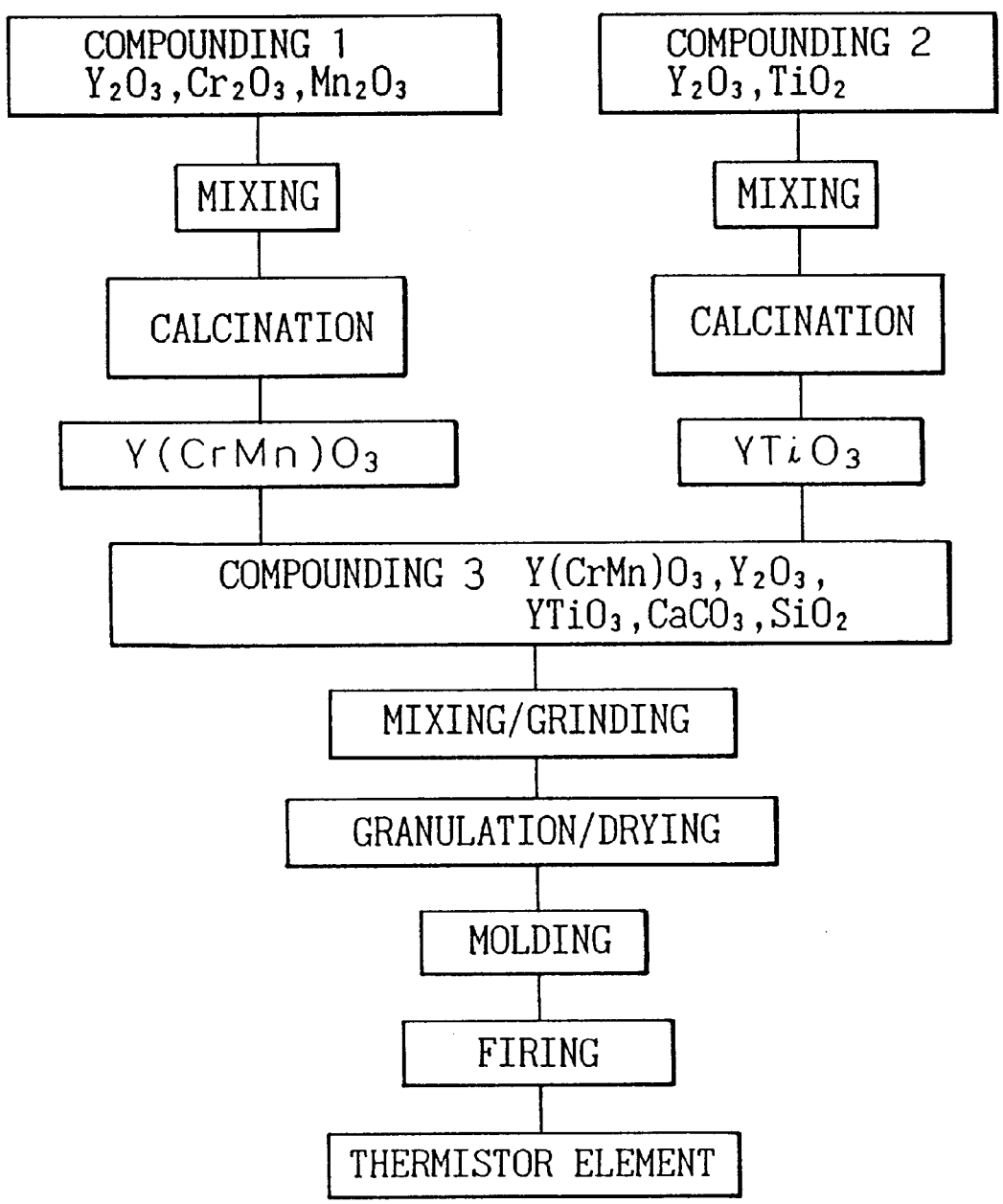

A flow chart illustrating a production step of the thermistor element of Example 24 is shown in FIG. 24. $Y(CrMn)O_3$ is prepared in the same process as in Example 23 (Compounding 2).

In the compounding 2 step, $YTiO_3$ is prepared as follows. That is, $Y_2O_3$ and $TiO_2$ (purity of all components is not less than 99.9%) are first prepared and then weighed so that a molar ratio of Y:Ti becomes 1:1 to make 500 g as the total amount. Then, the total amount of the weighed substances is charged in a resin pot (volume: 5 liter) containing $Al_2O_3$ or $ZrO_2$ pebbles having a diameter of 15ϕ (2.5 kg) and pebbles having a diameter of 20ϕ (2.5 kg) and, after adding 1500 cc of purified water, the mixture was mixed at 60 rpm for 6 hour. A mixed slurry of $Y_2O_3$ and $TiO_2$ obtained after a mixing treatment is transferred to a porcelain evaporating dish, and then dried by using a hot-air dryer at 150° C. for 12 hours or more to obtain a mixed solid of $Y_2O_3$ and $TiO_2$.

Subsequently, the mixed solid of $Y_2O_3$ and $TiO_2$ is roughly ground by using a chaser mill and passed through a sieve (# 30 mesh) to obtain a mixed powder of $Y_2O_3$ and $TiO_2$. The mixed powder is charged in a crucible made of 99.3% $Al_2O_3$ and then calcined in a high-temperature oven in the air at 1100 to 1300° C. for 1 to 2 hours to obtain $YTiO_3$. $YTiO_3$ as a bulk solid obtained in the calcination was roughly ground by using a chaser mill and passed through a sieve (# 30 mesh) to obtain a powder.

In the step of the compounding 3, for the purpose of obtaining the composition of the element No. 3 in Table 12, $Y(Cr_{0.5}Mn_{0.5})O_3$, $Y_2O_3$ and $YTiO_3$ are weighed to make 500 g as the total amount, followed by mixing and grinding treatment. In the same manner as in Examples 21 to 22, $SiO_2$ and $CaCO_3$ are added as a sintering auxiliary, but $SiO_2$ and $CaCO_3$ are added in an amount of 3% by weight and 4.5% by weight, respectively, based on the total amount of the above $Y(Cr_{0.5}Mn_{0.5})O_3$, $Y_2O_3$ and $YTiO_3$.

The above $Y(CrMn)O_3$, $Y_2O_3$, $YTiO_3$, $SiO_2$ and $CaCO_3$ are charged in a resin pot (volume: 5 liter) containing $Al_2O_3$ or $ZrO_2$ pebbles having a diameter of 15ϕ (2.5 kg) and pebbles having a diameter of 20ϕ (2.5 kg). After adding 1500 cc of purified water, the mixture was mixed at 60 rpm for 4 or more hours and then ground.

Mixing, grinding, granulation, molding and firing are performed in the same manner as in Example 21 to obtain a thermistor element. This thermistor and a temperature sensor made by incorporating this thermistor element have the same structure as that shown in Table 12 like Example 21. The temperature sensor is evaluated in the same manner as in Example 21.

Furthermore, in the step of the compounding 2, thermistor element were prepared by adjusting a molar ratio of $Y(Cr_{0.5}Mn_{0.5})O_3$, $Y_2O_3$ and $YTiO_3$ becomes the compositions of elements No. 31, No. 32, No. 34 and No. 35 in Table 12, and thermistor elements were made and the resulting temperature sensors were evaluated.

As a result, according to the production method of Example 24, the same results as in Table 12 are obtained. Therefore, the wide-range type thermistor element of this Example can provide a wide-range type thermistor element having stable characteristics causing little change in resistivity.

Example 25

In this Example, $Y(CrMnTi)O_3$, wherein Y was selected as $M^1$, Cr and Mn were selected as $M^2$ and Ti was selected as $M^3$ in $M^1(M^2M^3)O_3$, is obtained, and $Y(CrMnTi)O_3$ is prepared from $(MnCr)O_4$ spinel, $Y_2O_3$ and $YTiO_3$.

Figure 25:
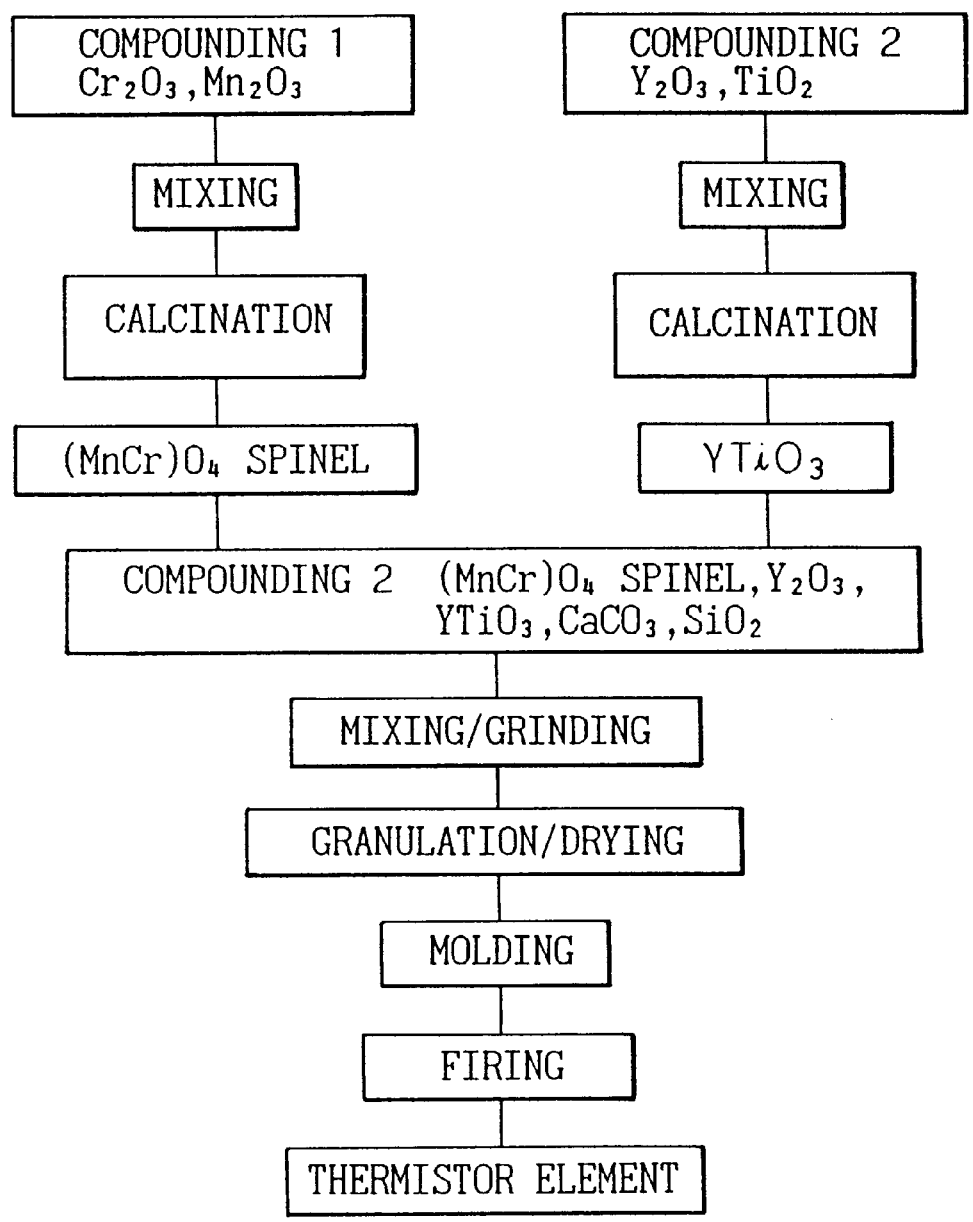

A flow chart illustrating a production step of the thermistor element of Example 25 is shown in FIG. 25. $(MnCr)O_4$ spinel is prepared in the manner similar to in Example 22. $YTiO_3$ is prepared in the manner similar to in Example 24.

In the step of the compounding 3, for the purpose of obtaining the composition of the element No. 33 in Table 12, $(MnCr)O_4$ spinel, $Y_2O_3$ and $YTiO_3$ are weighed to make 500 g as the total amount, followed by mixing and grinding treatment. In the same manner as in the above respective Examples, $SiO_2$ and $CaCO_3$ are used as a sintering auxiliary and $SiO_2$ and $CaCO_3$ are added in an amount of 3% by weight and 4.5% by weight, respectively, based on the total amount of the above $(MnCr)O_4$ spinel, $Y_2O_3$ and $YTiO_3$.

Then, the above $(MnCr)O_4$ spinel, $Y_2O_3$, $YTiO_3$ are charged in a resin pot (volume: 5 liter) containing $Al_2O_3$ or $ZrO_2$ pebbles having a diameter of 15 mmϕ (2.5 kg) and pebbles having a diameter of 20mmϕ (2.5 kg) and, after adding 1500 cc of purified water, the mixture was mixed at 60 rpm for 4 or more hours.

Mixing, grinding, granulation, molding and firing are performed in the same manner as in Example 21 to obtain a thermistor element.

The thermistor element has a structure as shown in Table 12, and is incorporated into a typical temperature sensor assay to give a temperature sensor. The temperature sensor is evaluated in the same manner as in Example 21.

Furthermore, in the step of the compounding 2, thermistor element were prepared by adjusting a molar ratio of $(MnCr)O_4$ spinel, $Y_2O_3$ and $YTiO_3$ becomes the compositions of elements No. 31, No. 32, No. 34 and No. 35 in Table 10, and thermistor elements were made and the resulting temperature sensors were evaluated.

As a result, according to the production method of Example 25, the same results as in Table 12 are obtained. Therefore, the wide-range type thermistor element of this Example can provide a wide-range type thermistor element having stable characteristics causing little change in resistivity.

As described in Examples 21 to 25, when $Y(CrMnTi)O_3$ is represented as $Y((CrMn)_aTi_b O_3$, a molar fraction of the total of Cr and Mn is a, a molar fraction of Ti is b and a+b=1, if 0<b<0.1, the resistivity is stable in view of heat history from room temperature to 1000° C. Therefore, it is possible to realize a wide-range type thermistor element having the resistivity of 60 to 300 kΩ within the temperature range from room temperature to 1000° C.

Accordingly, it is possible to provide a wide-range type thermistor element which can detect a temperature ranging from room temperature to high temperature of 1000° C. and has stable characteristics (e.g. no change in resistivity, etc.) in view of the reliability of heat history from room temperature to 1000° C.

By the way, it is also possible to provide a wide-range type thermistor element having the composition of $Y(CrMnTi)O_3$ from the composition of $Y(CrMn)O_3$, $(MnCr)O_4$ spinel, $Y_2O_3$ and $TiO_2$ or the composition of $Y(CrMn)O_3$, $(MnCr)O_4$ spinel, $Y_2O_3$ and $YTiO_3$, other than Examples 21 to 25.

It is possible to prepare a wide-range type thermistor material having the composition of $Y(CnMnTi)O_3$, like Examples 21 to 25, from an yttrium compound (e.g. $Y_2O_3$, etc.), a chromium compound (e.g. $Cr_2O_3$, etc.) and a titanium compound (e.g. $TiO_2$, etc.), as a matter of course.

In Examples 21 to 26, the mixed solid is hot-air dried before firing, roughly ground by using a chaser mill and then calcined. It is also possible to provide the above wide-range type thermistor element by adding a binder in the mixing step, granulating and drying a mixed powder and calcining the mixed powder in order to realize the uniformity of the composition.

To realize uniformity of the composition, a wide-range type thermistor element can also be provided by carrying out the calcination in the production method of the thermistor element two or more times.

In Examples 21 to 25, as the lead wire, a wire (material: $Pt_{100}$ (pure platinum)) having a wire diameter of 0.3 mmφ and a length of 10.5 mm was used, but the shape, wire diameter and length of the lead wire can be optionally selected according to the shape, dimension and service atmosphere/condition of the temperature sensor. The material of the lead wire is not limited to $Pt_{100}$ (pure platinum), and there can also be used a high-melting temperature metal having a melting point enough to endure the calcination temperature of the thermistor element and providing satisfactory conductivity as the lead wire, e.g. $Pt_{80}Ir_{20}$ (platinum 80%, iridium 20%), etc.

For the purpose of preventing the lead wire from breaking, the section can take any shape other than circular shape, e.g. rectangular shape, half-round shape, etc. It is also possible to use the lead wire of the thermistor element after providing irregularities on the lead wire surface by knurling.

In Examples 21 to 25, as a molding method of the thermistor element, molding is performed after inserting the lead wire. It is also possible to form a lead wire by molding a thermistor raw material (powder) to form a cylindrical molded article, making a hole for providing the lead wire, inserting the lead wire, followed by calcination, thereby making it possible to obtain a thermistor element.

It is also possible to thermistor element by forming a lead wire after calcining the cylindrical molded article.

It is also possible to obtain a thermistor element provided with a lead wire by adding a binder, a resin material, etc. to raw materials of the thermistor element, mixing them, adjusting the viscosity and hardness of the mixture to those suitable for sheet molding to obtain a sheet-like thermistor sheet having a thickness of 200 μm, laminating five thermistor sheets to form a laminate having a thickness of 1 mm, molding the laminate in a mold to obtain a molded article of the thermistor element having an outer diameter of 1.8 mmφ and a hole, 0.4 mmφ, for providing a lead wire, inserting the lead wire in the hole of the molded article, followed by firing.

It is also possible to obtain a thermistor element provided with a lead wire by adding a binder, a resin material, etc. to raw materials of the thermistor element, mixing them, adjusting the viscosity and hardness of the mixture to those suitable for extrusion molding, performing extrusion molding of the mixture to obtain a molded article of the thermistor element with a hole for providing a lead wire, inserting the lead wire, followed by firing.

Comparative Example 11

As Comparative Example 11, Comparative Example of a temperature sensor using a thermistor element having the composition of $M^1(M^2M^3)O_3$ wherein Y is selected as $M^1$, Cr is selected as $M^2$ and $M^3$ is not added in $M^1(M^2M^3)O_3$, i.e., $Y(Cr_{0.5}Mn_{0.5})O_3$, will be described.

$YCrO_3$ is prepared as follows. That is, $Y_2O_3$ and $Cr_2O_3$ (purity of all components is not less than 99.9%) are prepared and then weighed so that a molar ratio of Y:Cr becomes 100:100 in the step of the compounding 1 to obtain $YCrO_3$ in the same manner as in Example 21. Using the prepared $YCrO_3$ as the raw material, a temperature sensor is produced and then evaluated. The results are shown in Table 13 (element No. 36). The evaluation was performed in the same manner as in Example 21.

TABLE

<Example 13>

| No. | Composition of thermistor element (mol %) | Resistivity (kΩ) Room temperature (27° C.) | Resistivity (kΩ) 1000° C. | Resistivity temperature coefficient (K) | Change in resistivity (%) |
|---|---|---|---|---|---|
| 36 | $YCrO_3$ | >1000 | 0.8 | 5000 | −40.0 |
| 37 | $Y(Cr_{0.5}Mn_{0.5})O_3$ | 10 | 0.05 | 2080 | −20.0 |
| 38 | $YTiO_3$ | >1000 | 0.2 | 12200 | −40.0 |

As is apparent from this table, the resistivity at low temperature range of room temperature (27° C.) is remarkably high, e.g. 1000 kΩ or more. Therefore, the temperature cannot be detected.

As is also apparent from the results of the high-temperature durability test, the change in resistivity ΔR exceeds ±20% and, therefore, a wide-range thermistor element having stable characteristics can not be provided. Accordingly, the thermistor element having the composition of $YTiO_3$ can not be used as the element of the temperature sensor of the present invention.

Comparative Example 12

As Comparative Example 12, Comparative Example of a temperature sensor using a thermistor element having the composition of $M^1(M^2M^3)O_3$ wherein Y is selected as $M^1$, 50% by mol of Cr is selected as $M^2$ and 50% by mol of Mn is selected as $M^3$ in $M^1(M^2M^3)O_3$, i.e., $YCrO_3$ will be described.

In the same manner as in Example 21, $Y(Cr_{0.5}Mn_{0.5})O_3$ is obtained. Using the prepared $Y(Cr_{0.5}Mn_{0.5})O_3$ as the raw material, a temperature is produced and then evaluated. The results are shown in Table 13 (element No. 37). The evaluation was performed in the same manner as in Example 21.

As is apparent from this table, since the resistivity at high temperature range of 1000° C. is too low, the temperature cannot be detected.

As is also apparent from the results of the high-temperature durability test, the change in resistivity ΔR exceeds ±20% and, therefore, a wide-range thermistor element having stable characteristics can not be provided. Accordingly, the thermistor element having the composition of $Y(CrMn)O_3$ cannot be used as the element of the desired temperature sensor of the present invention.

Comparative Example 13

As Comparative Example 13, Comparative Example of a temperature sensor using a thermistor element having the composition of $YTiO_3$, wherein Y is selected as $M^1$, Ti is selected as $M^2$ and $M^3$ is not added in $M^1(M^2M^3)O_3$, will be described.

In the same manner as in Example 24, $YTiO_3$ is obtained. Using the prepared $YTiO_3$ as the raw material, a temperature is produced and then evaluated. The results are shown in Table 13 (element No. 38). The evaluation was performed in the same manner as in Example 21.

As is apparent from this table, since the thermistor element having the composition of $YTiO_3$ shows remarkably high resistivity at low temperature range, i.e. 1000 kΩ or more, the temperature cannot be detected.

As is also apparent from the results of the high-temperature durability test, the change in resistivity $\Delta R$ exceeds ±20% and, therefore, a wide-range thermistor element having stable characteristics cannot be provided. Accordingly, the thermistor element having the composition of $YTiO_3$ cannot be used as the element of the desired temperature sensor of the present invention.

The embodiments of the present invention were described hereinabove by way of Examples 21 to 25 and comparative Examples 11 to 13, but the present invention is of course not limited to these embodiments.

What is claimed is:

1. A thermistor element comprising a mixed sintered body $M^1M^2O_3 \cdot Y_2O_3$ of a composition $M^1M^2O_3$ and $Y_2O_3$, wherein $M^1$ is at least one element selected from the elements of the groups IIA and IIIA excluding La in the Periodic Table, and $M^2$ is at least one element from the elements of the groups IIB, IIIB, IVA, VA, VIA, VIIA and VIII, wherein $M^1M^2O_3$ and $Y_2O_3$ exist independently in said mixed sintered body and said composition excludes Pb.

2. A thermistor element according to claim 1, wherein a and b satisfy the relations $0.05 \leq a < 1.0$, $0 < b \leq 0.95$ and $a+b=1$, where said a is a molar fraction of $M^1M^2O_3$ and said b is a molar fraction of $Y_2O_3$.

3. A thermistor element according to claim 1 or 2, wherein said $M^1$ is at least one element selected from Y, Ce, Pr, Nd, Sm, Eu, Gd, Dy, Ho, Er, Yb, Mg, Ca, Sr, Ba and Sc, and said $M^2$ is at least one element selected from Ti, V, Cr, Mn, Fe, Co, Ni, Cu, Zn, Al, Ga, Zr, Nb, Mo, Hf, Ta and W.

4. A thermistor element according to claim 3, wherein said $M^1$ is Y, said $M^2$ are Cr and Mn, and said mixed sintered body is $Y(CrMn)O_3 \cdot Y_2O_3$.

5. A thermistor element according to claim 3, wherein said $M^1$ is Y, said $M^2$ are Cr, Mn and Ti, and said mixed sintered body is $Y(CrMnTi)O_3 \cdot Y_2O_3$.

6. A thermistor element according to any one of claims 1 to 5, further comprising a sintering auxiliary composed of at least one of CaO, $CaCO_3$ and $CaSiO_3$, and $SiO_2$.

7. A temperature sensor comprising the thermistor element of claim 1.

* * * * *